US012776425B2

(12) United States Patent
Zheng et al.

(10) Patent No.: US 12,776,425 B2
(45) **Date of Patent: *Oct. 27, 2026**

(54) FOURIER PTYCHOGRAPHIC IMAGING SYSTEMS, DEVICES, AND METHODS

(71) Applicant: California Institute of Technology, Pasadena, CA (US)

(72) Inventors: Guoan Zheng, Vernon, CT (US); Changhuei Yang, South Pasadena, CA (US); Roarke W. Horstmeyer, Palo Alto, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/031,779

(22) Filed: Jan. 18, 2025

(65) Prior Publication Data

US 2025/0299846 A1 Sep. 25, 2025

Related U.S. Application Data

(63) Continuation of application No. 17/455,640, filed on Nov. 18, 2021, now Pat. No. 12,237,094, which is a (Continued)

(51) Int. Cl.

| | |
|---|---|
| ***G02B 21/00*** | (2006.01) |
| ***G02B 21/06*** | (2006.01) |
| ***G02B 21/36*** | (2006.01) |
| ***G02B 27/58*** | (2006.01) |
| ***G06V 20/69*** | (2022.01) |
| ***G21K 7/00*** | (2006.01) |

(52) U.S. Cl.
CPC ............ *G21K 7/00* (2013.01); *G02B 21/365* (2013.01); *G02B 21/367* (2013.01); *G02B 27/58* (2013.01); *G06V 20/693* (2022.01); *G02B 21/002* (2013.01)

(58) Field of Classification Search
CPC ...... G21K 7/00; G06V 20/693; G02B 21/365; G02B 21/367; G02B 27/58; G02B 21/002
USPC ........................................................... 348/80
See application file for complete search history.

(56) References Cited

U.S. PATENT DOCUMENTS 4,302,108 A 11/1981 Timson
4,873,653 A 10/1989 Grosskopf
(Continued)

FOREIGN PATENT DOCUMENTS

CA 3210010 A1 9/2022
CN 1510416 7/2004
(Continued)

OTHER PUBLICATIONS

"TFOCS: Templates for First-Order Conic Solvers," CVX Research, CVX Forum, http://cvxr.com/tfocs/.
(Continued)

*Primary Examiner* — Albert Kir
(74) *Attorney, Agent, or Firm* — Sheila Martinez-Lemke; Kwan & Olynick LLP

(57) ABSTRACT

Systems, devices, and methods of Fourier ptychographic imaging by computationally reconstructing a high-resolution image by iteratively updating overlapping regions of variably-illuminated, low-resolution intensity images in Fourier space.

20 Claims, 31 Drawing Sheets

Related U.S. Application Data continuation of application No. 16/864,618, filed on May 1, 2020, now abandoned, which is a continuation of application No. 14/065,280, filed on Oct. 28, 2013, now Pat. No. 10,679,763.

(60) Provisional application No. 61/847,472, filed on Jul. 17, 2013, provisional application No. 61/720,258, filed on Oct. 30, 2012.

(56) References Cited

U.S. PATENT DOCUMENTS 4,917,494 A 4/1990 Poole et al.
5,475,527 A 12/1995 Hackel et al.
5,719,405 A * 2/1998 Hayano ............ G01N 21/95623 356/237.4
5,774,222 A * 6/1998 Maeda ............... G01N 21/8806 250/548
6,091,493 A 7/2000 Stover
6,144,365 A 11/2000 Young et al.
6,154,196 A 11/2000 Fleck et al.
6,169,601 B1 1/2001 Eremin
6,320,174 B1 11/2001 Tafas et al.
6,320,648 B1 11/2001 Brueck et al.
6,747,781 B2 6/2004 Trisnadi
6,759,949 B2 7/2004 Miyahara
6,905,838 B1 6/2005 Bittner
7,436,503 B1 10/2008 Chen et al.
7,460,248 B2 12/2008 Kurtz et al.
7,706,419 B2 4/2010 Wang et al.
7,738,095 B2 6/2010 Gardner, Jr. et al.
7,787,588 B1 8/2010 Yun et al.
8,271,251 B2 9/2012 Schwartz et al.
8,271,521 B2 9/2012 Vadon
8,313,031 B2 11/2012 Vinogradov
8,497,934 B2 7/2013 Milnes et al.
8,624,968 B1 1/2014 Hersee et al.
8,654,201 B2 2/2014 Lim et al.
8,942,449 B2 1/2015 Maiden
9,029,745 B2 5/2015 Maiden
9,182,387 B2 11/2015 Goldkorn et al.
9,343,494 B2 5/2016 Lee et al.
9,426,455 B2 8/2016 Horstmeyer et al.
9,497,379 B2 11/2016 Ou et al.
9,739,783 B1 8/2017 Kumar et al.
9,829,695 B2 11/2017 Kim et al.
9,864,184 B2 1/2018 Ou et al.
9,892,812 B2 2/2018 Zheng et al.
9,983,397 B2 5/2018 Horstmeyer et al.
9,993,149 B2 6/2018 Chung et al.
9,998,658 B2 6/2018 Ou et al.
10,162,161 B2 12/2018 Horstmeyer et al.
10,168,525 B2 1/2019 Kim et al.
10,222,605 B2 3/2019 Kim et al.
10,228,550 B2 3/2019 Ou et al.
10,401,609 B2 9/2019 Ou et al.
10,419,665 B2 9/2019 Ou et al.
10,568,507 B2 2/2020 Chung et al.
10,572,996 B2 2/2020 Eurèn
10,606,055 B2 3/2020 Horstmeyer et al.
10,652,444 B2 5/2020 Horstmeyer et al.
10,665,001 B2 5/2020 Horstmeyer et al.
10,679,763 B2 6/2020 Zheng et al.
10,684,458 B2 6/2020 Chung et al.
10,718,934 B2 7/2020 Horstmeyer et al.
10,732,396 B2 8/2020 Kim et al.
10,740,896 B2 8/2020 Georgescu et al.
10,754,138 B2 8/2020 Kim et al.
10,754,140 B2 8/2020 Chan et al.
11,092,795 B2 8/2021 Chung et al.
11,385,450 B2 7/2022 Kwon et al.
11,468,557 B2 10/2022 Ou et al.
11,893,739 B2 2/2024 Ozcan et al.
11,915,360 B2 2/2024 Ozcan et al.
12,198,300 B2 1/2025 Yang
12,237,094 B2 2/2025 Zheng
2001/0055062 A1 12/2001 Shioda et al.
2002/0015146 A1 2/2002 Meeks
2002/0141051 A1 10/2002 Vogt et al.
2003/0116436 A1 6/2003 Amirkhanian et al.
2003/0118223 A1 6/2003 Rahn et al.
2004/0057094 A1 3/2004 Olszak et al.
2004/0146196 A1 7/2004 Van Heel
2004/0190132 A1 9/2004 Laschke
2004/0190762 A1 9/2004 Dowski, Jr. et al.
2005/0211912 A1 9/2005 Fox
2006/0012781 A1 1/2006 Fradkin
2006/0098293 A1 5/2006 Garoutte et al.
2006/0158754 A1 7/2006 Tsukagoshi et al.
2006/0173313 A1 8/2006 Liu et al.
2006/0291707 A1 12/2006 Kothapalli et al.
2007/0057184 A1 3/2007 Uto et al.
2007/0133113 A1 6/2007 Minabe et al.
2007/0159639 A1 7/2007 Teramura et al.
2007/0171430 A1 7/2007 Tearney et al.
2007/0189436 A1 8/2007 Goto et al.
2007/0206200 A1 9/2007 Lindner et al.
2007/0269826 A1 11/2007 Geddes
2008/0043233 A1 2/2008 Snabre
2008/0068611 A1 3/2008 Finarov
2008/0101664 A1 5/2008 Perez
2008/0182336 A1 7/2008 Zhuang et al.
2008/0192343 A1 8/2008 Miyawaki et al.
2008/0205833 A1 8/2008 Fu et al.
2009/0008580 A1 1/2009 Luberek
2009/0046164 A1 2/2009 Shroff et al.
2009/0079987 A1 3/2009 Ben-Ezra et al.
2009/0125242 A1 5/2009 Choi et al.
2009/0284831 A1 11/2009 Schuster et al.
2009/0316141 A1 12/2009 Feldkhun
2010/0135547 A1 6/2010 Lee et al.
2010/0271705 A1 10/2010 Hung
2011/0075928 A1 3/2011 Jeong et al.
2011/0181869 A1 7/2011 Yamaguchi et al.
2011/0192976 A1 8/2011 Own et al.
2011/0235863 A1 9/2011 Maiden
2011/0255163 A1 10/2011 Merrill et al.
2012/0069344 A1 3/2012 Liu
2012/0099803 A1 4/2012 Ozcan et al.
2012/0105618 A1 5/2012 Brueck et al.
2012/0118967 A1 5/2012 Gerst, III et al.
2012/0157160 A1 6/2012 Ozcan et al.
2012/0176673 A1 7/2012 Cooper
2012/0182541 A1 7/2012 Canham
2012/0218379 A1 8/2012 Ozcan et al.
2012/0248292 A1 10/2012 Ozcan et al.
2012/0250032 A1 10/2012 Wilde et al.
2012/0281929 A1 11/2012 Brand et al.
2013/0057748 A1 3/2013 Duparre et al.
2013/0083886 A1 4/2013 Carmi et al.
2013/0093871 A1 4/2013 Nowatzyk et al.
2013/0094077 A1 4/2013 Brueck et al.
2013/0100525 A1 4/2013 Chiang et al.
2013/0170767 A1 7/2013 Choudhury et al.
2013/0182096 A1 7/2013 Boccara et al.
2013/0188251 A1 7/2013 Kusunose
2013/0223685 A1 8/2013 Maiden
2013/0321908 A1 12/2013 Babacan et al.
2014/0007307 A1 1/2014 Routh, Jr. et al.
2014/0029824 A1 1/2014 Shi et al.
2014/0043616 A1 2/2014 Maiden et al.
2014/0049817 A1 2/2014 Yang
2014/0050382 A1 2/2014 Adie et al.
2014/0085629 A1 3/2014 Bodkin et al.
2014/0118529 A1 5/2014 Zheng et al.
2014/0126691 A1 5/2014 Zheng et al.
2014/0133702 A1 5/2014 Zheng et al.
2014/0139840 A1 5/2014 Judkewitz et al.
2014/0152801 A1 6/2014 Fine et al.
2014/0153692 A1 6/2014 Larkin et al.
2014/0160236 A1 6/2014 Ozcan et al.
2014/0160488 A1 6/2014 Zhou
2014/0217268 A1 8/2014 Schleipen et al.
2014/0267674 A1 9/2014 Mertz et al.

(56) References Cited

U.S. PATENT DOCUMENTS

2014/0347672 A1 11/2014 Pavillon et al.
2014/0368812 A1 12/2014 Humphry et al.
2015/0003714 A1 1/2015 McCarty et al.
2015/0036038 A1 2/2015 Horstmeyer et al.
2015/0044098 A1 2/2015 Smart et al.
2015/0054979 A1 2/2015 Ou et al.
2015/0160450 A1 6/2015 Ou et al.
2015/0264250 A1 9/2015 Ou et al.
2015/0286042 A1 10/2015 Hilbert et al.
2015/0331228 A1 11/2015 Horstmeyer et al.
2016/0088205 A1 3/2016 Horstmeyer et al.
2016/0110584 A1 4/2016 Remiszewski et al.
2016/0156880 A1 6/2016 Teich et al.
2016/0178883 A1 6/2016 Horstmeyer et al.
2016/0202460 A1 7/2016 Zheng
2016/0210763 A1 7/2016 Horstmeyer et al.
2016/0216208 A1 7/2016 Kim et al.
2016/0216503 A1 7/2016 Kim et al.
2016/0266366 A1 9/2016 Chung et al.
2016/0320595 A1 11/2016 Horstmeyer et al.
2016/0320605 A1 11/2016 Ou et al.
2016/0341945 A1 11/2016 Ou et al.
2017/0061599 A1 3/2017 Remiszewski et al.
2017/0146788 A1 5/2017 Waller et al.
2017/0178317 A1 6/2017 Besley et al.
2017/0188853 A1 7/2017 Nakao et al.
2017/0273551 A1 9/2017 Chung et al.
2017/0299854 A1 10/2017 Kim et al.
2017/0354329 A1 12/2017 Chung et al.
2017/0363853 A1 12/2017 Besley
2017/0371141 A1 12/2017 Besley
2017/0372471 A1 12/2017 Eurèn
2018/0045569 A1 2/2018 Nath et al.
2018/0048811 A1 2/2018 Waller et al.
2018/0078447 A1 3/2018 Viner et al.
2018/0078448 A9 3/2018 Shockley, Jr. et al.
2018/0088309 A1 3/2018 Ou et al.
2018/0120553 A1 5/2018 Leshem et al.
2018/0191948 A1 7/2018 Zheng
2018/0231761 A1 8/2018 Dai et al.
2018/0307017 A1 10/2018 Horstmeyer et al.
2018/0316855 A1 11/2018 Ou et al.
2018/0329194 A1 11/2018 Small et al.
2018/0341097 A1* 11/2018 Kawasaki ............ G02B 21/086
2018/0348500 A1 12/2018 Naaman, III et al.
2018/0373016 A1 12/2018 Leshem, III et al.
2019/0049712 A1 2/2019 Kim et al.
2019/0056578 A1 2/2019 Horstmeyer et al.
2019/0077610 A1 3/2019 Flammann
2019/0097523 A1 3/2019 Schaefer
2019/0097524 A1 3/2019 Lin
2019/0137753 A1 5/2019 Chan et al.
2019/0206056 A1 7/2019 Georgescu et al.
2019/0317311 A1 10/2019 Kim et al.
2019/0331902 A1 10/2019 Ou et al.
2019/0391382 A1 12/2019 Chung et al.
2020/0186705 A1 6/2020 Ou et al.
2020/0294231 A1 9/2020 Tosun et al.
2020/0351454 A1 11/2020 Wu et al.
2020/0371335 A1 11/2020 Amthor et al.
2021/0082595 A1 3/2021 Zheng et al.
2021/0164883 A1 6/2021 Imakubo et al.
2021/0164886 A1 6/2021 Shirai et al.
2021/0349075 A1 11/2021 Bronevetsky et al.
2022/0028116 A1 1/2022 Sieckmann et al.
2022/0058776 A1 2/2022 Ozcan et al.
2022/0122313 A1 4/2022 Ozcan et al.
2022/0254538 A1 8/2022 Zheng et al.
2023/0014453 A1 1/2023 Lee et al.
2023/0030424 A1 2/2023 Ozcan et al.
2023/0085827 A1 3/2023 Ozcan et al.
2023/0098031 A1 3/2023 Weissleder et al.
2024/0153034 A1* 5/2024 Oh ........................ G06T 3/4053
2024/0159998 A1* 5/2024 Lim ....................... H04N 23/56
2025/0238900 A1 7/2025 Yang

FOREIGN PATENT DOCUMENTS

CN 1685220 10/2005
CN 1688254 A 10/2005
CN 1766575 5/2006
CN 1932565 A 3/2007
CN 1311392 C 4/2007
CN 1973233 5/2007
CN 101372179 A 2/2009
CN 101408623 A 4/2009
CN 101680848 A 3/2010
CN 101726366 A 6/2010
CN 101743519 A 6/2010
CN 101793559 8/2010
CN 101868740 A 10/2010
CN 101872033 A 10/2010
CN 101957183 A 1/2011
CN 102067040 5/2011
CN 102089616 6/2011
CN 102262073 11/2011
CN 102292662 A 12/2011
CN 102292805 12/2011
CN 102608597 A 7/2012
CN 102628985 8/2012
CN 102629371 A 8/2012
CN 102652680 A 9/2012
CN 102753935 A 10/2012
CN 103096804 A 5/2013
CN 103154662 A 6/2013
CN 103201648 A 7/2013
CN 103353675 10/2013
CN 103377746 A 10/2013
CN 103842799 A 6/2014
CN 104101993 A 10/2014
CN 104181686 A 12/2014
CN 104200449 A 12/2014
EP 1640706 A1 3/2006
EP 0760109 B1 4/2007
EP 2703871 A2 3/2014
JP H0868942 3/1996
JP H10206338 8/1998
JP 2001154103 6/2001
JP 2002163660 A 6/2002
JP 2003075725 3/2003
JP 2003315678 11/2003
JP 2004529383 9/2004
JP 2006209035 8/2006
JP 2007299604 A 11/2007
JP 2008147629 A 6/2008
JP 2009276292 11/2009
JP 2010012222 A 1/2010
KR 19980012222 U 5/1998
KR 19980075050 A 11/1998
TW 201428339 A 7/2014
WO WO-9628751 A1 9/1996
WO WO-9953469 A1 10/1999
WO WO-02102128 A1 12/2002
WO WO-03062744 A1 7/2003
WO WO-2004034121 A2 4/2004
WO WO-2008017076 A2 2/2008
WO WO-2008116070 A2 9/2008
WO WO-2009141467 A1 11/2009
WO WO-2011093043 A1 8/2011
WO WO-2012037182 A1 3/2012
WO WO-2014033459 A1 3/2014
WO WO-2014070656 A1 5/2014
WO WO-2015017730 A1 2/2015
WO WO-2015027188 A1 2/2015
WO WO-2016090331 A1 6/2016
WO WO-2016106379 A1 6/2016
WO WO-2016118761 A1 7/2016
WO WO-2016123156 A1 8/2016
WO WO-2016123157 A1 8/2016
WO WO-2016149120 A1 9/2016
WO WO-2016187591 A1 11/2016
WO WO-2017066198 A1 4/2017
WO WO-2017081539 A1 5/2017

(56) References Cited

FOREIGN PATENT DOCUMENTS

| | | | |
|---|---|---|---|
| WO | WO-2017081540 | A1 | 5/2017 |
| WO | WO-2017081542 | A2 | 5/2017 |
| WO | WO-2022132496 | A1 | 6/2022 |

OTHER PUBLICATIONS

Boudebs, Georges, et al. "Nonlinear characterization of materials using the D4 σ method inside a Z-scan 4 f-system." Optics letters 38.13 (2013): 2206-2208. Abstract only.
Candes, E.J., et al., "Phase retrieval via matrix completion," SIAM J. Imaging Sci. 6:199-225 (2012).
Candes, E.J., et al., "PhaseLift: exact and stable signal recovery from magnitude measurements via convex programming.," Comm Pure Appl Math 66:1241-1274 (2013).
Chinese Office Action [Description in English] dated Jul. 11, 2016 issued in Application No. CN 201380068831.6.
Dong, Siyuan, et al. "Spectral multiplexing and coherent-state decomposition in Fourier ptychographic imaging." Biomedical optics express 5.6 (2014): 1757-1767.
IncuCyte® ZOOM System, Brochure, 1-4 pp. (2016) (retrieved Feb. 25, 2016), [http://www.essenbioscience.com/media/uploads/files/8000-0333-E00-IncuCyte_ZOOM_brochure.pdf].
Japanese First Office Action dated Jul. 31, 2018 issued in Application No. JP 2016531919.
Li, Zhaohui, et al. "High resolution integral holography using Fourier ptychographic approach." Optics express 22.26 (2014): 31935-31947.
Li, Zhong-guo, et al. "Investigation on the third-order optical nonlinearity of CdS using 4f coherent imaging technique with phase object." International Symposium on Photoelectronic Detection and Imaging 2011: Laser Sensing and Imaging; and Biological and Medical Applications of Photonics Sensing and Imaging. vol. 8192. SPIE, 2011. Abstract only.
Liu, Cheng, and Jian-Qiang Zhu. "Influence of the illumination coherency and illumination aperture on the ptychographic iterative microscopy." Chinese Physics B 24.2 (2015): 024201.
Preliminary Amendment dated Apr. 25, 2016 filed in U.S. Appl. No. 14/710,947.
Preliminary Amendment dated Jun. 13, 2018 filed in U.S. Appl. No. 15/820,295.
Preliminary Amendment dated Mar. 17, 2014 filed in U.S. Appl. No. 14/065,280.
Preliminary Amendment dated Mar. 17, 2014 filed in U.S. Appl. No. 14/065,305.
Preliminary Amendment dated Nov. 28, 2016 filed in U.S. Appl. No. 15/206,859.
Preliminary Amendment dated Nov. 28, 2016 filed in U.S. Appl. No. 15/209,604.
Preliminary Amendment filed Jul. 11, 2018 in U.S. Appl. No. 15/959,050.
Preliminary Amendment filed Jul. 23, 2018 in U.S. Appl. No. 15/963,966.
Schropp, Andreas, et al. "Full spatial characterization of a nanofocused x-ray free-electron laser beam by ptychographic imaging." Scientific reports 3.1 (2013): 1633.
Supplemental Notice of Allowance dated Dec. 29, 2017 in U.S. Appl. No. 14/065,305.
Third-Party Observations, dated Dec. 14, 2015 in EP Application No. 13851670.3.
Tian et al., "Multiplexed Coded illumination for Fourier Ptychography with an LED array microscope", Jul. 1, 2014, Biomedical Optics Express vol. 5, Issue 7, pp. 2376-2389. (Year: 2014).
U.S. Appl. No. 14/960,252, filed Dec. 4, 2015 entitled "Multiplexed Fourier Ptychography Imaging Systems and Methods".
U.S. Appl. No. 14/979,154, filed Dec. 22, 2015 entitled "EPI-Illumination Fourier Ptychographic Imaging for Thick Samples".
U.S. Appl. No. 15/003,559, filed Jan. 21, 2016 entitled "Fourier Ptychographic Tomography".
U.S. Appl. No. 15/007,159, filed Jan. 26, 2016 entitled "Multi-Well Fourier Ptychographic and Fluorescence Imaging".
U.S. Appl. No. 15/007,196, filed Jan. 26, 2016 entitled "Array Level Fourier Ptychographic Imaging".
U.S. Appl. No. 15/068,389, filed Mar. 11, 2016 entitled "Correcting for Aberrations in Incoherent Imaging Systems Using Fourier Ptychographic Techniques".
U.S. Appl. No. 15/081,659, filed Mar. 25, 2016 entitled "Fourier Ptychographic Retinal Imaging Methods and Systems".
U.S. Appl. No. 15/160,941, filed May 20, 2016 entitled "Laser-Based Fourier Ptychographic Imaging Systems and Methods".
U.S. Appl. No. 15/620,674, filed Jun. 12, 2017, Chung, J. et al.
U.S. Appl. No. 15/636,494, filed Jun. 28, 2017, Kim, J. et al.
U.S. Appl. No. 15/820,295, filed Nov. 21, 2017, Ou.
U.S. Appl. No. 15/959,050, filed Apr. 20, 2018, Horstmeyer et al.
U.S. Appl. No. 15/963,966, filed Apr. 26, 2018, Ou et al.
U.S. Appl. No. 16/162,271, dated Oct. 16, 2018, Kim et al.
U.S. Appl. No. 16/171,270, dated Oct. 25, 2018, Horstmeyer et al.
U.S. Appl. No. 16/179,688, dated Nov. 2, 2018, Chan et al.
U.S. Appl. No. 16/242,934, filed Jan. 8. 2019, Kim et al.
U.S. Appl. No. 16/252,465, dated Jan. 18, 2019, Ou et al.
U.S. Appl. No. 16/552,948, filed Aug. 27, 2019, Chung et al.
U.S. Appl. No. 16/572,497, filed Sep. 16, 2019, Ou et al.
U.S. Appl. No. 16/864,618, filed May 1, 2020, Zheng et al.
U.S. Appl. No. 17/455,640, filed Nov. 18, 2021, Zheng et al.
U.S. Supplemental Notice of Allowability dated Mar. 2, 2017 in U.S. Appl. No. 14/065,305.
U.S. Supplemental Notice of Allowance dated Dec. 12, 2016 in U.S. Appl. No. 14/572,493.
U.S. Supplemental Notice of Allowance dated Jun. 28, 2017 in U.S. Appl. No. 15/206, 859.
About Molemap, "About US-Skin Cancer Mole Check NZ," pp. 1-2. [retrieved Oct. 23, 2015] URL: http://molemap.net.au/about-us.
Abrahamsson, S., et al., "Fast multicolor 3D imaging using aberration-corrected mulitfocus microscopy," Brief Communications: Nature Methods, vol. 10, No. 1, Jan. 2013, pp. 60-65. doi: 10.1038/nmeth.2277.
Abramowitz, M., et al, "Field Curvature," Olympus Microscopy Resource Center, 2012 Olympus America Inc., pp. 1-3. [retrieved on Feb. 24, 2016] URL: http://www.olympusmicro.com/primer/anatomy/fieldcurvature.html.
Abramowitz, M. et al, "Immersion Media," Olympus Microscopy Resource Center: Microscope Optical Components, Published 2012, pp. 1-6. [retrieved on Feb. 6, 2012] URL: http://www.olympusmicro.com/primer/anatomy/immersion.html.
Adie, et al., "Computational adaptive optics for broadband optical interferometric tomography of biological tissue," Proc. Natl. Acad. Sci. USA 109, 7175-7180 (May 8, 2012).
Age-Related Macular Degeneration (AMD) | National Eye Institute, 2010 Table, pp. 1-8. [retrieved Apr. 5, 2016] URL: https://www.nei.nih.gov/eyedata/amd.
Alexandrov, S., et al., "Spatial information transmission beyond a system's diffraction limit using optical spectral encoding of the spatial frequency," Journal of Optics A: Pure and Applied Optics 10, Feb. 4, 2008, 025304, pp. 1-5. doi:10.1088/1464-4258/10/2/025304 [retrieved Dec. 2, 2015] URL: http://www.stacks.iop.org/JOptA/10/025304.
Alexandrov, S.A., et al., "Synthetic Aperture Fourier Holographic Optical Microscopy," Physical Review Letters, vol. 97, No. 16, Oct. 20, 2006, pp. 168102-1-168102-4. doi: 0.1103/PhysRevLett.97.168102.
Arimoto, H., et al, "Integral three-dimensional imaging with digital reconstruction," Optics Letters, Optical Society of America, Feb. 1, 2001, vol. 26, No. 3, pp. 157-159. doi: 10.1364/OL.26.000157.
Australian Examination Report No. 1, dated Jan. 18, 2018 issued in Application No. AU 2014308673.
Australian Office Action dated Sep. 18, 2017 issued in Application No. AU 2014296034.
Balan, R., et al, "On signal reconstruction without phase," Applied and Computational Harmonic Analysis, vol. 20, Issue 3, May 2006, pp. 345-356. doi:10.1016/j.acha.2005.07.001.

(56) References Cited

OTHER PUBLICATIONS

Balan, R., et al, "Painless Reconstruction from Magnitudes of Frame Coefficients," Journal Fourier Analysis and Applications, vol. 15, Issue 4, Mar. 25, 2009, pp. 488-501. doi:10.1007/s00041-009-9065-1.
Bauschke, H., et al, "Phase retrieval, error reduction algorithm, and Fienup variants: a view from convex optimization," Journal of the Optical Society America, A., vol. 19, No. 7, Jul. 2002, pp. 1334-1345. doi: 10.1364/JOSAA.19.001334.
Becker, S.R., et al, "Templates for Convex Cone Problems with Applications to Sparse Signal Recovery," Mathematical Programming Computation, Sep. 2010, vol. 3, No. 3, pp. 1-49. doi: 10.1007/s12532-011-0029-5.
Betti, R., et al, "Observational study on the mitotic rate and other prognostic factors in cutaneous primary melanoma arising from naevi and from melanoma de novo," Journal of the European Academy of Dermatology and Venereology (JEADV), Dec. 2014, vol. 28, No. 12, pp. 1738-1741. doi: 10.1111/jdv.12395.
Bian, et al, "Content adaptive illumination for Fourier ptychography," Optics Letters, vol. 39, Aug. 2014, pp. 1-6.
Bian, L., et al, "Fourier ptychographic reconstruction using Poisson maximum likelihood and truncated Wirtinger gradient," Nature Publishing Group; Scientific Reports, vol. 6, No. 27384, Jun. 10, 2016, pp. 1-10. doi: 10.1038/srep27384.
Bian, L., et al., "Fourier ptychographic reconstruction using Wirtinger flow optimization," Optics Express, 2015, vol. 23(4), pp. 4856-4866.
Bian, Z., et al, "Adaptive system correction for robust Fourier ptychographic imaging," Optics express, Dec. 30, 2013, vol. 21, No. 26, pp. 32400-32410. doi: 10.1364/OE.21.032400.
BioTek Brochure: BioTek's Multi-Mode Microplate Reading Technologies, BioTek Instruments, Inc. pp. 2. [retrieved on Mar. 14, 2016] URL: http://www.biotek.com.
Bioucas-Dias, et al., "Total variation-based image deconvolution: a majorization-minimization approach," ICASSP (2), pp. 861-864 (May 14, 2006).
Bishara, W., et al, "Holographic pixel super-resolution in portable lensless on-chip microscopy using a fiber-optic array," NIH-PA, Lab Chip, Author manuscript; available in PMC Aug. 8, 2011, pp. 1-9. (Published in final edited form as: Lab Chip. Apr. 7, 2011; 11(7): 1276-1279. doi:10.1039/c01c00684j).
Bishara W., et al., "Lensfree On-Chip Microscopy Over a Wide Field-of-View using Pixel Super-Resolution," Optics Express, May 24, 2010, vol. 18(11), pp. 11181-11191.
Blum, A., et al, "Clear differences in hand-held dermoscopes," Journal der Deutschen Dermatologischen Gesellschaft (JDDG); Case Reports, Dec. 2006, vol. 4, No. 12, pp. 1054-1057. doi:10.1111/j.1610-0387.2006.06128.x.
Blum, A., et al, "Dermatoskopisch sichtbare Strukturen," Chapter 4.1 Grundlagen, Dermatoskopie von Hauttumoren: Auflichtmikroskopie; Dermoskopie; Digitale Bildanalyse; mit 28 Tabellen. Springer-Verlag Berlin Heidelberg 2003, pp. 15-66. (English Translation of Summary) doi: 10.1007/978-3-642-57446-7_4.
Booth, "Adaptive optical microscopy: the ongoing quest for a perfect image," Light Sci. Appl. 3, e165 (Apr. 25, 2014).
Born, M., et al, "Principles of Optics: Electromagnetic theory of propagation, interference and diffraction of light," Seventh (Expanded) Edition, Cambridge University Press, England 1999, pp. 1-31. [ISBN 0 521 642221 hardback].
Brady, D. et al., "Multiscale gigapixel photography," Nature, vol. 486, Jun. 21, 2012, pp. 386-389. doi:10.1038/nature11150.
Bunk, O., et al, "Influence of the overlap parameter on the convergence of the ptychographical iterative engine," Ultramicroscopy, vol. 108, (2008), pp. 481-487. doi:10.1016/j.ultramic.2007.08.003.
Burer, S., et al, "A nonlinear programming algorithm for solving semidefinite programs via low-rank factorization," Mathematical Programming, Series B., vol. 95, No. 2, Feb. 2003, pp. 329-357. doi: 10.1007/s10107-002-0352-8.
Burer, S., et al, "Local Minima and Convergence in Low-Rank Semidefinite Programming," Mathematical Programming, Series A., vol. 103, No. 3, Jul. 1, 2005, pp. 427-444. doi:10.1007/s10107-004-0564-1.
Candes, E., et al., "Phase Retrieval via Wirtinger Flow: Theory and Algorithms," IEEE Transaction On Information Theory, 2015, vol. 61(4), pp. 1985-2007.
Candes, E.J., et al, pre-published manuscript of "Phase Retrieval via Matrix Completion," ArXiv e-prints, 24 pages (Submitted on Sep. 2, 2011 (v1), last revised Sep. 20, 2011 (this version, v2)). [retrieved Nov. 9, 2015] URL: arXiv:1109.0573v2 [cs.IT] Sep. 20, 2011.
Candes, E.J., et al, pre-published Manuscript of "PhaseLift: Exact and Stable Signal Recovery from Magnitude Measurements via Convex Programming," ArXiv e-prints, 31 pages (Submitted Sep. 2011 (v1)). [retrieved Nov. 9, 2015] URL: arXiv:1109.4499v1 [cs.IT] Sep. 21, 2011.
Carroll, J., "Adaptive Optics Retinal Imaging: Applications for Studying Retinal Degeneration," Archives of Ophthalmology, vol. 126, No. 6, Jun. 9, 2008, pp. 857-858. [retrieved Feb. 24, 2016] doi:10.1001/archopht.126.6.857.
Chai, A., et al, "Array imaging using intensity-only measurements," IOP Publishing: Inverse Problems, vol. 27, No. 1, Jan. 2011, pp. 1-16. doi:10.1088/0266-5611/27/1/015005.
Chao, W. et al, "Soft X-ray microscopy at a spatial resolution better than 15 nm," Nature Letters, vol. 435, Jun. 30, 2005, pp. 1210-1213. doi:10.1038/nature03719.
Chen, T., et al, "Polarization and Phase-Shifting for 3D Scanning of Translucent Objects," 2007 IEEE Conference on Computer Vision and Pattern Recognition; on Jun. 17-22, 2007, pp. 1-8. doi:10.1109/CVPR.2007.383209.
Chin, L., et al, "Malignant melanoma: genetics and therapeutics in the genomic era," CSH Press: Genes & Development, Aug. 15, 2006, vol. 20, pp. 2149-2182. doi: 10.1101/gad.1437206 [retrieved Sep. 9, 2015] URL: http://genesdev.cshlp.org/content/20/16/2149.
Chinese First Office Action dated Apr. 16, 2020 issued in Application No. CN 201810576437.8.
Chinese First Office Action dated Apr. 19, 2019 issued in Application No. CN 201680006738.6.
Chinese First Office Action dated Apr. 19, 2019 issued in Application No. CN 201680014898.5.
Chinese First Office Action dated Aug. 2, 2017 issued in Application No. CN 201480054301.0.
Chinese First Office Action dated Dec. 13, 2016 issued in Application No. CN201480057911.6.
Chinese First Office Action dated Dec. 26, 2018 issued in Application No. CN 201580067354.0.
Chinese First Office Action dated Dec. 28, 2018 issued in Application No. CN 201680005491.6.
Chinese First Office Action dated Feb. 24, 2018 issued in CN 201680003937.1.
Chinese First Office Action dated Jan. 28, 2019 issued in CN 201580072950.8.
Chinese First Office Action dated Jan. 28, 2021 issued in Application No. CN 201910181199.5.
Chinese First Office Action dated Jan. 4, 2021 issued in Application No. CN 201811585066.6.
Chinese First Office Action dated Oct. 11, 2020 issued in CN 201811184731.0.
Chinese Office Action [Description in English] dated May 31, 2016 issued in Application No. CN 201380068831.6.
Chinese Second Office Action dated Dec. 31, 2019 issued in CN 201580072950.8.
Chinese Second Office Action dated Jul. 3, 2018 issued in Application No. CN 201480054301.0.
Chinese Second Office Action dated Mar. 19, 2020 issued in Application No. CN 201680014898.5.
Chinese Second Office Action dated Nov. 12, 2019 issued in Application No. CN 201680005491.6.
Chinese Second Office Action dated Nov. 28, 2019 issued in Application No. CN 201680006738.6.
Chinese Second Office Action dated Oct. 26, 2017 issued in Application No. CN 201480057911.6.

(56) References Cited

OTHER PUBLICATIONS

Chinese Second Office Action dated Oct. 8, 2021 issued in Application No. CN 201811585066.6.
Chinese Second Office Action [Description in English] dated Jan. 22, 2017 issued in Application No. CN201380068831.6.
Chinese Third Office Action dated Jul. 13, 2018 issued in Application No. CN 201480057911.6.
Chinese Third Office Action dated May 15, 2020 issued in Application No. CN 201680005491.6.
Chinese Third Office Action [Summary in English] dated Jul. 24, 2017 issued in Application No. 201380068831.6.
Choi, W., et al, "Tomographic phase microscopy," NPG: Nature Methods | Advance Online Publication, Aug. 12, 2007, pp. 1-3. doi:10.1038/NMETH1078.
Chung, et al, "Computational aberration compensation by coded-aperture-based correction of aberration obtained from optical Fourier coding and blur estimation," Optica, vol. 6, May 10, 2019, pp. 647-661.
Chung, J., et al, "Counting White Blood Cells from a Blood Smear Using Fourier Ptychographic Microscopy," PLoS ONE, vol. 10, No. 7, Jul. 17, 2015, pp. 1-10. doi:10.1371/journal.pone.0133489.
Chung, J., et al, pre-published manuscript of "Wide-field Fourier ptychographic microscopy using laser illumination source," ArXiv e-prints (Submitted on Feb. 9, 2016 (v1), last revised Mar. 23, 2016 (this version, v2)). [retrieved on May 20, 2016] URL:arXiv:1602.02901v2 [physics. Optics] Mar. 23, 2016.
Chung, J., et al, "Wide field-of-view fluorescence image deconvolution with aberration-estimation from Fourier ptychography," Biomedical Optics Express, vol. 7, No. 2, Feb. 1, 2016, pp. 352-368. doi: 10.1364/BOE.7.000352.
CN Office Action dated Oct. 8, 2021, in application No. CN201811585067 with English translation.
CN Office Action dated Oct. 11, 2021, in Application No. CN201910181199.5 with English translation.
Colomb, T., et al, "Automatic procedure for aberration compensation in digital holographic microscopy and applications to specimen shape compensation," Applied Optics, vol. 45, No. 5, Feb. 10, 2006, pp. 851-863. doi: 10.1364/AO.45.000851.
De Sa, C., et al, "Global Convergence of Stochastic Gradient Descent for Some Non-convex Matrix Problems," Proceedings of the 32nd International Conference on Machine Learning, Lille, France, 2015. JMLR: W&CP, vol. 37, pp. 10. [retrieved on Nov. 9, 2015] URL: https://arxiv.org/abs/1411.1134.
Debailleul, M., et al, "High-resolution three-dimensional tomographic diffractive microscopy of transparent inorganic and biological samples," Optics Letters, Optical Society of America, vol. 34, No. 1, Jan. 1, 2009, pp. 79-81. doi: 10.1364/OL.34.000079.
Denis, L., et al, "Inline hologram reconstruction with sparsity constraints," Optics Letters, Optical Society of America, vol. 34, No. 22, Oct. 12, 2009, pp. 3475-3477. doi:10.1364/OL.34.003475 ujm-00397994v2.
Desjardins, et al., "Angle-resolved Optical Coherence Tomography with sequential selectivity for speckle reduction" Optics Express, vol. 15, No. 10, May 14, 2007, pp. 6200-6209.
Di, J., et al, "High resolution digital holographic microscopy with a wide field of view based on a synthetic aperture technique and use of linear CCD scanning," Applied Optics, vol. 47, No. 30, Oct. 20, 2008, pp. 5654-5659. doi: 10.1364/AO.47.005654.
Dierolf, M., et al, "Ptychographic coherent diffractive imaging of weakly scattering specimens," New Journal of Physics, vol. 12, Mar. 31, 2010, 035017, pp. 14. doi:10.1088/1367-2630/12/3/035017.
Dierolf, M., et al, "Ptychographic X-ray computed tomography at the nanoscale," Nature Letter, vol. 467, Sep. 23, 2010, pp. 436-439. doi:10.1038/nature09419.
Doctor Mole—Skin Cancer App, App to check skin cancer by Dr. Mole, p. 1. (Webpage) [retrieved on Oct. 23, 2015] URL: http://www.doctormole.com.
Dong, S., et al, "Aperture-scanning Fourier ptychography for 3D refocusing and super-resolution macroscopic imaging," Optics Express, vol. 22, No. 11, Jun. 2, 2014, pp. 13586-13599. doi:10.1364/OE.22.013586.
Dong, S., et al, "FPscope: a field-portable high-resolution microscope using a cellphone lens," Biomedical Optics Express, vol. 5, No. 10, Oct. 1, 2014, pp. 3305-3310. doi:10.1364/BOE.5.003305.
Dong, S., et al, "High-resolution fluorescence imaging via pattern-illuminated Fourier ptychography," Optics Express, vol. 22, No. 17, Aug. 25, 2014, pp. 20856-20870. doi:10.1364/OE.22.020856.
Dowski, et al., "Extended depth of field through wavefront coding," Applied Optics, vol. 34, No. 11, Apr. 10, 1995, pp. 1859-1866.
Eldar, Y.C., et al, "Sparse Phase Retrieval from Short-Time Fourier Measurements," IEEE Signal Processing Letters, vol. 22, No. 5, May 2015, pp. 638-642. doi:10.1109/LSP.2014.2364225.
Emile, O., et al, "Rotating polarization imaging in turbid media," Optics Letters, vol. 21, No. 20, Oct. 15, 1996, pp. 1706-1708. doi: 10.1364/OL.21.001706.
English Translated document of JP-2002163660-A (Year: 2002).
EP Examination report dated Aug. 16, 2022 in Application No. EP20160744003.
Essen BioScience, "Real-time, quantitative live-cell analysis, IncuCyte® Zoom System," IncuCyte Zoom System Brochure 2016, pp. 1-4. [retrieved Feb. 25, 2016] [URL: http://www.essenbioscience.com/IncuCyte].
European Extended Search Report dated Aug. 14, 2018 issued in EP 16744003.1.
European Extended Search Report dated Jun. 6, 2018 issued in Application No. 15865492.1.
European Extended Search Report dated Mar. 31, 2016 in EP Application No. 13851670.3.
European First Examination Report dated Jan. 21, 2021 issued in Application No. EP 16744002.3.
European First Examination Report dated Jan. 27, 2021 issued in EP 16744003.1.
European First Examination Report dated Sep. 28, 2020 issued in Application No. 14837844.1.
European Office Action dated Feb. 22, 2022 in Application No. EP16765505.9.
European Office Action dated May 16, 2017 issued in European Patent Application No. 13851670.3.
European Third-Party Observations, dated Jan. 20, 2016 in EP Application No. 13851670.3.
Evered, et al., "Accuracy and perceptions of virtual microscopy compared with glass slide microscopy in cervical cytology," Cytopathology, vol. 22, Feb. 2, 2010, pp. 82-87.
Extended European Search Report dated Aug. 8, 2018 issued in Application No. EP 16744002.3.
Extended European Search Report dated Feb. 15, 2017 issued in Application No. 14832857.8.
Extended European Search Report dated Feb. 16, 2017 issued in Application No. 14837844.1.
Extended European Search Report dated Jul. 3, 2018 issued in Application No. EP 15874344.3.
Extended European Search Report dated Oct. 25, 2018 issued in Application No. EP 16765505.9.
Extended European Search Report dated Sep. 12, 2018 issued in Application No. EP 16740769.1.
Faulkner, H.M.L., et al, "Error tolerance of an iterative phase retrieval algorithm for moveable illumination microscopy," Ultramicroscopy, vol. 103, No. 2, May 2005, pp. 153-164. doi:10.1016/j.ultramic.2004.11.006.
Faulkner, H.M.L., et al., "Movable Aperture Lensless Transmission Microscopy: A Novel Phase Retrieval Algorithm," Physical Review Letters, vol. 93, No. 2, Jul. 9, 2004, pp. 023903-1-023903-4. doi:10.1103/PhysRevLett.93.023903.
Fazel, M., "Matrix rank minimization with applications," PhD dissertation submitted to the Dept. of Electrical Engineering and Committee on Graduate Studies of Stanford University, Mar. 2002, pp. 1-117. [retrieved on Nov. 9, 2015] URL: http://faculty.washington.edu/mfazel/thesis-final.pdf.

(56) References Cited

OTHER PUBLICATIONS

Feng, P., et al, "Long-working-distance synthetic aperture Fresnel off-axis digital holography," Optics Express, vol. 17, No. 7, Mar. 30, 2009, pp. 5473-5480. doi: 10.1364/OE.17.005473.
Fergus, et al., "Removing camera shake from a single photograph," ACM Trans. Graph. 25, 787-794 (2006).
Fienup and Miller, "Aberration correction by maximizing generalized sharpness metrics," J. Opt. Soc. Am. A 20, pp. 609-620 (Apr. 2003).
Fienup, J., et al., "Phase retrieval algorithms: a comparison," Applied Optics, 1982, vol. 21(5), pp. 2758-2769.
Fienup, J. R., "Invariant error metrics for image reconstruction," Applied Optics, vol. 36, No. 32, Nov. 10, 1997, pp. 8352-8357. doi: 10.1364/AO.36.008352.
Fienup, J. R., "Lensless coherent imaging by phase retrieval with an illumination pattern constraint," Optics Express, vol. 14, No. 2, Jan. 23, 2006, pp. 498-508. doi: 10.1364/OPEX.14.000498.
Fienup, J. R., "Reconstruction of a complex-valued object from the modulus of its Fourier transform using a support constraint," Journal of the Optical Society of America A, vol. 4, No. 1, Jan. 1987, pp. 118-123. doi: 10.1364/JOSAA.4.000118.
Fienup, J. R., "Reconstruction of an object from the modulus of its Fourier transform," Optics Letter, vol. 3, No. 1, Jul. 1978, pp. 27-29. doi: 10.1364/OL.3.000027.
Fried, D.L., "Anisoplanatism in adaptive optics," J. Opt. Soc. Am. vol. 72, No. 1, Jan. 1982, pp. 52-61.
Gan, X., et al, "Image enhancement through turbid media under a microscope by use of polarization gating methods," Journal of the Optical Society of America A, vol. 16, No. 9, Sep. 1999, pp. 2177-2184. doi: 10.1364/JOSAA.16.002177.
Gerke T.D., et al, "Aperiodic volume optics," Nature Photonics, vol. 4, Feb. 7, 2010, pp. 188-193. doi:10.1038/nphoton.2009.290.
Ghosh, A., et al, pre-published manuscript of "Multiview Face Capture using Polarized Spherical Gradient Illumination," via USC Institute for Creative Technologies; To appear in ACM Transactions on Graphics (TOG), vol. 30, No. 6, Dec. 2011, pp. 1-10. [Retrieved Sep. 28, 2011] URL: http://doi.acm.org/10.1145/2024156.2024163.
Ginner, et al., "Holographic line field en-face OCT with digital adaptive optics in the retina in vivo," Biomed. Opt. Express 9, 472-485 (Feb. 1, 2018).
Ginner, et al., "Noniterative digital aberration correction for cellular resolution retinal optical coherence tomography in vivo," Optica, vol. 4, Aug. 2017, pp. 924-931.
Godara, P., et al, "Adaptive Optics Retinal Imaging: Emerging Clinical Applications," NIH-PA Author Manuscript; available in PMC Dec. 1, 2011. Published in final edited form as: Optom. Vis. Sci.. Dec. 2010; 87(12): 930-941. doi: 10.1097/OPX.0b013e3181ff9a8b.
Godden, T.M. et al., "Ptychographic microscope for three-dimensional imaging," Optics Express, vol. 22, No. 10, May 19, 2014, pp. 12513-12523.
Goodman, J.W., "Introduction to Fourier Optics," Third Ed., Roberts & Company Publishers (Englewood, Colorado 2005) pp. 1-172. ISBN 0-9747077-2-4.
Goodson, A.G., et al, "Comparative analysis of total body vs. dermatoscopic photographic monitoring of nevi in similar patient populations at risk for cutaneous melanoma," NIH-PA Author Manuscript; available in PMC Jul. 1, 2011. Published in final edited form as: Dermatol. Surg. Jul. 2010; 36(7): 1087-1098. doi: 10.1111/j.1524-4725.2010.01589.x.
Granero, L., et al, "Synthetic aperture superresolved microscopy in digital lensless Fourier holography by time and angular multiplexing of the object information," Applied Optics, vol. 49, No. 5, Feb. 10, 2010, pp. 845-857. doi: 10.1364/AO.49.000845.
Grant, M., et al, "CVX: Matlab Software for Disciplined Convex Programming," CVX Research Inc., pp. 1-3. [Webpage] [retrieved on Dec. 18, 2015] URL: http://cvxr.com/cvx.
Greenbaum, A., et al, "Field-portable wide-field microscopy of dense samples using multi-height pixel super-resolution based lensfree imaging," Lab Chip, The Royal Society of Chemistry, vol. 12, No. 7, Jan. 31, 2012, pp. 1242-1245. [retrieved on Feb. 27, 2016] URL: http://dx.doi.org/10.1039/C2LC21072J.
Greenbaum, A., et al, "Increased space-bandwidth product in pixel super-resolved lensfree on-chip microscopy," Scientific Reports, vol. 3, No. 1717, Apr. 24, 2013, pp. 1-8. [doi: 10.1038/srep01717].
Gruev, V., et al, "Dual-tier thin film polymer polarization imaging sensor," Optics Express, vol. 18, No. 18, Aug. 30, 2010, pp. 19292-19303. doi: 10.1364/OE.18.019292.
Guizar-Sicairos, M., and Fienup, J.R., "Phase retrieval with transverse translation diversity: a nonlinear optimization approach," Optics Express, vol. 16, No. 10, May 12, 2008, pp. 7264-7278. doi: 10.1364/OE.16.007264.
Gunjala, et al., "Aberration recovery by imaging a weak diffuser," Optics Express vol. 26, No. 16, Aug. 6, 2018, pp. 21054-21068.
Gunturk, B.K., et al, "Restoration in the Presence of Unknown Spatially Varying Blur," Image Restoration: Fundamentals and Advances (CRC Press 2012), vol. 7, Chapter 3, Sep. 11, 2012, pp. 63-68. ISBN 978-1-4398-6955-0.
Guo, K., et al, "Optimization of sampling pattern and the design of Fourier ptychographic illuminator," Optics Express, vol. 23, No. 5, Mar. 9, 2015, pp. 6171-6180. doi: 10.1364/OE.23.006171.
Gustafsson, M., et al., "Surpassing the lateral resolution limit by a factor of two using structured illumination microscopy," Journal of Microscopy, 2000, vol. 198(2), pp. 82-87.
Gustafsson, M., "Nonlinear structured-illumination microscopy: wide-field fluorescence imaging with theoretically unlimited resolution," Proc. Natl. Acad. Sci. USA 102, 13081-13086 (Sep. 13, 2005).
Gutzler, T., et al, "Coherent aperture-synthesis, wide-field, high-resolution holographic microscopy of biological tissue," Optics Letters, vol. 35, No. 8, Apr. 15, 2010, pp. 1136-1138. doi: 10.1364/OL.35.001136.
Haigh, S. J., et al, "Atomic Structure Imaging beyond Conventional Resolution Limits in the Transmission Electron Microscope," Physical Review Letters, vol. 103, Issue 12, Sep. 18, 2009, pp. 126101.1-126101.4. doi:10.1103/PhysRevLett.103.126101.
Han, C., et al, "Wide Field-of-View On-Chip Talbot Fluorescence Microscopy for Longitudinal Cell Culture Monitoring from within the Incubator" Analytical Chemistry, vol. 85, No. 4, Jan. 28, 2013, pp. 2356-2360. doi:10.1021/ac303356v.
Hue, F., et al, "Wave-front phase retrieval in transmission electron microscopy via ptychography," Rapid Communications: Physical Review B, vol. 82, No. 12, Sep. 15, 2010, pp. 121415-1-121415-4. doi:10.1103/PhysRevB.82.121415.
Hillman, T.R., et al, "High-resolution, wide-field object reconstruction with synthetic aperture Fourier holographic optical microscopy," Optics Express, vol. 17, No. 10, May 11, 2009, pp. 7873-7892. doi:10.1364/OE.17.007873.
Hillmann, et al., "Aberration-free volumetric high-speed imaging of in vivo retina," Sci. Rep. 6, 35209 (Oct. 20, 2016).
Hofer, et al., "Improvement in retinal image quality with dynamic correction of the eye's aberrations," Opt. Express 8, May 21, 2001, pp. 631-643.
Hofer, H., et al, "Dynamics of the eye's wave aberration," Journal of Optical Society of America A., vol. 18, No. 3, Mar. 2001, pp. 497-506. doi: 10.1364/JOSAA.18.000497.
Hofer, H., et al, "Organization of the Human Trichromatic Cone Mosaic," The Journal of Neuroscience, vol. 25, No. 42, Oct. 19, 2005, pp. 9669-9679. doi: 10.1523/JNEUROSCI.2414-05.2005.
Holloway, J., et al. "SAVI: Synthetic apertures for long-range, subdiffraction-limited visible imaging using Fourier ptychography," Science Advances | Research Article, vol. 3, No. 4, Apr. 14, 2017, pp. 1-11. doi:10.1126/sciadv.1602564 [retrieved on Nov. 28, 2017] URL: http://advances.sciencemag.org/.
Hong, S-H., et al, "Three-dimensional volumetric object reconstruction using computational integral imaging," OSA Publishing: Optics Express, vol. 12, No. 3, Feb. 9, 2004, pp. 483-491. doi:10.1364/OPEX.12.000483.
Hoppe, W., "Diffraction in inhomogeneous primary wave fields. 1. Principle of phase determination from electron diffraction interference." Acta Crystallographica Section a—Crystal Physics Diffraction Theoretical and General Crystallography, A25, Jan. 1, 1969, pp. 495-501. (English Machine Translation Incl.).

(56) References Cited

OTHER PUBLICATIONS

Horstmeyer, R., et al, "A phase space model of Fourier ptychographic microscopy," Optics Express, vol. 22, No. 1, Jan. 13, 2014, pp. 338-358. doi:10.1364/OE.22.000338.
Horstmeyer, R., et al, "Diffraction tomography with Fourier ptychography," Optica, Optical Society of America, vol. 3, No. 8, Aug. 2016, pp. 827-835. doi:10.1364/OPTICA.3.000827.
Horstmeyer, R., et al, "Digital pathology with Fourier Ptychography," Computerized Medical Imaging and Graphics, vol. 42, Jun. 2015, pp. 38-43. doi:10.1016/j.compmedimag.2014.11.005.
Horstmeyer, R., et al, "Solving ptychography with a convex relaxation," New Journal of Physics, vol. 17, May 27, 2015, pp. 1-14. doi: 10.1088/1367-2630/17/5/053044 [URL: http://iopscience.iop.org/1367-2630/17/5/053044].
Horstmeyer, R., et al, "Overlapped Fourier coding for optical aberration removal," Optics Express, vol. 22, No. 20, Oct. 6, 2014, pp. 24062-24080. doi: 10.1364/OE.22.024062.
Horstmeyer, R., et al, "Standardizing the resolution claims for coherent microscopy," Nature Photonics | Commentary, vol. 10, No. 2, Feb. 2016, pp. 68-71. doi:10.1038/nphoton.2015.279 [URL: http://dx.doi.org/10.1038/nphoton.2015.279].
Humphry, M., et al, "Ptychographic electron microscopy using high-angle dark-field scattering for sub-nanometre resolution imaging," Nature Communications, vol. 3, Mar. 6, 2012, pp. 1-7. doi: 10.1038/ncomms1733.
International Preliminary Report on Patentability dated Aug. 10, 2017 issued in Application No. PCT/US2016/015001.
International Preliminary Report on Patentability dated Aug. 10, 2017 issued in Application No. PCT/US2016/015002.
International Preliminary Report on Patentability dated Aug. 3, 2017 issued in Application No. PCT/US2016/014343.
International Preliminary Report on Patentability dated Feb. 11, 2016 issued in PCT/US2014/049297.
International Preliminary Report on Patentability dated Jul. 6, 2017 issued in Application No. PCT/US2015/067498.
International Preliminary Report on Patentability dated Jun. 15, 2017 issued in Application No. PCT/US2015/064126.
International Preliminary Report on Patentability dated Mar. 3, 2016 issued in PCT/US2014/052351.
International Preliminary Report on Patentability dated May 14, 2015 in PCT/US2013/067068.
International Preliminary Report on Patentability dated May 14, 2020 issued in PCT/US2018/059059.
International Preliminary Report on Patentability dated Nov. 30, 2017 issued in PCT/US2016/033638.
International Preliminary Report on Patentability dated Sep. 28, 2017 issued in Application No. PCT/US2016/022116.
International Search Report and Written Opinion dated Apr. 19, 2016 issued in PCT/US2015/067498.
International Search Report and Written Opinion dated Dec. 5, 2014 issued in Application No. PCT/US2014/052351.
International Search Report and Written Opinion dated Feb. 21, 2014 in PCT/US2013/067068.
International Search Report and Written Opinion dated Feb. 22, 2016 issued in PCT/US2015/064126.
International Search Report and Written Opinion dated Feb. 22, 2019 issued in PCT/US2018/059059.
International Search Report and Written Opinion dated Jun. 27, 2016 issued in PCT/US2016/022116.
International Search Report and Written Opinion dated Jun. 30, 2016 issued in PCT/US2016/014343.
International Search Report and Written Opinion dated May 11, 2016 issued in PCT/US2016/015002.
International Search Report and Written Opinion dated May 4, 2016 issued in PCT/US2016/015001.
International Search Report and Written Opinion dated Nov. 13, 2014 issued in PCT/US2014/049297.
International Search Report and Written Opinion dated Sep. 5, 2016 issued in PCT/US2016/033638.
Jacques, et al., "Imaging Superficial Tissues With Polarized Light," Lasers in Surgery and Medicine, vol. 26, No. 2, Apr. 25, 2000, pp. 119-129.
Jaganathan, K., et al, "Phase retrieval with masks using convex optimization," 2015 IEEE International Symposium on Information Theory (ISIT), Hong Kong, 2015, pp. 1655-1659. doi: 10.1109/ISIT.2015.7282737.
Jaganathan, K., et al, pre-published manuscript of "STFT Phase retrieval: uniqueness guarantees and recovery algorithms," ArXiv e-prints, 10 pages, (Submitted on Aug. 12, 2015 (v1). doi: 10.1109/JSTSP.2016.2549507 [retrieved Nov. 9, 2015] URL: https://arxiv.org/abs/1508.02820v1.
Jaganathan, K., et al, "Recovery of sparse 1-D signals from the magnitudes of their Fourier transform," 2012 IEEE International Symposium on Information Theory Proceedings, Cambridge, MA, 2012, pp. 1473-1477. doi: 10.1109/ISIT.2012.6283508.
Japanese First Office Action dated Aug. 7, 2018 issued in Application No. JP 2016-531919.
Japanese Office Action dated Oct. 17, 2017 issued in Application No. 2015-539884.
Jensen, et al. "Types of imaging, Part 2: An Overview of Fluorescence Microscopy." The Anatomical Record, vol. 295, No. 10, Oct. 1, 2012, pp. 1621-1627.
Joeres, S., et al, "Retinal Imaging With Adaptive Optics Scanning Laser Ophthalmoscopy in Unexplained Central Ring Scotoma," Arch. Ophthalmol., vol. 126, No. 4, Apr. 2008, pp. 543-547. [retrieved Jun. 10, 2015] [URL: http://archopht.jamanetwork.com/].
Jung, J.H., et al, Author Manuscript of "Microfluidic-integrated laser-controlled microactuators with on-chip microscopy imaging functionality," Published in final edited form as: Lab Chip, Oct. 7, 2014, vol. 14, No. 19, pp. 3781-3789. doi: 10.1039/c41c00790e.
Kamal, et al., "In situ retrieval and correction of aberrations in moldless lenses using Fourier ptychography," Opt. Express, vol. 26, No. 3, pp. 2708-2719 (Feb. 5, 2018).
Kawata, S. et al, "Optical microscope tomography. I. Support constraint," Journal Optical Society America A, vol. 4, No. 1, Jan. 1987, pp. 292-297. doi:10.1364/JOSAA.4.000292.
Kay, D. B., et al, Author Manuscript of "Outer Retinal Structure in Best Vitelliform Macular Dystrophy," Published in final edited form as: JAMA Ophthalmol., Sep. 2013, vol. 131, No. 9, pp. 1207-1215. doi: 10.1001/jamaophthalmol.2013.387.
Kim, J., et al, "Incubator embedded cell culture imaging system (EmSight) based on Fourier ptychographic microscopy," Biomedical Optics Express, vol. 7, No. 8, Aug. 1, 2016, pp. 3097-3110. doi: 10.1364/BOE.7.003097.
Kim, M., et al, "High-speed synthetic aperture microscopy for live cell imaging," NIH-PA, Author Manuscript available in PMC Mar. 30, 2011. Published in final edited form as: Opt Lett. Jan. 15, 2011; 36(2): pp. 148-150. PMCID: PMC3068016.
Kirkland, A.I., et al, "Multiple beam tilt microscopy for super resolved imaging," Journal of Electron Microscopy (Tokyo) Jan. 1, 1997, vol. 46, No. 1, pp. 11-22. [doi: 10.1093/oxfordjournals.jmicro.a023486].
Kirkland, A.I., et al, "Super-resolution by aperture synthesis: tilt series reconstruction in CTEM," Elsevier Science B.V., Ultramicroscopy 57, Mar. 1995, pp. 355-374. doi:10.1016/0304-3991(94)00191-O.
Kittler, H., et al, "Morphologic changes of pigmented skin lesions: A useful extension of the ABCD rule for dermatoscopy," Journal of the American Academy of Dermatology (JAAD), Apr. 1999. vol. 40, No. 4, pp. 558-562. doi: 10.1016/S0190-9622(99)70437-8.
Kner, P., "Phase diversity for three-dimensional imaging," Journal of the Optical Society of America A, vol. 30, No. 10, Oct. 1, 2013, pp. 1980-1987. doi:10.1364/JOSAA.30.001980.
Kozak, I., "Retinal imaging using adaptive optics technology," Saudi Journal of Ophthalmology, vol. 28, No. 2, Feb. 25, 2014, pp. 117-122. doi:10.1016/j.sjopt.2014.02.005.
Kuang, et al., "Digital micromirror device-based laserillumination Fourier ptychographic microscopy," Optics Express, vol. 23, Oct. 5, 2015, pp. 26999-27010.
Kubala, et al., "Reducing complexity in computational imaging systems," Optics Express vol. 11, Sep. 8, 2003, pp. 2102-2108.

(56) References Cited

OTHER PUBLICATIONS

Kumar, et al., "Subaperture correlation based digital adaptive optics for full field optical coherence tomography," Optics Express, vol. 21, May 6, 2013, pp. 10850-10866.
Kundur, et al., "Blind Image Deconvolution," IEEE Signal Processing Magazine, vol. 13, No. 3, May 1996, pp. 43-64.
Lauer, V., "New Approach to optical diffraction tomography yielding a vector equation of diffraction tomography and a novel tomographic microscope," Journal of Microscopy, Feb. 2002, vol. 205, No. 2, pp. 165-176. doi: 10.1046/j.0022-2720.2001.00980.x.
Lee, K., et al, "Synthetic Fourier transform light scattering," Optics Express, vol. 21, No. 19, Sep. 23, 2013, pp. 22453-22463. doi: 10.1364/OE.21.022453.
Levin et al., "Image and depth from a conventional camera with a coded aperture," ACM Transactions on Graphics, vol. 26, No. 3, Article 70, Jul. 2007, pp. 70-1-70-9.
Levin, et al., "Understanding blind deconvolution algorithms," IEEE Trans. Pattern Anal. Mach. Intell., vol. 33, No. 12, Dec. 2011, pp. 2354-2367.
Levoy, M., et al, "Light field microscopy," ACM Transactions Graphics, vol. 25, No. 3, proceedings of ACM SIGGRAPH Jul. 2006, pp. 1-11. [doi: 10.1145/1141911.1141976].
Levoy, M., et al, "Recording and controlling the 4D light field in a microscope using microlens arrays," Journal of Microscopy, vol. 235, Pt. 2, Aug. 2009, pp. 144-162. doi:10.1111/j.1365-2818.2009.03195.x.
Li, et al., "Separation of three dimensional scattering effects in tilt-series Fourier ptychography," Ultramicroscopy 158, 1-7 (Jun. 14, 2015).
Li, et al., "GPU accelerated parallel FFT processing for Fourier transform hyperspectral imaging," Applied Optics, vol. 54, No. 13, May 1, 2015, pp. D91-D98.
Li, X., et al, "Sparse Signal Recovery from Quadratic Measurements via Convex Programming," SIAM Journal on Mathematical Analysis, vol. 45, No. 5, Sep. 26, 2013, pp. 3019-3033. [doi:10.1137/120893707] [retrieved Feb. 13, 2014] URL: http://dx.doi.org/10.1137/120893707.
Lohmann, A. W., et al, "Space-bandwidth product of optical signals and systems," Journal of the Optical Society of America A, vol. 13, No. 3, Mar. 1996, pp. 470-473. doi: 10.1364/JOSAA.13.000470.
Lu, H., et al, "Quantitative phase imaging and complex field reconstruction by pupil modulation differential phase contrast," Optics Express, vol. 24, No. 22, Oct. 31, 2016, pp. 25345-25361. doi:10.1364/OE.24.025345.
Lue, N., et al, "Live Cell Refractometry Using Hilbert Phase Microscopy and Confocal Reflectance Microscopy," NIH-PA Author Manuscript, available in PMC Apr. 22, 2010. Published in final edited form as: J Phys Chem A. Nov. 26, 2009; 113(47); 13327-13330. PMCID: PMC2858636.
Luo Y. et al., "Single-shot Autofocusing of Microscopy Images Using Deep Learning," ACS Photonics, vol. (8)2, 2021, pp. 625-638.
Luxexcel® Brochure, "Luxexcel: 3D Printing Service Description" pp. 1-5. [retrieved on Mar. 7, 2016] URL: http://www.luxexcel.com.
Lytro | Illum, Lytro-Products [webpages], pp. 1-6. [Online] [retrieved Oct. 23, 2015] URL:https://www.lytro.com/.
Ma, W., et al, "Rapid Acquisition of Specular and Diffuse Normal Maps from Polarized Spherical Gradient Illumination," EGSR'07 Proceedings of the 18th Eurographics conference on Rendering Techniques, Eurographics Association, Aire-la-Ville, Switzerland 2007, pp. 183-194. doi: 10.2312/EGWR/EGSR07/183-194.
Mahajan, V.N., "Zernike Circle Polynomials and Optical Aberrations of Systems with Circular Pupils," Engineering Laboratory Notes: Supplemental to Applied Optics, vol. 33 No. 34, Dec. 1, 1994, pp. 8121-8124. doi:10.1364/AO.33.008121.
Maiden, A.M., et al, "A new method of high resolution, quantitative phase scanning microscopy," in Proceedings of SPIE, Jun. 2, 2010, vol. 7729, pp. 772911-1-772911-8. doi: 10.1117/12.853339 [retrieved on Dec. 16, 2015] URL: proceedings.spiedigitallibrary.org.
Maiden, A.M., et al, "An improved ptychographical phase retrieval algorithm for diffractive imaging," Ultramicroscopy, vol. 109, No. 10, Sep. 2009, pp. 1256-1262. doi:10.1016/j.ultramic.2009.05.012.
Maiden, A.M., et al, "Optical ptychography: a practical implementation with useful resolution," Optics Letters, vol. 35, No. 15, Aug. 1, 2010, pp. 2585-2587. doi: 10.1364/OL.35.002585.
Maiden, A.M., et al., "Ptychographic transmission microscopy in three dimensions using a multi-slice approach," Journal of the Optical Society of America A., vol. 29, No. 8, Aug. 1, 2012, pp. 1606-1614.
Maiden, A.M., et al, "Superresolution imaging via ptychography," Journal of the Optical Society of America A. (JOSAA), vol. 28, No. 4, Apr. 1, 2011, pp. 604-612. doi: 10.1364/JOSAA.28.000604.
Marchesini S., et al, pre-published manuscript of "Augmented projections for ptychographic imaging," (Submitted on Sep. 21, 2012 (v1), last revised Aug. 29, 2013 (this version, v5)) pp. 1-18. Published in Inverse Problems vol. 29, No. 11 (2013). [retrieved on Nov. 9, 2015] URL: https://arxiv.org/pdf/1209.4924.
Marchesini S., "Invited Article: A unified evaluation of iterative projection algorithms for phase retrieval," Review of Scientific Instruments, vol. 78, No. 1, Apr. 19, 2007, pp. 011301-1-011301-10. doi: 10.1063/1.2403783 [retrieved May 7, 2014] URL: http://dx.doi.org/10.1063/1.2403783.
Marcos, et al., "Vision science and adaptive optics, the state of the field," Vision Research, vol. 132, Feb. 27, 2017, pp. 3-33.
Marrison, J., et al, "Ptychography—a label free, high-contrast imaging technique for live cells using quantitative phase information," Scientific Reports, vol. 3, No. 2369, Aug. 6, 2013, pp. 1-7. doi: 10.1038/srep02369.
Martins da Silva et al., "Photosensitivity and epilepsy: current concepts and perspectives—a narrative review," Seizure, vol. 50, Apr. 4, 2017, pp. 209-218.
McConnell, et al., "A novel optical microscope for imaging large embryos and tissue volumes with sub-cellular resolution throughout," eLife 5, e18659, Sep. 23, 2016, pp. 1-15.
Medoff, B.P., et al, "Iterative convolution back-projection algorithms for image reconstruction from limited data," Journal of the Optical Society of America, vol. 73, No. 11, Nov. 1, 1983, pp. 1493-1500. doi: 10.1364/JOSA.73.001493.
Melafind, Optics by Carl Zeiss, MELA Sciences 2015, pp. 1-4. [Webpage] [retrieved Oct. 23, 2015] URL: http://www.melafind.com/.
Meyer, R.R., et al, "A new method for the determination of the wave aberration function of high-resolution TEM. 2. Measurement of the antisymmetric aberrations," Ultramicroscopy, vol. 99, No. 2-3, May 2004, pp. 115-123. doi: 10.1016/j.ultramic.2003.11.001.
Miao, J., et al, "High Resolution 3D X-Ray Diffraction Microscopy," Physical Review Letters, vol. 89, No. 8, Aug. 19, 2002, pp. 088303-1-088303-4. doi: 10.1103/PhysRevLett.89.088303.
Mico, V., et al, "Synthetic aperture microscopy using off-axis illumination and polarization coding," Optics Communications, vol. 276, No. 2, Aug. 15, 2007, pp. 209-217. doi:10.1016/j.optcom.2007.04.020.
Mico, V., et al, "Synthetic aperture superresolution with multiple off-axis holograms," Journal of the Optical Society of America A, vol. 23, No. 12, Dec. 1, 2006, pp. 3162-3170. doi:10.1364/JOSAA.23.003162.
Mir, M., et al, "Blood screening using diffraction phase cytometry," Journal of Biomedical Optics: vol. 15, No. 2, Mar./Apr. 2010, pp. 027016-1-027014-4. doi: 10.1117/1.3369965 [retrieved on Feb. 6, 2015] URL: http://dx.doi.org/10.1117/1.3369965.
Mir, M. et al, "Optical measurement of cycle-dependent cell growth," Proceedings of the National Academy of Sciences (PNAS) vol. 108, No. 32, Aug. 9, 2011, pp. 13124-13129. doi:10.1073/pnas.1100506108.
Moreno, I., "Creating a desired lighting pattern with an LED array," Proceedings of SPIE, Eighth International Conference on Solid State Lighting, vol. 705811, Sep. 2, 2008, p. 9. doi: 10.1117/12.795673.
Mrejen, S., et al, "Adaptive Optics Imaging of Cone Mosaic Abnormalities in Acute Macular Neuroretinopathy," Ophthalmic Surgery, Lasers & Imaging Retina, vol. 45, No. 6, Nov./Dec. 2014, pp. 562-569. doi: 10.3928/23258160-20141118-12.

(56) References Cited

OTHER PUBLICATIONS

Muyo, et al., "Infrared imaging with a wavefront-coded singlet lens," Optics Express, vol. 17, Nov. 5, 2009, pp. 21118-21123.
Muyo, et al., "Wavefront coding for athermalization of infrared imaging systems," Proc. SPIE 5612, Dec. 6, 2004, pp. 227-235.
Nayar, S. K., et al, pre-published manuscript of "Fast separation of direct and global components of a scene using high frequency illumination," (Submitted 2006, this one (v.1)), Published in: ACM SIGGRAPH 2006 Papers, Boston, Massachusetts Jul.-Aug. 3, 2006, pp. 935-944. doi: http://dx.doi.org/10.1145/1179352.1141977.
Neumaier, "Solving ill-conditioned and singular linear systems: a tutorial on regularization," SIAM Rev. 40, (1998), pp. 636-666.
Ng, R., et al, "Light Field Photography with a Hand-held Plenoptic Camera," Stanford Tech Report, Computer Science Technical Report (CSTR) Apr. 20, 2005, vol. 2, No. 11, pp. 1-11. URL: https://classes.soe.ucsc.edu/cmps290b/Fall05/readings/lfcamera-150dpi.pdf.
Nomura, H., et al., "Techniques for measuring aberrations in lenses used in photolithography with printed patterns," Applied Optics, vol. 38, No. 13, May 1, 1999, pp. 2800-2807. doi:10.1364/AO.38.002800.
Ohlsson, H., et al, "Compressive Phase Retrieval From Squared Output Measurements Via Semidefinite Programming," arXiv:1111.6323, Technical Report; Nov. 28, 2011, pp. 6. URL: http://cds.cern.ch/record/1402765.
Ou, X., et al, "Aperture scanning Fourier ptychographic microscopy," Biomedical Optics Express, vol. 7, No. 8, Aug. 1, 2016, pp. 3140-3150. doi:10.1364/BOE.7.003140.
Ou, X., et al., "Embedded pupil function recovery for Fourier ptychographic microscopy," Optics Express, 2014, vol. 22(5), pp. 4960-4972.
Ou, X., et al, "High numerical aperture Fourier ptychography: principle, implementation and characterization," Optics Express, vol. 23, No. 3, Feb. 9, 2015, pp. 3472-3491. doi: 10.1364/oe.23.003472.
Ou. X., et al, pre-published manuscript of "Embedded pupil function recovery for Fourier ptychographic microscopy," (submitted on Dec. 26, 2013 (this version, v1); revised Feb. 12, 2014; accepted Feb. 17, 2014; published Feb. 24, 2014) pp. 1-13. doi: 10.1364/OE.22.004960.
Ou, X., et al, "Quantitative phase imaging via Fourier ptychographic microscopy," NIH-PA Author Manuscript; available in PMC Dec. 26, 2014. Published in final edited form as: Opt Lett. Nov. 15, 2013; 38(22): 4845-4848. doi: 10.1364/OL.38.004845.
Pacheco, S., et al, "Reflective Fourier Ptychography," Journal of Biomedical Optics, vol. 21, No. 2, Feb. 18, 2016, pp. 026010-1-026010-7. doi:10.1117/1.JBO.21.2.026010 [retrieved on Mar. 8, 2016] URL: http://biomedicaloptics.spiedigitallibrary.org.
Pan, et al., "Three-dimensional space optimization for near-field ptychography," Opt. Express 27, 5433-5446 (Feb. 18, 2019).
Pan, et al., "Subwavelength resolution Fourier ptychography with hemispherical digital condensers," Opt. Express 26, 23119-23131 (Sep. 3, 2018).
Pan, et al., "System calibration method for Fourier ptychographic microscopy," J. Biomed. Opt. 22, 096005 (Sep. 12, 2017).
Pankajakshan, P., "Blind Deconvolution for Confocal Laser Scanning Microscopy," Doctoral dissertation, Universite Nice Sophia Antipolis, 2009. URL: https://tel.archives-ouvertes.fr/tel-00474264.
Phillips, et al., "Multi-Contrast Imaging and Digital Refocusing on a Mobile Microscope with a Domed LED Array," PLoS One, vol. 10, No. 5, May 13, 2015, pp. 1-13. doi:10.1371/journal.pone.0124938.
Qian, et al., "Large-scale 3D imaging of insects with natural color," Opt. Express 27, 4845-4857 (Feb. 18, 2019).
Recht, B., et al, "Guaranteed Minimum-Rank Solutions of Linear Matrix Equations via Nuclear Norm Minimization," SIAM Review, vol. 52, No. 3, Aug. 5, 2010, pp. 471-501. doi: 10.1137/070697835 [retrieved on Nov. 20, 2015] URL:https://doi.org/10.1137/070697835.
Reinhard, et al, "High Dynamic Range Imaging: Acquisition, Display, and Image-based Lighting" Second Edition 5.2 HDR Image Capture: Morgan Kaufmann, May 28, 2010, pp. 148-151. ISBN: 9780123749147.
Reinig, et al., "Adaptative optics microscopy enhances image quality in deep layers of CLARITY processed brains of YFP-H mice" Proc., of SPIE, vol. 9690, (Mar. 9, 2016) pp. 969008-1-969008-12. doi:10.1117/12.2213283.
Rha, et al., "Adaptive optics flood-illumination camera for high speed retinal imaging," Opt. Express vol. 14, May 15, 2006, pp. 4552-4569.
Rodenburg, J. M., et al, "A phase retrieval algorithm for shifting illumination," Applied Physics Letters, vol. 85, No. 20, Nov. 15, 2004, pp. 4795-4797. doi: 10.1063/1.1823034.
Rodenburg, J. M., et al, "Hard-X-ray Lensless Imaging of Extended Objects," Physical Review Letters, vol. 98, No. 3, Jan. 19, 2007, pp. 034801-1-034801-4. doi: 10.1103/PhysRevLett.98.034801.
Rodenburg, J. M., et al, "The Theory of Super-Resolution Electron Microscopy Via Wigner-Distribution Deconvolution," Philosophical Transactions of the Royal Society A, vol. 339, No. 1655, Jun. 15, 1992, pp. 521-553. doi: 10.1098/rsta.1992.0050.
Rodenburg, J.M., "Ptychography and related Diffractive Imaging Methods," Adv. Imaging Electron Phys., vol. 150, Dec. 31, 2008, pp. 87-184. doi: 10.1016/S1076-5670(07)00003-1.
Rossi, E.A., et al, "In vivo imaging of retinal pigment epithelium cells in age related macular degeneration," Biomedical Optics Express, vol. 4, No. 11, Nov. 1, 2013, pp. 2527-2539. doi: 10./1364/BOE.4.002527].
Rowe, M., et al, "Polarization-difference imaging: a biologically inspired technique for observation through scattering media," Optics Letters, vol. 20, No. 6, Mar. 15, 1995, pp. 608-610. doi:10.1364/OL.20.000608.
Sankaranarayanan, Aswin C., et al, "CS-MUVI: Video Compressive Sensing for Spatial-Multiplexing Cameras," Proceedings of the IEEE International Conference Computational Photography (ICCP), Apr. 2012, pp. 11. doi:10.1109/ICCPhot.2012.6215212.
Sarder, et al. "Deconvolution Methods for 3-D Fluorescence Microscopy Images," IEEE Signal Processing Magazine, vol. 23, No. 3, May 2006, pp. 32-45.
Schechner, Y., "Multiplexing for Optimal Lighting," IEEE Transactions on Pattern Analysis and Machine Intelligence, vol. 29, No. 8, Aug. 2007, pp. 1339-1354. doi: 10.1109/TPAMI.2007.1151.
Schnars, U., et al, "Digital recording and numerical reconstruction of holograms," Measurement Science and Technology, vol. 13, No. 9, Aug. 7, 2002, pp. R85-R101. doi: 10.1088/0957-0233/13/9/201.
Schwarz, C., et al, "Imaging interferometric microscopy," Optics letters, vol. 28, No. 16, Aug. 15, 2003, pp. 1424-1426. doi: 10.1364/OL.28.001424.
Shechner, Y., et al, "Polarization-based vision through haze," Applied Optics, vol. 42, No. 3, Jan. 20, 2003, pp. 511-525. doi: 10.1364/AO.42.000511.
Shechtman, Y., et al, "Sparsity based sub-wavelength imaging with partially incoherent light via quadratic compressed sensing," Optics Express, vol. 19, No. 16, Aug. 1, 2011, pp. 14807-14822. doi:10.1364/OE.19.014807.
Shemonski, et al., "Computational high-resolution optical imaging of the living human retina," Nat. Photonics, vol. 9, Jul. 2015, pp. 440-443.
Shen, C., et al., "Computational aberration correction of VIS-NIR multispectral imaging microscopy based on Fourier ptychography" Optics Express, 2019. 27(18): 24923-24937.
Siegel, R., et al, "Cancer Statistics 2013," CA: A Cancer Journal for Clinicians, vol. 63, No. 1, Jan. 1, 2013, pp. 11-30. doi: 10.3322/caac.21166.
Soulez, et al., "Blind deconvolution of 3D data in wide field fluorescence microscopy" In 2012 9th IEEE International Symposium on Biomedical Imaging (ISBI) May 2, 2012, pp. 1735-1738.
Stoecker, W., et al, "Diagnostic Inaccuracy of Smartphone Applications for Melanoma Detection: Representative Lesion Sets and the Role for Adjunctive Technologies," JAMA Dermatology, vol. 149, No. 7, Jul. 1, 2013, pp. 884-884. doi: 10.1001/jamadermatol.2013.4334.

(56) References Cited

OTHER PUBLICATIONS

Sun, D., et al, "Estimating a signal from a magnitude spectrogram via convex optimization," arXiv preprint arXiv:1209.2076, Sep. 10, 2012, pp. 1-7. [retrieved Nov. 9, 2015] URL: https://arxiv.org/abs/1209.2076.
Sun, et al., "Sampling criteria for Fourier ptychographic microscopy in object space and frequency space," Optics Express vol. 24, No. 14, Jul. 11, 2016, pp. 15765-15781.
Sun, et al., "Efficient positional misalignment correction method for Fourier ptychographic microscopy," Biomedical Optics Express vol. 7, No. 4, Mar. 17, 2016, pp. 1336-1350.
Sun, et al., "Resolution-enhanced Fourier ptychographic microscopy based on high-numerical-aperture illuminations," Scientific Reports, vol. 7, No. 1187, Apr. 26, 2017, pp. 1-11.
Sun, J., "Coded multi-angular illumination for Fourier ptychography based on Hadamard codes," In Proc. SPIE, vol. 9524, Jul. 17, 2015, pp. 95242C-1-94242C-5. doi:10.1117/12.2189655 [retrieved Jul. 23, 2015] URL: http://proceedings.spiedigitallibrary.org.
Tam, K., et al, "Tomographical imaging with limited-angle input," Journal of the Optical Society of America, vol. 71, No. 5, May 1981, pp. 582-592. doi:doi.org/10.1364/JOSA.71.000582.
Thibault, P., et al, "High-resolution scanning X-ray diffraction microscopy," Science AAAS, vol. 321, No. 5887, Jul. 18, 2008, pp. 379-382. doi:10.1126/science.1158573.
Thibault, P. et al, "Probe retrieval in ptychographic coherent diffractive imaging," Ultramicroscopy, vol. 109, No. 4, Mar. 2009, pp. 338-343. doi:10.1016/j.ultramic.2008.12.011.
Thiébaut and Conan, "Strict a priori constraints for maximumlikelihood blind deconvolution," J. Opt. Soc. Am. A, vol. 12, No. 3, Mar. 1995, pp. 485-492.
Thomas, L., et al, "Semiological Value of ABCDE Criteria in the Diagnosis of Cutaneous Pigmented Tumors," Dermatology, vol. 197, No. 1, Jul. 13, 1998, p. 11-17. doi:10.1159/000017969.
Tian and Waller, "3D intensity and phase imaging from light field measurements in an LED array microscope," Optica vol. 2, No. 2, Feb. 2015, pp. 104-111.
Tian, L., et al, "3D differential phase-contrast microscopy with computational illumination using an LED array," Optics Letters, vol. 39, No. 5, Mar. 1, 2014, pp. 1326-1329. doi:10.1364/OL39.001326.
Tian, L., et al., "Computational illumination for high-speed in vitro Fourier ptychographic microscopy," Optica: Research Article, 2015, vol. 2(10), pp. 904-911.
Tian, L., et al., Multiplexed Coded Illumination for Fourier Ptychography with an LED Array Microscope, Biomedical Optics Express, 2014, vol. 5(7), pp. 1-14.
Tippie, A.E., et al, "High-resolution synthetic-aperture digital holography with digital phase and pupil correction," Optics Express, vol. 19, No. 13, Jun. 20, 2011, pp. 12027-12038. doi:10.1364/OE.19.012027.
Tomer et al., "Advanced CLARITY for rapid and high-resolution imaging of intact tissues," Nat. Protoc., vol. 9, No. 7, Jul. 2014, pp. 1682-1697.
Turpin, T., et al, "Theory of the synthetic aperture microscope," SPIE Proceedings, vol. 2566: Advanced Imaging Technologies and Commercial Applications, Aug. 23, 1995, pp. 230-240. [retrieved Mar. 16, 2015] URL: http://dx.doi.org/10.1117/12.217378.
Tyson, R., "Principles of Adaptive Optics" Third Ed., Series In Optics and Optoelectronics, CRC Press, Sep. 14, 2010, pp. 1-299. ISBN: 13: 978-1-4398-0859-7.
U.S. Corrected Notice of Allowance dated Aug. 4, 2022 in U.S. Appl. No. 14/658,019.
U.S. Corrected Notice of Allowance dated Dec. 12, 2024 in U.S. Appl. No. 17/652,667.
US Ex Parte Quayle Action dated Aug. 8, 2019 issued in U.S. Appl. No. 16/242,934.
U.S. Final Office Action dated Apr. 1, 2024 in U.S. Appl. No. 17/455,640.
U.S. Final Office Action dated Apr. 18, 2023 in U.S. Appl. No. 17/455,640.
U.S. Final Office Action dated Apr. 3, 2017 in U.S. Appl. No. 14/065,280.
U.S. Final Office Action dated Dec. 10, 2018 issued in U.S. Appl. No. 15/003,559.
U.S. Final Office Action dated Dec. 14, 2017 in U.S. Appl. No. 14/960,252.
U.S Final Office Action dated Dec. 28, 2017 in U.S. Appl. No. 14/710,947.
U.S. Final Office Action dated Jan. 17, 2018 in U.S. Appl. No. 14/658,019.
U.S. Final Office Action dated Jan. 23, 2017 in U.S. Appl. No. 15/007,196.
U.S. Final Office Action dated Jul. 27, 2017 in U.S. Appl. No. 15/003,559.
U.S. Final Office Action dated Jun. 19, 2019 issued in U.S. Appl. No. 15/068,389.
U.S. Final Office Action dated Jun. 3, 2019 in U.S. Appl. No. 15/959,050.
U.S. Final Office Action dated Jun. 6, 2018 issued in U.S. Appl. No. 15/068,389.
U.S. Final Office Action dated May 1, 2020 issued in U.S. Appl. No. 16/252,465.
U.S. Final Office Action dated May 30, 2019 in U.S. Appl. No. 14/658,019.
U.S. Final Office Action dated May 30, 2019 in U.S. Appl. No. 14/979,154.
U.S. Final Office Action dated Nov. 29, 2018 in U.S. Appl. No. 14/065,280.
U.S. Final Office Action dated Oct. 29, 2020 in U.S. Appl. No. 14/658,019.
U.S. Non-Final Office Action dated Apr. 30, 2024 in U.S. Appl. No. 17/652,667.
U.S. Non-Final Office Action dated Oct. 12, 2023, in U.S. Appl. No. 17/455,640.
U.S. Non-Final Office Action dated Oct. 20, 2022, in U.S. Appl. No. 17/455,640.
U.S. Notice of Allowance dated Apr. 13, 2016 in U.S. Appl. No. 14/448,850.
U.S. Notice of Allowance dated Apr. 13, 2022 in U.S. Appl. No. 14/658,019.
U.S. Notice of Allowance dated Apr. 16, 2019 in U.S. Appl. No. 15/820,295.
U.S. Notice of Allowance dated Apr. 19, 2019 in U.S. Appl. No. 15/963,966.
U.S. Notice of Allowance dated Apr. 22, 2016 in U.S. Appl. No. 14/466,481.
U.S. Notice of Allowance dated Apr. 29, 2019 issued in U.S. Appl. No. 15/620,674.
U.S. Notice of Allowance dated Apr. 3, 2020 in U.S. Appl. No. 16/162,271.
U.S. Notice of Allowance dated Apr. 6, 2021 issued in U.S. Appl. No. 16/552,948.
U.S. Notice of Allowance dated Apr. 7, 2020 issued in U.S. Appl. No. 16/179,688.
U.S. Notice of Allowance dated Aug. 12, 2019 in U.S. Appl. No. 14/960,252.
U.S. Notice of Allowance dated Aug. 14, 2019 issued in U.S. Appl. No. 15/620,674.
U.S. Notice of Allowance dated Aug. 16, 2017 in U.S. Appl. No. 15/209,604.
U.S. Notice of Allowance dated Aug. 23, 2016 in U.S. Appl. No. 14/466,481.
U.S. Notice of Allowance dated Dec. 4, 2015 in U.S. Appl. No. 14/065,305.
U.S. Notice of Allowance dated Dec. 4, 2017 in U.S. Appl. No. 14/065,305.
U.S. Notice of Allowance dated Dec. 9, 2019 in U.S. Appl. No. 16/162,271.
US Notice of Allowance dated Feb. 18, 2020 issued in U.S. Appl. No. 16/242,934.
U.S. Notice of Allowance dated Feb. 9, 2018 in U.S. Appl. No. 15/081,659.

(56) References Cited

OTHER PUBLICATIONS

U.S. Notice of Allowance dated Jan. 13, 2017 in U.S. Appl. No. 14/065,305.
U.S. Notice of Allowance dated Jan. 14, 2016 in U.S. Appl. No. 14/448,850.
U.S. Notice of Allowance dated Jan. 14, 2019 in U.S. Appl. No. 15/820,295.
U.S. Notice of Allowance dated Jan. 15, 2019 issued in U.S. Appl. No. 15/620,674.
U.S. Notice of Allowance dated Jan. 17, 2020 issued in U.S. Appl. No. 15/003,559.
U.S. Notice of Allowance dated Jan. 22, 2016 in U.S. Appl. No. 14/466,481.
U.S. Notice of Allowance dated Jan. 23, 2018 in U.S. Appl. No. 15/206,859.
U.S. Notice of Allowance dated Jan. 24, 2020 issued in U.S. Appl. No. 15/068,389.
U.S. Notice of Allowance dated Jan. 26, 2018 in U.S. Appl. No. 15/209,604.
U.S. Notice of Allowance dated Jan. 29, 2020 issued in U.S. Appl. No. 14/065,280.
U.S. Notice of Allowance dated Jan. 6, 2020 in U.S. Appl. No. 14/960,252.
U.S. Notice of Allowance dated Jul. 16, 2018 in U.S. Appl. No. 15/007,159.
U.S. Notice of Allowance dated Jul. 25, 2018 in U.S. Appl. No. 14/710,947.
U.S. Notice of Allowance dated Jun. 20, 2017 in U.S. Appl. No. 14/572,493.
U.S. Notice of Allowance dated Jun. 27, 2018 in U.S. Appl. No. 15/636,494.
U.S. Notice of Allowance dated Jun. 9, 2017 in U.S. Appl. No. 15/007,196.
U.S. Notice of Allowance dated Jun. 9, 2017 in U.S. Appl. No. 14/065,305.
U.S. Notice of Allowance dated Jun. 9, 2017 in U.S. Appl. No. 15/206,859.
U.S. Notice of Allowance dated Mar. 2, 2020 in U.S. Appl. No. 14/979,154.
U.S. Notice of Allowance dated Mar. 22, 2017 in U.S. Appl. No. 15/007,196.
U.S. Notice of Allowance dated Mar. 31, 2017 in U.S. Appl. No. 14/572,493.
U.S. Notice of Allowance dated Mar. 8, 2017 in U.S. Appl. No. 14/572,493.
U.S. Notice of Allowance dated Nov. 2, 2016 in U.S. Appl. No. 14/572,493.
U.S. Notice of Allowance dated Nov. 20, 2019 in U.S. Appl. No. 15/959,050.
US Notice of Allowance dated Nov. 4, 2019 issued in U.S. Appl. No. 16/242,934.
U.S. Notice of Allowance dated Oct. 11, 2017 in U.S. Appl. No. 14/572,493.
U.S. Notice of Allowance dated Oct. 19, 2018 issued in U.S. Appl. No. 15/160,941.
U.S. Notice of Allowance dated Oct. 20, 2017 in U.S. Appl. No. 15/081,659.
U.S. Notice of Allowance dated Oct. 25, 2024 in U.S. Appl. No. 17/455,640.
U.S. Notice of Allowance dated Oct. 5, 2018 in U.S. Appl. No. 15/636,494.
U.S. Notice of Allowance dated Sep. 1, 2017 in U.S. Appl. No. 15/206,859.
U.S. Notice of Allowance dated Sep. 16, 2019 issued in U.S. Appl. No. 15/068,389.
U.S. Notice of Allowance dated Sep. 17, 2018 in U.S. Appl. No. 15/820,295.
U.S. Notice of Allowance dated Sep. 17, 2019 in U.S. Appl. No. 14/960,252.
U.S. Notice of Allowance dated Sep. 20, 2017 in U.S. Appl. No. 15/007,196.
U.S. Notice of Allowance dated Sep. 25, 2019 issued in U.S. Appl. No. 15/620,674.
U.S. Notice of Allowance dated Sep. 25, 2024 in U.S. Appl. No. 17/652,667.
U.S Office Action dated Apr. 13, 2018 issued in U.S. Appl. No. 15/160,941.
U.S. Office Action dated Apr. 4, 2018 issued in U.S. Appl. No. 15/003,559.
U.S. Office Action dated Apr. 4, 2019 in U.S. Appl. No. 16/162,271.
U.S. Office Action dated Aug. 16, 2016 in U.S. Appl. No. 14/065,280.
U.S. Office Action dated Aug. 28, 2020 in U.S. Appl. No. 16/572,497.
U.S. Office Action dated Aug. 31, 2017 in U.S. Appl. No. 15/636,494.
U.S. Office Action dated Aug. 7, 2020 issued in U.S. Appl. No. 16/552,948.
U.S. Office Action dated Dec. 13, 2018 in U.S. Appl. No. 14/960,252.
U.S. Office Action dated Dec. 26, 2018 in U.S. Appl. No. 15/959,050.
U.S. Office Action dated Dec. 26, 2018 in U.S. Appl. No. 15/963,966.
U.S. Office Action dated Feb. 21, 2017 in U.S. Appl. No. 14/960,252.
U.S. Office Action dated Jan. 17, 2019 issued in U.S. Appl. No. 15/068,389.
U.S. Office Action dated Jan. 25, 2018 in U.S. Appl. No. 14/065,280.
U.S. Office Action dated Jan. 9, 2020 in U.S. Appl. No. 14/658,019.
U.S. Office Action dated Jul. 14, 2016 in U.S. Appl. No. 15/007,196.
U.S. Office Action dated Jun. 10, 2021 in U.S. Appl. No. 14/658,019.
U.S. Office Action dated Jun. 26, 2019 issued in U.S. Appl. No. 14/065,280.
U.S. Office Action dated Jun. 26, 2019 issued in U.S. Appl. No. 15/003,559.
U.S. Office Action dated Mar. 13, 2017 in U.S. Appl. No. 14/658,019.
U.S. Office Action dated Mar. 24, 2017 in U.S. Appl. No. 14/710,947.
U.S. Office Action dated Mar. 8, 2019 in U.S. Appl. No. 16/171,270.
U.S. Office Action dated May 19, 2017 in U.S. Appl. No. 15/081,659.
U.S. Office Action dated May 25, 2021 issued in U.S. Appl. No. 16/864,618.
U.S. Office Action dated Nov. 22, 2016 in U.S. Appl. No. 15/003,559.
U.S. Office Action dated Nov. 3, 2017 in U.S. Appl. No. 15/068,389.
U.S. Office Action dated Nov. 30, 2017 in U.S. Appl. No. 15/007,159.
U.S. Office Action dated Oct. 11, 2019 issued in U.S. Appl. No. 16/179,688.
U.S. Office Action dated Oct. 4, 2018 in U.S. Appl. No. 14/658,019.
U.S. Office Action dated Oct. 5, 2015 in U.S. Appl. No. 14/065,305.
U.S. Office Action dated Sep. 16, 2016 in U.S. Appl. No. 14/065,305.
U.S. Office Action dated Sep. 23, 2019 issued in U.S. Appl. No. 16/252,465.
U.S. Office Action dated Sep. 7, 2018 in U.S. Appl. No. 14/979,154.
U.S. Office Action Interview Summary dated May 3, 2018 in U.S. Appl. No. 15/068,389.
Vulovic, M., et al, "When to use the projection assumption and the weak-phase object approximation in phase contrast cryo-EM," Ultramicroscopy, vol. 136, Jan. 2014, pp. 61-66. doi:10.1016/j.ultramic.2013.08.002.
Wade, et al., "A fast, robust pattern recognition system for low light level image registration and its application to retinal imaging," Optics Express vol. 3, No. 5, Aug. 31, 1998, pp. 190-197.
Waldspurger, I., et al, "Phase recovery, MaxCut and complex semidefinite programming," Mathematical Programming, vol. 149, No. 1-2, Feb. 2015, pp. 47-81. doi: 10.1007/s10107-013-0738-9.
Wang, Q., et al, "Adaptive Optics Microperimetry and OCT Images Show Preserved Function and Recovery of Cone Visibility in Macular Telangiectasia Type 2 Retinal Lesions," Investigative Ophthalmology Visual Science, vol. 56, No. 2, Feb. 2015, pp. 778-786. doi:10.1167/iovs.14-15576 [retrieved on Apr. 5, 2016] [URL: http://iovs.arvojournals.org].
Wang, Z., et al, "Tissue refractive index as marker of disease," Journal of Biomedical Optics, vol. 16, No. 11, Nov. 2011, pp. 116017-1-16017-7. doi:10.1117/1.3656732.
Watanabe, M., et al, "Telecentric optics for focus analysis," IEEE Transactions on Pattern Analysis and Machine Intelligence: Short Papers, vol. 19, No. 12, Dec. 1997, pp. 1360-1365. doi:10.1109/34.643894.

(56) References Cited

OTHER PUBLICATIONS

Weigert, Martin, et al, "Content-aware image restoration: pushing the limits of fluorescence microscopy" Nature methods, 2018. 15(12): 1090-1097.

Wesner, J., et al, "Reconstructing the pupil function of microscope objectives from the intensity PSF," Proc. SPIE 4767, Current Developments in Lens Design and Optical Engineering III, 32 (Oct. 1, 2002), pp. 32-43. doi: 10.1117/12.451320 [retrieved Dec. 16, 2015] URL: http://proceedings.spiedigitallibrary.org.

Williams. A et al, "Fourier ptychographic microscopy for filtration-based circulating tumor cell enumeration and analysis," Journal of Biomedical Optics, vol. 19, No. 6, Jun. 20, 2014, pp. 066007.1-66007.8.< doi:10.1117 1.jbo.19.6.066007=""> [retrieved Feb. 10, 2016]< url: http://biomedicaloptics.spiedigitallibrary.org</url:.</doi:10.1117>.

Williams, D., "Imaging Single Cells in the Living Retina," Vis. Res. 51, pp. 1379-1396 (Jul. 1, 2011).

Wills, S., "Synthetic Apertures for the Optical Domain," Optics & Photonics News Article [webpage], The Optical Society (OSA), Apr. 18, 2017, pp. 2. URL:https://www.osa-opn.org/home/newsroom/2017/april/synthetic_apertures_for_the_optical_domain/.

Wolf, J., et al, "Diagnostic Inaccuracy of Smartphone Applications for Melanoma Detection," JAMA Dermatol. Author Manuscript; available in PMC May 13, 2014. Published in final edited form as: JAMA Dermatol. Apr. 2013; 149(4): 422-426. doi:10.1001/jamadermatol.2013.2382.

Wu, J., et al, "Focal plane tuning in wide-field-of-view microscope with Talbot pattern illumination," Optics Letters, vol. 36, No. 12, Jun. 15, 2011, pp. 2179-2181. doi:145985.

Wu, J., et al, "Harmonically matched grating-based full-field quantitative high-resolution phase microscope for observing dynamics of transparent biological samples," Optics Express, vol. 15, No. 26, Dec. 24, 2007, pp. 18141-18155. doi:10.1364/OE.15.018141.

Wu, J., et al, "Paired-angle-rotation scanning optical coherence tomography forward-imaging probe," Optics Letters, vol. 31, No. 9, May 1, 2006, pp. 1265-1267. doi:10.1364/OL.31.001265.

Wu, J., et al, "Wide field-of-view microscope based on holographic focus grid illumination," Optics Letters, vol. 35, No. 13, Jul. 1, 2010, pp. 2188-2190. doi:10.1364/OL.35.002188.

Wu, Yichen, et al, "Three-dimensional virtual refocusing of fluorescence microscopy images using deep learning" Nature methods, 2019. 16(12): 1323-1331.

Xu, W., et al, "Digital in-line holography for biological applications," Proceedings of the National Academy of Sciences of the USA (PNAS), vol. 98, No. 20, Sep. 25, 2001, pp. 11301-11305. doi:10.1073/pnas.191361398.

Yaroslavsky, "Image Resampling and Building Continuous Image Models", Chapter 6, Theoretical Foundations of Digital Imaging Using MATLAB , pp. 293-342 (CRC Press, 1 edition, Nov. 26, 2012).

Yeh, L., et al., "Experimental robustness of Fourier ptychography phase retrieval algorithms," Optics Express, 2015, vol. 23(26), pp. 33214-33240.

Yuan, C., et al, "Angular multiplexing in pulsed digital holography for aperture synthesis," Optics Letters, vol. 33, No. 20, Oct. 15, 2008, pp. 2356-2358. doi:10.1364/OL.33.002356.

Yuan, et al., "Image deblurring with blurred/noisy image pairs," ACM Trans. Graph. 26, Jul. 29, 2007, pp. 1-10.

Zeiss, C., "Microscopy: Cells Need The Perfect Climate. System Solutions for Live Cell Imaging under Physiological Conditions," ZEISS Product Brochure, Carl Zeiss Microscopy GmbH Co., Feb. 2008, pp. 42. URL: http://www.zeiss.de/incubation.

Zhang, Y., et al, "Self-learning based Fourier ptychographic microscopy," Optics Express, vol. 23, No. 14, Jul. 13, 2015, pp. 18471-18486. doi: 10.1364/OE.23.018471.

Zhang, Y., et al, "Photoreceptor perturbation around subretinal drusenoid deposits as revealed by adaptive optics scanning laser ophthalmoscopy," HHS Public Access, Am J Ophthalmol. Author Manuscript, Sep. 1, 2015, pp. 22. (Published in final edited form as: Am J Ophthalmol. Sep. 2014; 158(3): 584-96.e1.).

Zheng, G., et al, "0.5 gigapixel microscopy using a flatbed scanner," Biomedical Optics Express, vol. 5, No. 1, Jan. 1, 2014, pp. 1-8. doi: 10.1364/BOE.5.000001.

Zheng, G., et al, "Characterization of spatially varying aberrations for wide field-of-view microscopy," Optics Express, vol. 21, No. 13, Jul. 1, 2013, pp. 15131-15143. doi:10.1364/OE.21.015131.

Zheng, G., et al, "Microscopy refocusing and dark-field imaging by using a simple LED array," Optics Letters, vol. 36, No. 20, Oct. 15, 2011, pp. 3987-3989. doi: 10.1364/OL.36.003987.

Zheng, G., et al, "Sub-pixel resolving optofluidic microscope for on-chip cell imaging," Lab Chip, vol. 10, Sep. 29, 2010, pp. 3125-3129. doi:10.1039/c0Lc00213e [retrieved on Oct. 4, 2010] URL: http://pubs.rsc.org.

Zheng, G., et al., "Wide-field, high-resolution Fourier ptychographic microscopy," Nature photonics, 2013, vol. 7(9), pp. 739-745.

Zheng, G., "Fourier Ptychographic Imaging: A MATLAB tutorial," IOP Concise Physics, Morgan & Claypool Publication, San Rafael, CA., May 2016, pp. 96. ISBN: 978-1-6817-4272-4 (ebook) doi: 10.1088/978-1-6817-4273-1.

Zheng, G. "The ePetri dish, an on-chip cell imaging platform based on subpixel perspective sweeping microscopy (SPSM)," PNAS Early Edition, Published online before print Oct. 3, 2011, pp. 6. doi:10.1073/pnas.1110681108.

Zhou, et al., "What are Good Apertures for Defocus Deblurring," in 2009 IEEE International Conference on Computational Photography (IEEE, Apr. 16-17, 2009), pp. 1-8.

U.S. Appl. No. 17/652,667, Inventors Yang et al., filed Feb. 25, 2022.

U.S. Appl. No. 18/970,827, inventors Yang C et al., filed Dec. 5, 2024.

Office Action (Non-Final Rejection) dated Aug. 6, 2026 for U.S. Appl. No. 18/970,827 (pp. 1-21).

* cited by examiner

100(a)

100(b)

100(c)

FOURIER PTYCHOGRAPHIC IMAGING SYSTEMS, DEVICES, AND METHODS

CROSS-REFERENCES TO RELATED APPLICATIONS

This application is a continuation of U.S. Pat. No. 17,455,640, titled titled "Fourier Ptychographic Imaging Systems, Devices, and Methods," filed on Nov. 18, 2021, which is a continuation of U.S. patent application Ser. No. 16/864,618, titled "Fourier Ptychographic Imaging Systems, Devices, and Methods," filed on May 1, 2020, which is a continuation of U.S. patent application Ser. No. 14/065,280, titled "Fourier Ptychographic Imaging Systems, Devices, and Methods," filed on Oct. 28, 2013, which claims priority to U.S. Provisional Application No. 61/720,258, titled "Breaking the Spatial Product Barrier via Non-Interferometric Aperture-Synthesizing Microscopy (NAM)" and filed on Oct. 30, 2012, and to U.S. Provisional Application No. 61/847,472, titled "Fourier Ptychographic Microscopy" and filed on Jul. 17, 2013; each of these applications is hereby incorporated by reference in its entirety and for all purposes. U.S. patent application Ser. No. 14/065,280 is also related to U.S. patent application Ser. No. 14/065,305, titled "Fourier Ptychographic X-ray Imaging Systems, Devices, and Methods," filed on Oct. 28, 2013, which is hereby incorporated by reference in its entirety and for all purposes.

FEDERALLY SPONSORED RESEARCH OR DEVELOPMENT

This invention was made with government support under Grant No. OD007307 awarded by the National Institutes of Health. The government has certain rights in the invention.

BACKGROUND OF THE INVENTION

Embodiments of the present disclosure generally relate to wide field-of-view, high-resolution digital imaging techniques. More specifically, certain embodiments relate to Fourier ptychographic imaging (FPI) devices, systems and methods for wide-field, high-resolution imaging.

The throughput of a conventional imaging platform (e.g., microscope) is generally limited by the space-bandwidth product defined by its optical system. The space-bandwidth product refers to the number of degrees of freedom (e.g., number of resolvable pixels) that the optical system can extract from an optical signal, as discussed in Lohmann, A. W., Dorsch, R. G., Mendlovic, D., Zalevsky, Z. & Ferreira, C., "Space-bandwidth product of optical signals and systems," J. Opt. Soc. Am. A 13, pages 470-473 (1996), which is hereby incorporated by reference in its entirety. A conventional microscope typically operates with a space-bandwidth product on the order of 10 megapixels, regardless of the magnification factor or numerical aperture (NA) of its objective lens. For example, a conventional microscope with a ×20, 0.40 NA objective lens has a resolution of 0.8 mm and a field-of-view of 1.1 mm in diameter, which corresponds to a space-bandwidth product of about 7 megapixels. Prior attempts to increase space-bandwidth product of conventional microscopes have been confounded by the scale-dependent geometric aberrations of their objective lenses, which results in a compromise between image resolution and field-of-view. Increasing the space-bandwidth product of conventional imaging platforms may be limited by: 1) scale-dependent geometric aberrations of its optical system, 2) constraints of the fixed mechanical length of the relay optics and the fixed objective parfocal length, and/or 3) availability of gigapixel digital recording devices.

Some attempts to increase the spatial-bandwidth product using interferometric synthetic aperture techniques are described in Di, J. et al., "High resolution digital holographic microscopy with a wide field of view based on a synthetic aperture technique and use of linear CCD scanning," *Appl. Opt.* 47, pp. 5654-5659 (2008); Hillman, T. R., Gutzler, T., Alexandrov, S. A., and Sampson, D. D., "High-resolution, wide-field object reconstruction with synthetic aperture Fourier holographic optical microscopy," *Opt. Express* 17, pp. 7873-7892 (2009); Granero, L., Micó, V., Zalevsky, Z., and García, J., "Synthetic aperture superresolved microscopy in digital lensless Fourier holography by time and angular multiplexing of the object information," *Appl. Opt.* 49, pp. 845-857 (2010); Kim, M. et al., "High-speed synthetic aperture microscopy for live cell imaging," *Opt. Lett.* 36, pp. 148-150 (2011); Turpin, T., Gesell, L., Lapides, J., and Price, C., "Theory of the synthetic aperture microscope," pp. 230-240; Schwarz, C. J., Kuznetsova, Y., and Brueck, S., "Imaging interferometric microscopy," *Optics letters* 28, pp. 1424-1426 (2003); Feng, P., Wen, X., and Lu, R., "Long-working-distance synthetic aperture Fresnel off-axis digital holography," *Optics Express* 17, pp. 5473-5480 (2009); Mico, V., Zalevsky, Z., Garcia-Martinez, P., and Garcia, J., "Synthetic aperture superresolution with multiple off-axis holograms," *JOSA A* 23, pp. 3162-3170 (2006); Yuan, C., Zhai, H., and Liu, H., "Angular multiplexing in pulsed digital holography for aperture synthesis," *Optics Letters* 33, pp. 2356-2358 (2008); Mico, V., Zalevsky, Z., and Garcia, J., "Synthetic aperture microscopy using off-axis illumination and polarization coding," *Optics Communications*, pp. 276, 209-217 (2007); Alexandrov, S., and Sampson, D., "Spatial information transmission beyond a system's diffraction limit using optical spectral encoding of the spatial frequency," *Journal of Optics A: Pure and Applied Optics* 10, 025304 (2008); Tippie, A. E., Kumar, A., and Fienup, J. R., "High-resolution synthetic-aperture digital holography with digital phase and pupil correction," *Opt. Express* 19, pp. 12027-12038 (2011); Gutzler, T., Hillman, T. R., Alexandrov, S. A., and Sampson, D. D., "Coherent aperture-synthesis, wide-field, high-resolution holographic microscopy of biological tissue," *Opt. Lett.* 35, pp. 1136-1138 (2010); and Alexandrov, S. A., Hillman, T. R., Gutzler, T., and Sampson, D. D., "Synthetic aperture Fourier holographic optical microscopy," *Phil. Trans. R. Soc. Lond. A* 339, pp. 521-553 (1992), which are hereby incorporated by reference in their entirety. Most of these attempts use setups that record both intensity and phase information using interferometric holography approaches, such as off-line holography and phase-shifting holography. The recorded data is then synthesized in the Fourier domain in a deterministic manner.

These previous attempts to increase spatial-bandwidth product using interferometric synthetic aperture techniques have limitations. For example, interferometric holography recordings typically used in these techniques require highly-coherent light sources. As such, the reconstructed images tend to suffer from various coherent noise sources, such as speckle noise, fixed pattern noise (induced by diffraction from dust particles and other optical imperfections in the beam path), and multiple interferences between different optical interfaces. The image quality is, therefore, not comparable to that of a conventional microscope. On the other hand, the use of an off-axis holography approach sacrifices useful spatial-bandwidth product (i.e., the total pixel number) of the image sensor, as can be found in Schnars, U. and Jüptner, W. P. O., "Digital recording and numerical reconstruction of holograms," *Measurement Science and Technology,* 13, R85 (2002), which is hereby incorporated by reference in its entirety. Another limitation is that interferometric imaging may be subjected to uncontrollable phase fluctuations between different measurements. Hence, a priori and accurate knowledge of the specimen location may be needed for setting a reference point in the image recovery process (also known as phase referring). Another limitation is that previously reported attempts require mechanical scanning, either for rotating the sample or for changing the illumination angle. Therefore, precise optical alignments, mechanical control at the sub-micron level, and associated maintenances are needed for these systems. In terms of the spatial-bandwidth product, these systems present no advantage as compared to a conventional microscope with sample scanning and image stitching. Another limitation is that previous interferometric synthetic aperture techniques are difficult to incorporate into most existing microscope platforms without substantial modifications. Furthermore, color imaging capability has not been demonstrated on these platforms. Color imaging capability has proven pivotal in pathology and histology applications.

In microscopy, a large spatial-bandwidth product is highly desirable for biomedical applications such as digital pathology, haematology, phytotomy, immunohistochemistry, and neuroanatomy. A strong need in biomedicine and neuroscience to digitally image large numbers of histology slides for analysis has prompted the development of sophisticated mechanical scanning microscope systems and lensless microscopy set-ups. Typically, these systems increase their spatial-bandwidth product using complex mechanical means that have high precision and accurate components to control actuation, optical alignment and motion tracking. These complex components can be expensive to fabricate and difficult to use.

Previous lensless microscopy methods such as digital in-line holography and contact-imaging microscopy also present certain drawbacks. For example, conventional digital in-line holography does not work well for contiguous samples and contact-imaging microscopy requires a sample to be in close proximity to the sensor. Examples of digital in-line holography devices can be found in Denis, L., Lorenz, D., Thiebaut, E., Fournier, C. and Trede, D., "Inline hologram reconstruction with sparsity constraints," *Opt. Lett.* 34, pp. 3475-3477 (2009); Xu, W., Jericho, M., Meinertzhagen, I., and Kreuzer, H., "Digital in-line holography for biological applications," *Proc. Natl Acad. Sci. USA* 98, pp. 11301-11305 (2001); and Greenbaum, A. et al., "Increased space-bandwidth product in pixel super-resolved lensfree on-chip microscopy," *Sci. Rep.* 3, page 1717 (2013), which are hereby incorporated by reference in their entirety. Examples of contact-imaging microscopy can be found in Zheng, G., Lee, S. A., Antebi, Y., Elowitz, M. B. and Yang, C., "The ePetri dish, an on-chip cell imaging platform based on subpixel perspective sweeping microscopy (SPSM)," *Proc. Natl Acad. Sci. USA* 108, pp. 16889-16894 (2011); and Zheng, G., Lee, S. A., Yang, S. & Yang, C., "Sub-pixel resolving optofluidic microscope for on-chip cell imaging," *Lab Chip* 10, pages 3125-3129 (2010), which are hereby incorporated by reference in their entirety.

BRIEF SUMMARY OF THE INVENTION

Embodiments of the present disclosure provide Fourier ptychographic imaging (FPI) methods, devices, and systems for wide-field, high-resolution imaging as used in applications such as, for example, digital pathology, haematology, semiconductor wafer inspection, and X-ray and electron imaging. An example of an FPI device is a Fourier ptychographic microscope (FPM), which may also be referred to as employing non-interferometric aperture-synthesizing microscopy (NAM).

In some embodiments, an FPI system includes a variable illuminator, optical element, radiation detector, and a processor. The variable illuminator illuminates a specimen from a plurality of N different incidence angles at different sample times. The optical element filters light issuing from the specimen. The radiation detector captures a plurality of variably-illuminated (perspective) low-resolution intensity images. The processor iteratively stitches together the variably-illuminated, low-resolution images of overlapping regions in Fourier space to recover a wide-field, high-resolution image. In certain embodiments, the FPI device may also correct for aberrations and digitally refocus the complex high-resolution image, which can digitally extend the depth of focus of the FPI system beyond the physical limitations of its optical element.

One embodiment provides a Fourier ptychographic imaging device comprising a variable illuminator for providing illumination to a specimen from a plurality of incidence angles, an optical element for filtering illumination issuing from the specimen, and a detector for acquiring a plurality of variably-illuminated, low-resolution intensity images of the specimen based on light filtered by the optical element. The Fourier ptychographic imaging device also comprises a processor for computationally reconstructing a high-resolution image of the specimen by iteratively updating overlapping regions in Fourier space with the variably-illuminated, low-resolution intensity images. In one case, the variable illuminator is a two-dimensional matrix of light elements (e.g., light-emitting diodes), each light element providing illumination from one of the plurality of incidence angles. In one example, each light element of the two-dimensional matrix comprises three quasi-monochromatic light sources and the processor computationally reconstructs high-resolution images corresponding to the three quasi-monochromatic light sources, and combines the high-resolution images to generate a color high-resolution image.

Another embodiment provides a method of Fourier ptychographic imaging. The method illuminates a specimen being imaged from a plurality of incidence angles using a variable illuminator and filters light issuing from (e.g., scattered by) the specimen using an optical element. The method also captures a plurality of variably-illuminated, low-resolution intensity images of the specimen using a detector. Also, the method computationally reconstructs a high-resolution image of the specimen by iteratively updating overlapping regions of variably-illuminated, low-resolution intensity images in Fourier space. In one case, the method initializes a current high-resolution image in Fourier space, filters an filtering an overlapping region of the current high-resolution image in Fourier space to generate a low-resolution image for an incidence angle of the plurality of incidence angles, replaces the intensity of the low-resolution image with an intensity measurement, and updates the overlapping region in Fourier space with the low-resolution image with measured intensity. In this case, the filtering, replacing, and updating steps may be performed for the plurality of incidence angles. In another case, the method divides each variably-illuminated, low-resolution intensity image into a plurality of variably-illuminated, low-resolution intensity tile images, recovers a high-resolution image for each tile by iteratively updating overlapping regions of variably-illuminated, low-resolution intensity tile images in Fourier space, and combines the high resolution images of the tiles to generate the high-resolution image of the specimen.

Another embodiment provides a method of Fourier ptychographic imaging that receives a plurality of variably-illuminated, low-resolution intensity images of a specimen and computationally reconstructs a high-resolution image of the specimen by iteratively updating overlapping regions of variably-illuminated, low-resolution intensity images in Fourier space. In one case, the method divides each variably-illuminated, low-resolution intensity image into a plurality of variably-illuminated, low-resolution intensity tile images, recovers a high-resolution image for each tile by iteratively updating overlapping regions of variably-illuminated, low-resolution intensity tile images in Fourier space, and combines the high-resolution images of the tiles. In another case, the method initializes a current high-resolution image in Fourier space, filters an overlapping region of the current high-resolution image in Fourier space to generate a low-resolution image for an incidence angle of the plurality of incidence angles, replaces intensity of the low-resolution image with an intensity measurement, and updates the overlapping region in Fourier space with the low-resolution image with measured intensity. In this case, the filtering, replacing, and updating steps may be performed for the plurality of incidence angles.

BRIEF DESCRIPTION OF THE DRAWINGS

FIG. 5B(12) are regions updated in Fourier space associated with low-resolution measurements of FIGS. 5B(1), 5B(2), 5B(3), 5B(4), 5B(5), 5B(6), 5B(7), 5B(8), and 5B(9).

FIGS. 5B(10) and 5B(11) are the recovered high-resolution intensity and phase images resulting from the updating of FIG. 5B(12).

FIG. 10B(1) is a schematic diagram of the experimental setup of an FPI device performing an FPI method with digital refocusing, according to an embodiment.

FIGS. 10B(2)-(16) are images of the experimental results from performing the FPI method with digital refocusing according the experimental setup in FIG. 10B(1).

FIGS. 11A(2) and 11A(3) are images illustrating the numerical aperture for the 2× objective lens in a conventional microscope.

FIGS. 11A(4) and 11A(5) are images illustrating the numerical aperture for the 20× objective lens in a conventional microscope.

FIGS. 11A(6) and FIG. 11A(7) are color images showing the field-of-view and corresponding maximum NA of an FPI system, according to an embodiment of the invention.

DETAILED DESCRIPTION OF THE INVENTION

Embodiments of the present invention will be described below with reference to the accompanying drawings. Although embodiments of FPI systems, devices, and methods may be described herein with respect to illumination with visible light radiation, these FPI systems, devices, and methods may also be used with other forms of radiation such as, for example, acoustic waves, Terahertz waves, microwaves, and X-rays.

Some embodiments include an FPI system comprising a variable illuminator, optical element, radiation detector, and a processor. The variable illuminator successively illuminates a specimen being imaged with plane waves at a plurality of N different incidence angles. The optical element filters light issuing from the specimen. The optical element may be, for example, an objective lens that accepts light issuing from the specimen based on its numerical aperture. In some cases, the optical element may be a low numerical aperture objective lens that provides a corresponding narrow acceptance angle and increased depth of field. The radiation detector detects light filtered by the optical element and captures a plurality of N low-resolution intensity images corresponding to the N different incidence angles. The processor iteratively stitches together overlapping low-resolution intensity images in Fourier space to recover a wide-field, high-resolution image of the specimen. In certain embodiments, the FPI device can also digitally refocus the complex high-resolution image to accommodate for defocus and aberrations in its optical element, which may digitally extend the depth of focus of the FPI system beyond the physical limitations of its optical element.

In certain aspects, an FPI method, performed by the FPI system, comprises a measurement process, a recovery process, and an optional display process. During the measurement process, the specimen is successively illuminated from the plurality of N incidence angles and corresponding low-resolution intensity images are acquired. During the recovery process, one or more high-resolution, wide field-of-view images are recovered based on the low-resolution intensity measurements. During the optional display process, the recovered images and other output is provided to the user of the FPI system on a display.

I. Introduction to Fpi Systems and Devices

Although embodiments of FPI devices and systems are described herein with respect to visible light radiation (illumination), other forms of radiation (e.g., X-ray) may be used in certain cases.

Figure 1A:
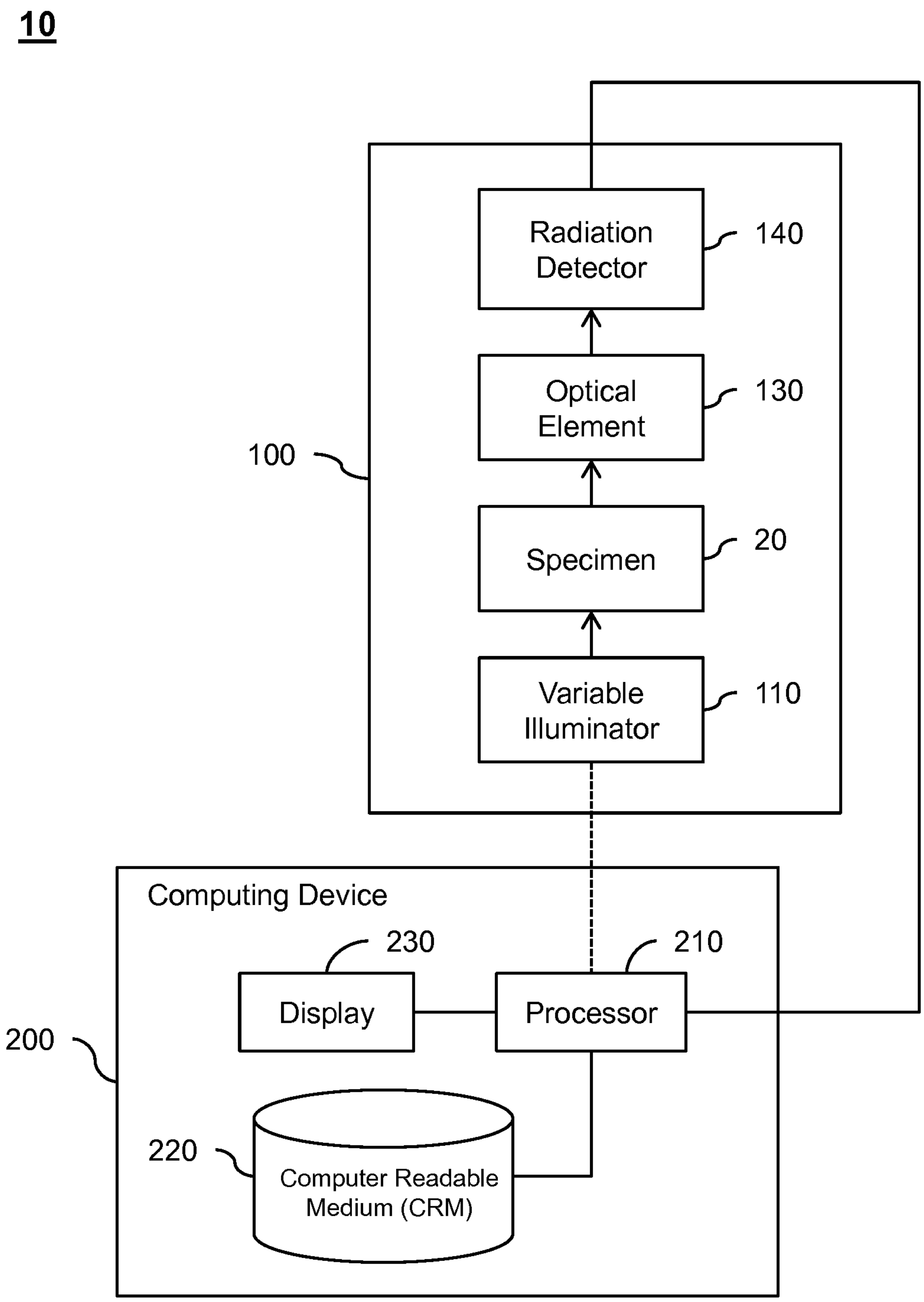
FIG. 1A is a schematic diagram of components of an FPI system, according to embodiments of the invention.

FIG. 1A is a schematic diagram of components of an FPI system 10, according to embodiments of the invention. The FPI system 10 comprises an FPI device 100 and a computing device 200 in electronic communication with FPI device 100. In certain embodiments, such as the one illustrated in FIG. 1A, a specimen 20 is provided to the FPI device 100 for imaging. The FPI device 100 comprises a variable illuminator 110 for providing variable illumination to the specimen 20, an optical element 130 for filtering illumination issuing from the specimen 20, and a radiation detector 140 for detecting intensity of illumination received. The computing device 200 comprises a processor 210 (e.g., a microprocessor), a computer readable medium (CRM) 220, and a display 230.

During a measurement process, the variable illuminator 110 provides illumination from a plurality of N incidence angles, $$(\theta_x^i, \theta_y^i),$$

i=1 to N to the specimen 20. Illumination from variable illuminator 110 may be altered (e.g., blocked, reduced intensity, modified wavelength/phase, modified polarization, etc.) by specimen 20 provided to the FPI device 100. The optical element can receive light from the variable illuminator, for example, as issuing from the specimen 20 and can filter the light it receives. For example, the optical element 130 may be in the form of an objective lens, which accepts light within its acceptance angle to act as a filter. In some cases, the optical element 130 may be an objective lens having a low numerical aperture (e.g., NA of about 0.08) to provide a corresponding narrow acceptance angle and allow for an increased depth of field. The radiation detector 140 can receive the filtered light from the optical element 130 and can record an intensity distribution at the radiation detector 140 at N sample times, $t_{i=1\ to\ N}$, to capture a plurality of N low-resolution two-dimensional intensity images of the specimen area.

In FIG. 1A, the processor 210 is in electronic communication with radiation detector 140 to receive signal(s) with the image data corresponding to N low-resolution intensity images of the specimen area, which may include an image of at least a portion of the specimen 20. During a recovery process, the processor 210 can iteratively "stitch" together low-resolution intensity images in Fourier space to recover a wide-field, high-resolution image. In certain embodiments, the processor 210 can also digitally refocus the high-resolution image to accommodate for any defocus of the specimen and/or chromatic aberrations in its optical element 130. This capability can digitally extend the depth of focus of the FPI system 10 beyond the physical limitations of optical element 130.

Processor 210 is in electronic communication with CRM 220 (e.g., memory) to be able to transmit signals with image data in order to store to and retrieve image data from the CRM 220. Processor 210 is shown in electronic communication with display 230 to be able to send image data and instructions to display the wide-field, high-resolution image of the specimen area and other output, for example, to a user of the FPI system 10. As shown by a dotted line, variable illuminator 110 may optionally be in electronic communication with processor 210 to send instructions for controlling variable illuminator 110. As used herein, electronic communication between components of FPI system 10 may be in wired or wireless form.

Figure 1B:
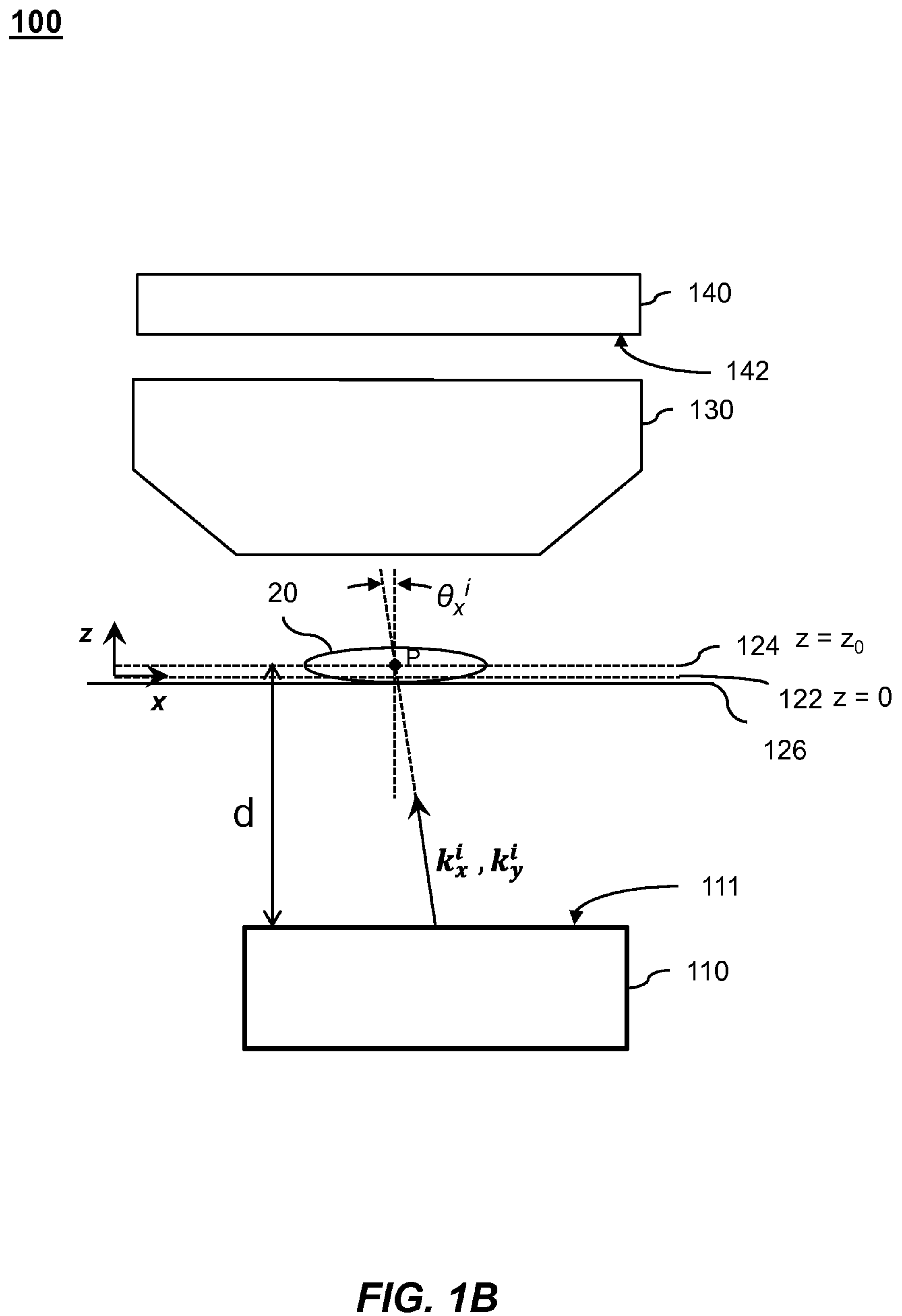
FIG. 1B is a schematic diagram of a side view of some components of the FPI device of FIG. 1A.

FIG. 1B is a schematic diagram of a side view of some components of the FPI device 100 of FIG. 1A. In FIG. 1B, the FPI device 100 comprises a variable illuminator 110 having an illuminator surface 111, an optical element 130, and a radiation detector 140 having a sensing surface 142. Although radiation detector 140 is shown at a distance away from optical element 130, radiation detector 140 may optionally be located at the optical element 130.

In certain embodiments, the FPI device comprises an in-focus plane 122 and a sample plane 124. An in-focus plane 122 can refer to the focal plane of the optical element of the corresponding FPI device. The FPI device includes an x-axis and a y-axis at the in-focus plane 122, and a z-axis orthogonal to the in-focus plane 122. The in-focus plane is defined at an x-y plane at z=0. A sample plane 124 can refer to the plane at which the FPI device may computationally reconstruct the high-resolution wide field-of-view image. The FPI device captures the low-resolution images at the in-focus plane 122. Generally, the sample plane 124 is parallel to the in-focus plane 122. In some embodiments, the sample plane 124 may be coincident to the in-focus plane 122. In an autofocus embodiment, the FPI system 10 may perform an FPI method that can determine the location of the specimen 20 to locate the sample plane 124 at the specimen 20 in order to focus the high-resolution wide field-of-view image at the specimen 20.

In FIG. 1B, the FPI device 100 includes an in-focus plane 122 at z=0 and a sample plane at $z=z_0$. The FPI device 100 includes an x-axis and a y-axis (not shown) in the in-focus plane 122, and a z-axis orthogonal to the in-focus plane 122. The FPI device 100 also includes a distance d between the variable illuminator 110 and the sample plane 124. In the illustrated example, specimen 20 has been located at a specimen surface 126 for imaging. In other embodiments, specimen 20 may be in other locations for imaging purposes.

In FIG. 1B, the FPI device 100 is shown at a particular sample time, $t_i$, in the measurement process. At sample time, $t_i$, variable illuminator 110 provides incident illumination at a wavevector $$k_x^i, k_y^i$$

associated with an incidence angle of $$(\theta_x^i, \theta_y^i)$$

at the sample plane 124. Since the illustration is a side view in an x-z plane, only the x-component $$\theta_x^i$$

of the incidence angle is shown.

In FIG. 1B, the optical element 130 receives and filters light issuing from specimen 20. Light filtered by the optical element 130 is received at the sensing surface 142 of the radiation detector 140. The radiation detector 140 senses the intensity distribution of the filtered light and captures a low-resolution intensity image of the specimen area. Although FPI device 100 is shown at a sample time, $t_i$, the FPI device 100 can operate during a plurality of N sample times, $t_{i=1\ to\ N}$ to capture N low-resolution two-dimensional intensity images associated with N incidence angles $$(\theta_x^i, \theta_y^i),$$

i=1 to N.

Figure 2A:
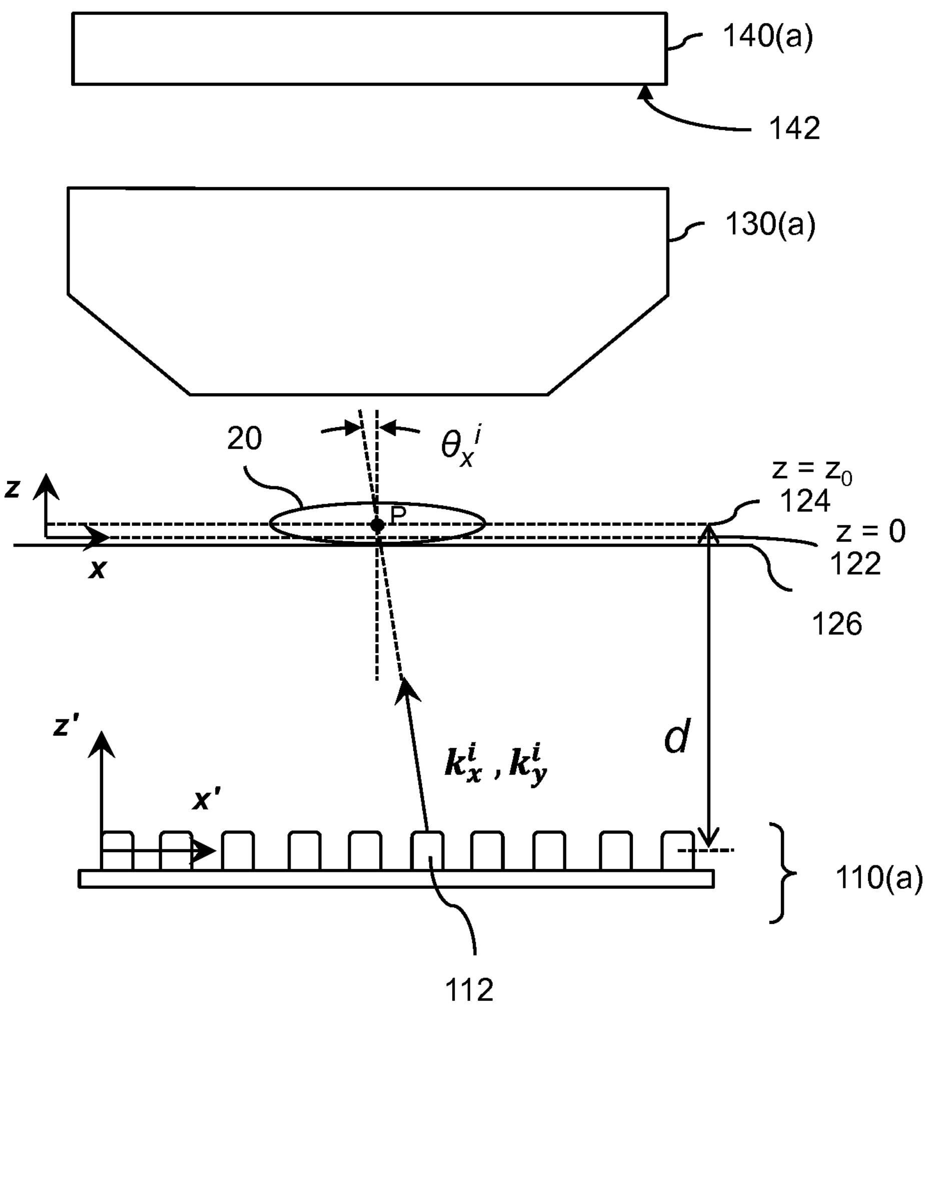
FIG. 2A is a schematic diagram of a FPI device comprising a variable illuminator in the form of a two-dimensional (10×10) matrix of 100 light elements, according to an embodiment of the invention.

A variable illuminator can refer to a device that provides incident radiation from a plurality of N different incidence angles $$(\theta_x^i, \theta_y^i),$$

i=1 to N, in succession. Suitable values of N may range from 2 to 1000. In most embodiments, the variable illuminator includes a light element of one or more radiation sources providing illumination at a particular sample time. In most cases, each light element is approximated as providing plane wave illumination to the specimen 20 from a single incidence angle. For example, the incidence angle $$\theta_x^i$$

at reference point, P, in FIG. 2A may be the angle between a normal and a line between point, P and the illuminated light element 112, which is based on a distance d between the variable illuminator and the sample plane 124.

Although the radiation source or radiation sources are usually coherent radiation sources, incoherent radiation source(s) may also be used and computational corrections may be applied. In embodiments that use visible light radiation, each radiation source is a visible light source. Some examples of a source of visible light include an LCD pixel and a pixel of an LED display. In embodiments that use other forms of radiation, other sources of radiation may be used. For example, in embodiments that use X-ray radiation, the radiation source may comprise an X-ray tube and a metal target. As another example, in embodiments that use microwave radiation, the radiation source may comprise a vacuum tube. As another example, in embodiments that use acoustic radiation, the radiation source may be an acoustic actuator. As another example, in embodiments that use Terahertz radiation, the radiation source may be a Gunn diode. One skilled in the art would contemplate other sources of radiation.

In many embodiments, the properties (e.g., wavelength(s), frequency(ies), phase, amplitude, polarity, etc.) of the radiation provided by the variable illuminator at different incidence angles, $$(\theta_x^i, \theta_y^i),$$

i=1 to N, is approximately uniform. In other embodiments, the properties may vary at the different incidence angles, for example, by providing n different wavelengths $\lambda_1, \ldots, \lambda_n$ during the measurement process. In one embodiment, the variable illuminator 110 may provide RGB illumination of three wavelengths $\lambda_1$, $\lambda_2$, and $\lambda_3$ corresponding to red, green, blue colors, respectively. In embodiments that use Terahertz radiation, the frequencies of the radiation provided by the variable illuminator 110 may be in the range of 0.3 to 3 THz. In embodiments that use microwave radiation, the frequencies of the radiation provided by the variable illuminator may be in the range of 100 MHz to 300 GHz. In embodiments that use X-ray radiation, the wavelengths of the radiation provided by the variable illuminator may be in the range of 0.01 nm to 10 nm. In embodiments that use acoustic radiation, the frequencies of the radiation provided by the variable illuminator may be in the range of 10 Hz to 100 MHz.

In some embodiments, the variable illuminator comprises a plurality of N stationary light elements at different spatial locations (e.g., variable illuminator 110(*a*) in FIG. 2A). These N stationary light elements illuminate at N sample times in succession to provide illumination from the plurality of N incidence angles, $$(\theta_x^i, \theta_y^i),$$

i=1 to N. In other embodiments, the variable illuminator comprises a moving light element (e.g., variable illuminator 110(*b*) in FIG. 3). This moving light element moves relative to the optical element and radiation detector, which may be kept stationary. In these embodiments, the moving light element may be moved to a plurality of N different spatial locations using a mechanism such as a scanning mechanism. Based on this relative movement between the stationary components and light element to the N different spatial locations, the light element can provide illumination from the plurality of N incidence angles, $$(\theta_x^i, \theta_y^i),$$

i=1 to N. In other embodiments, the variable illuminator comprises a stationary light element (e.g., variable illuminator 110(*c*) in FIG. 4A) and the other components of the FPI device are moved to N different spatial locations. Based on this relative movement between the stationary light element and the other components of the FPI device to the N different spatial locations, the light element can provide illumination from the plurality of N incidence angles, $$(\theta_x^i, \theta_y^i),$$

i=1 to N.

In embodiments having a variable illuminator comprising a plurality of N stationary light elements, the light elements may be arranged in the form of a one-dimensional array, a two-dimensional matrix, a hexagonal array, or other suitable arrangement capable of providing the illumination from the plurality of incidence angles. Some examples of matrices of stationary light elements are an LCD or an LED matrix. The light elements are designed with the appropriate spacing and designed to illuminate as required to provide the plurality of incidence angles. In some embodiments, the variable illuminator may be in the form of a two-dimensional matrix having dimensions such as for example, 10×10, 32×32, 100×100, 50×10, 20×60, etc. As an illustration example, FIG. 2A is a schematic diagram of a FPI device 100(*a*) comprising a variable illuminator 110(*a*) in the form of a two-dimensional (10×10) matrix of 100 stationary light elements 112, according to an embodiment of the invention.

In embodiments having a variable illuminator comprising a moving light element, the moving light element may be moved to a plurality of N positions. The spatial locations of these N positions may be in the form of a one-dimensional array, a two-dimensional matrix, a hexagonal array, or other suitable arrangement capable of providing the illumination from the plurality of incidence angles. Some examples of matrix dimensions may be 10×10, 32×32, 100×100, 50×10, 20×60, etc.

The variable illuminator provides radiation incident to the specimen 20 at a plurality of incidence angles $$(\theta_x^i, \theta_y^i),$$

i=1 to N. In one embodiment, the difference between two neighboring incidence angles in the plurality of incidence angles has a value in the range between 10% and 90% of the acceptance angle defined by the numerical aperture of the optical element in the form of an objective lens. In one embodiment, the difference between two adjacent incidence angles in the plurality of incidence angles has a value in the range between 33% and 66% of the acceptance angle defined by the numerical aperture of the optical element in the form of an objective lens. In one embodiment, the difference between two adjacent incidence angles in the plurality of incidence angles has a value that is less than 76% of the acceptance angle defined by the numerical aperture of the optical element in the form of an objective lens. In one embodiment, the difference between adjacent incidence angles in the plurality of incidence angles is about ⅓ of the acceptance angle defined by the numerical aperture of the optical element in the form of an objective lens. In one embodiment, the range of incidence angles, defined by a difference between the largest and smallest incidence angles, may be about equal to the effective numerical aperture consistent with the spatial resolution of the final full field-of-view high-resolution image.

The light elements of the variable illuminator are illuminated in an order defined by illumination instructions. In one embodiment, the illumination instructions determine the order of illuminating light elements in the form of a two-dimensional matrix of light elements. In this embodiment, the illumination instructions may first define a center light element. The illumination instructions may then instruct to illuminate the center light element (e.g., LED) first, then illuminate the 8 light elements surrounding the center light element going counterclockwise, then illuminate the 16 light elements surrounding the previous light element going counterclockwise, and so on until the N light elements have been illuminated from the plurality of N incidence angles $$(\theta_x^i, \theta_y^i),$$

i=1 to N. In another embodiment, the illumination instructions determine another order of illuminating light elements in the form of a two-dimensional matrix of light elements. In this embodiment, the variable illumination instructions may define a light element in the matrix that is closest to the specimen. The illumination instructions may then instruct to illuminate the light element closest to the specimen, and then illuminate the light element next closest to the specimen, and then illuminate the light element next closest, and so on until the N light elements have been illuminated from the plurality of N incidence angles $$(\theta_x^i, \theta_y^i),$$

i=1 to N.

In certain embodiments, the FPI device can image at least a portion of specimen 20 provided to the FPI device for imaging. In certain cases, the specimen 20 may comprise one or more objects. Each object may be a biological or inorganic entity. Examples of biological entities include whole cells, cell components, microorganisms such as bacteria or viruses, cell components such as proteins, thin tissue sections, etc. In some cases, the specimen 20 may be provided to the FPI device in a medium such as a liquid. In most cases, the specimen 20 is a stationary specimen. The specimen 20 is provided to the FPI device at a location capable of receiving illumination from the variable illuminator and so that light issuing from the specimen 20 is received by the optical element.

In certain embodiments, the FPI system 10 may comprise a receptacle for the specimen 20 with a specimen surface 126 for receiving a specimen 20. The specimen surface 126 may be part of a component of the FPI device 100, such as, for example, a surface of the variable illuminator 110. Alternatively, the specimen surface 126 may be a separate component from the FPI device 100 and/or FPI system 10. For example, the specimen surface 126 may a surface of a slide or a dish. This receptacle and specimen surface 126 may not be included in other embodiments.

In certain embodiments, one or more of the full field-of-view low-resolution images captured by the FPI device may be divided into one or more low-resolution tile images. In these cases, the processor can computationally reconstruct a high-resolution image for each tile independently, and then combine the tile images to generate the full field-of-view high-resolution image. This capability of independent processing of the tile images allows for parallel computing. In these embodiments, each tile may be represented by a two-dimensional area. The FPI system 10 uses an FPI method that assumes plane wave illumination over the area of each tile. In rectilinear spatial coordinates, each tile may be represented as a rectangular area (e.g., square area). In polar spatial coordinates, each tile may be a circular area or an oval area. In rectilinear spatial coordinates, the full field-of view low resolution image may be divided up into a two-dimensional matrix of tiles. In some embodiments, the dimensions of a two-dimensional square matrix of tiles may be in powers of two when expressed in number of pixels of the radiation sensor such as, for example, a 256 by 256 matrix, a 64×64 matrix, etc. In most cases, the tiles in the matrix will have approximately the same dimensions.

The FPI device also comprises an optical element that acts a low-pass filter. For example, the optical element may be an objective lens that only accepts light within a range of incidence angles based on its numerical aperture (NA). In many embodiments, the optical element is in the form of a low NA objective lens to provide narrow acceptance angle and high depth of field. In one embodiment, the optical element is a low NA objective lens has a low NA of about 0.08. In another embodiment, the optical element is a low NA objective lens has a low NA in the range between about 0.01 and about 0.1. In an embodiment of certain illustrated examples, the optical element is a 2× objective lens with an NA of about 0.08.

In embodiments that use X-ray radiation, an X-ray optical element may be needed, such as, for example, a grazing incidence mirror or zone plane. In embodiments that use acoustic radiation, a particular optical element may be needed such as, for example, an acoustic lens. In embodiments that use Terahertz radiation, a particular optical element may be needed such as, for example, a Teflon lens. In embodiments that use microwave radiation, a particular optical element may be needed such as, for example, a microwave lens antenna.

In certain embodiments, the FPI device has an initial depth of focus associated with the inherent depth of field of its optical element. A specimen provided to an FPI device of embodiments may be considered in focus when the sample plane is within the initial depth of focus of the optical element. Conversely, the specimen may be considered out-of-focus when the sample plane 124 is located outside of the initial depth of focus. Using an FPI method with digital refocusing of embodiments, the depth of focus of the FPI device may be extended beyond the limitations of the inherent depth of field of its optical element.

A radiation detector can refer to a device that can sense intensity of the radiation incident upon the radiation detector and can record spatial images based on the intensity pattern of the incident radiation. The radiation detector may record the images during a measurement process with a duration that includes at least the plurality of N sample times, $t_{i=1\ to\ N}$. For an FPI device using visible light radiation, the radiation detector 140 may be, for example, in the form of a charge coupled device (CCD), a CMOS imaging sensor, an avalanche photo-diode (APD) array, a photo-diode (PD) array, or a photomultiplier tube (PMT) array. For an FPI device using THz radiation, the radiation detector may be, for example, an imaging bolometer. For an FPI device using microwave radiation, the radiation detector may be, for example, an antenna. For an FPI device using X-ray radiation, the radiation detector may be, for example, an x-ray sensitive CCD. For an FPI device using acoustic radiation, the radiation detector may be, for example, a piezoelectric transducer array. These radiation detectors and others are commercially available. In certain color imaging embodiments, the radiation detector may be a color detector e.g. an RGB detector. In other color imaging embodiments, the radiation detector need not be a color detector. In certain embodiments, the radiation detector may be a monochromatic detector.

A sample time can refer to a time that the radiation detector can capture a low-resolution image. In many embodiments, each sample time $t_i$, and associated captured low-resolution intensity image correspond to a particular incidence angle $$(\theta_x^i, \theta_y^i).$$

The radiation detector may capture any suitable number N (e.g., 10, 20, 30, 50, 100, 1000, 10000, etc.) of low-resolution intensity images. The radiation detector may have a sampling rate or may have different sampling rates at which the radiation detector samples data. In some cases, sampling may be at a constant rate. In other cases, sampling may be at a variable rate. Some suitable examples of sample rates range from 0.1 to 1000 frames per second.

The radiation detector may have discrete radiation detecting elements (e.g., pixels). The radiation detecting elements may be of any suitable size (e.g., 1-10 microns) and any suitable shape (e.g., circular, rectangular, square, etc.). For example, a CMOS or CCD element may be 1-10 microns and an APD or PMT light detecting element may be as large as 1-4 mm. In one embodiment, the radiation detecting element is a square pixel having a size of 5.5 um.

The radiation detector can determine intensity image data related to captured low-resolution images. For example, the image data may include an intensity distribution. Image data may also include the sample time that the light was captured, or other information related to the intensity image.

Fourier space can refer to the mathematical space spanned by wavevectors $k_x$ and $k_y$, being the coordinate space in which the two-dimensional Fourier transforms of the spatial images created by the FPI reside. Fourier space also can refer to the mathematical space spanned by wavevectors $k_x$ and $k_y$ in which the two-dimensional Fourier transforms of the spatial images collected by the radiation sensor reside.

Each of the low-resolution images captured by the radiation detector is associated with a region in Fourier space. This region in Fourier space can be defined by an approximated optical transfer function of the optical element and also by the incidence angle. If the optical element is an objective lens, for example, the low-resolution image in Fourier space may be the circular region defined by the approximated optical transfer function of the objective lens as a circular pupil with a radius of $NA*k_0$, where $k_0$ equals $2\pi/\lambda$ (the wave number in vacuum). In this example, the region is centered about the wave vector $(k_{xi}, k_{yi})$ associated with the corresponding incidence angle. In this example, the plurality of N low-resolution images are associated with a plurality of N regions centered about the plurality of N incidence angles in Fourier space.

In Fourier space, neighboring regions may share an overlapping area over which they sample the same Fourier domain data. The overlapping area between adjacent regions in Fourier space may be determined based on the values of the corresponding incidence angles. In most embodiments, the N incidence angles are designed so that the neighboring regions in Fourier space overlap by a certain amount of overlapping area. For example, the values of the N incidence angles may be designed to generate a certain amount of overlapping area for faster convergence to a high-resolution solution in the recovery process. In one embodiment, the overlapping area between neighboring regions may have an area that is in the range of 2% to 99.5% of the area of one of the regions. In another embodiment, the overlapping area between neighboring regions may have an area that is in the range of 65% to 75% the area of one of the regions. In another embodiment, the overlapping area between neighboring regions may have an area that is about 65% of the area of one of the regions.

The FPI system 10 of FIG. 1A also includes a computing device 200 that comprises a processor 210 (e.g., microprocessor), a CRM 220 (e.g., memory), and a display 230. The image display 230 and the CRM 220 are communicatively coupled to the processor 210. In other embodiments, the computing device 200 can be a separate device from the FPI system 10. The computing device 200 can be in various forms such as, for example, a smartphone, laptop, desktop, tablet, etc. Various forms of computing devices would be contemplated by one skilled in the art.

The processor 210 (e.g., microprocessor) may execute instructions stored on the CRM 220 to perform one or more functions of the FPI system 10. For example, the processor 210 may execute instructions to perform one or more steps of the recovery process of the FPI method. As another example, the processor 210 may execute illumination instructions for illuminating light elements of the variable illuminator. As another example, the processor 210 may execute instructions stored on the CRM 220 to perform one or more other functions of the FPI system 10 such as, for example, 1) interpreting image data from the plurality of low-resolution images, 2) generating a high-resolution image from the image data, and 3) displaying one or more images or other output from the FPI method on the display 230.

The CRM (e.g., memory) 220 can store instructions for performing some of the functions of the FPI system 10. The instructions are executable by the processor 210 or other processing components of the FPI system 10. The CRM 220 can also store the low-resolution and high-resolution image, and other data produced by the FPI system 10.

The FPI system 10 also includes a display 230 in electronic communication with the processor 210 to receive data (e.g., image data) and provide output data (e.g., images) to an operator of the FPI system 10. The image display 230 may be a color display or a black and white display. In addition, the display 230 may be a two-dimensional display or a three-dimensional display. In one embodiment, the display 230 may be capable of displaying multiple views.

Modifications, additions, or omissions may be made to FPI system 10 or FPI device 100 without departing from the scope of the disclosure. In addition, the components of FPI system 10 or the FPI device 100 may be integrated or separated according to particular needs. For example, the computing device 200 or components thereof may be integrated into the FPI device 100. In some embodiments, the processor 210 or other suitable processor may be part of the FPI device 100. In some cases, the processor 210 may be integrated into the radiation detector 140 so that the radiation detector 140 performs the functions of the processor 210. As another example, the CRM 220 and/or display 230 may be omitted from the FPI system 10 in certain cases.

II. FPI Device Configurations

Figure 3:
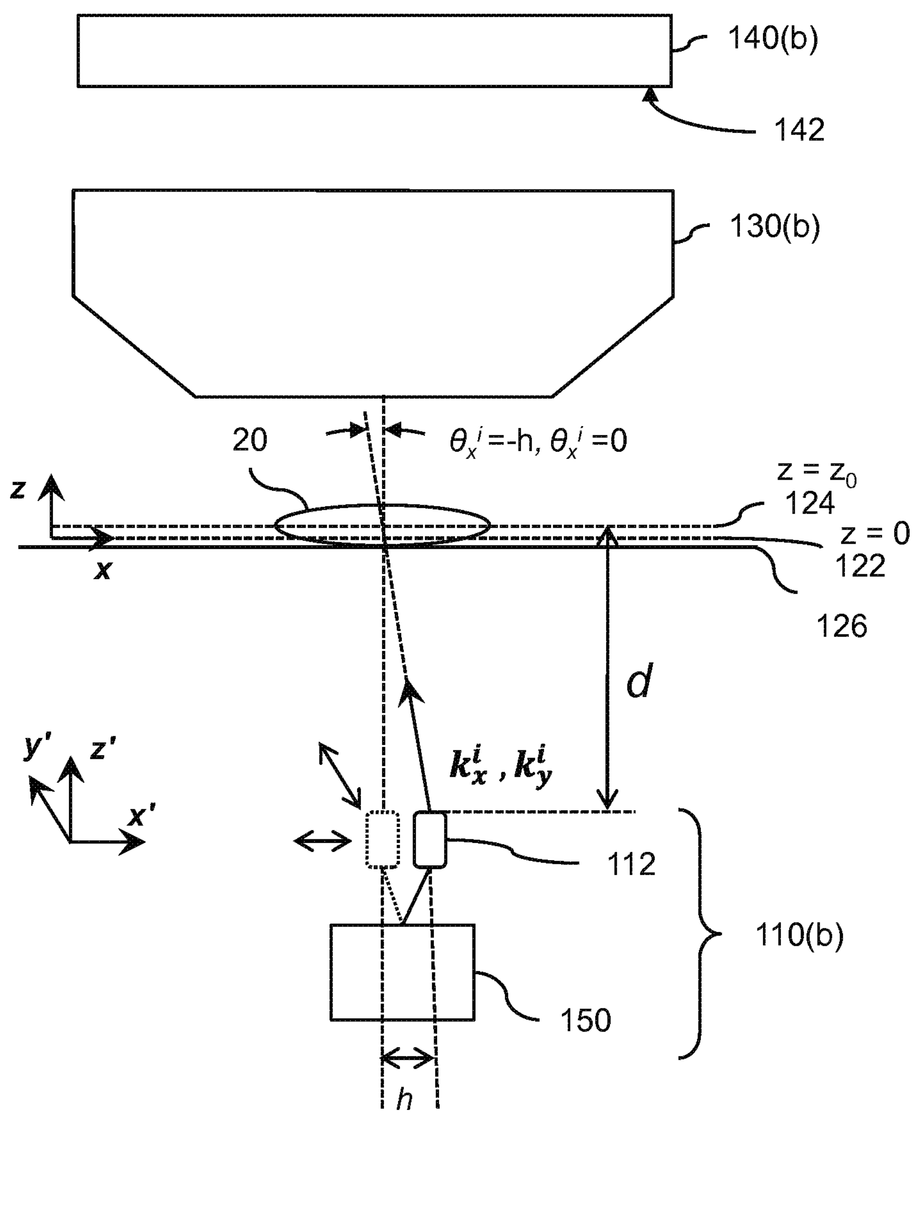
FIG. 3 is a schematic diagram of a side view of components of an FPI device, according to embodiments of the invention.

In certain embodiments, FPI devices (e.g., FPI device 100(*a*) of FIG. 2A and FPI device 100(*b*) of FIG. 3) may be configured for use with particular types of radiation. For example, FPI device 100(*a*) of FIG. 2A may be particularly suitable for use with visible light, Terahertz, and/or microwave radiation. As another example, FPI device 100(*c*) of FIG. 4A may be particularly suitable for use with X-ray radiation.

FIG. 2A is a schematic diagram of a side view of components of an FPI device 100(*a*), according to embodiments of the invention. FPI device 100(*a*) comprises a variable illuminator 110(*a*) comprising a plurality of N stationary light elements, arranged in a two-dimensional matrix format. In the illustrated example, the $i^{th}$ light element 112 provides illumination from an incidence angle $$(\theta_x^i, \theta_y^i).$$

Although FIG. 2A shows the variable illuminator 110(*a*) having a 10×10 matrix of light elements 112, other dimensions can be used in other embodiments. In addition, although FIG. 2A shows equally spaced light elements 112 other spacings may be used in other embodiments. Variable illuminator 110(*a*) also comprises an x'-axis, y'-axis (not shown), and a z'-axis. As shown, the stationary light elements 112 extend in the x'-direction and the y'-direction.

FPI device 100(*a*) further comprises an optical element 130(*a*) (e.g., objective lens) and a radiation detector 140(*a*) having a sensing surface 142. Although radiation detector 140 is shown at a distance away from optical element 130(*a*), radiation detector 140 may optionally be located at the optical element 130(*a*). The FPI device 100(*a*) also includes an in-focus plane 122 at z=0 and a sample plane 124 at $z=z_0$. The FPI device 100(*a*) includes an x-axis and a y-axis (not shown) at the in-focus plane 122, and a z-axis orthogonal to the in-focus plane 122. The FPI device 100(*a*) also includes a distance d between the variable illuminator 110(*a*) and the sample plane 124. In the illustrated example, specimen 20 has been located at a specimen surface 126 for imaging. In other embodiments, specimen 20 may be in other locations for imaging purposes.

In FIG. 2A, the FPI device 100(*a*) is shown at a particular sample time, $t_i$, in the measurement process. At sample time, $t_i$, $i^{th}$ light element 112 provides incident illumination at a wavevector $$k_x^i, k_y^i$$

associated with an incidence angle of $$(\theta_x^i, \theta_y^i).$$

The optical element 130(*a*) receives and filters light issuing from specimen 20. Light filtered by the optical element 130(*a*) is received at the sensing surface 142 of the radiation detector 140(*a*). The radiation detector 140(*a*) senses the intensity distribution of the filtered light and captures a low-resolution intensity image. Although FPI device 100(*a*) is shown at a single sample time, $t_i$, the FPI device 100(*a*) can operate at a plurality of N sample times, $t_{i=1\ to\ N}$, associated with N incidence angles $$(\theta_x^i, \theta_y^i),$$

i=1 to N to capture N low-resolution two-dimensional intensity images.

Figure 2B:
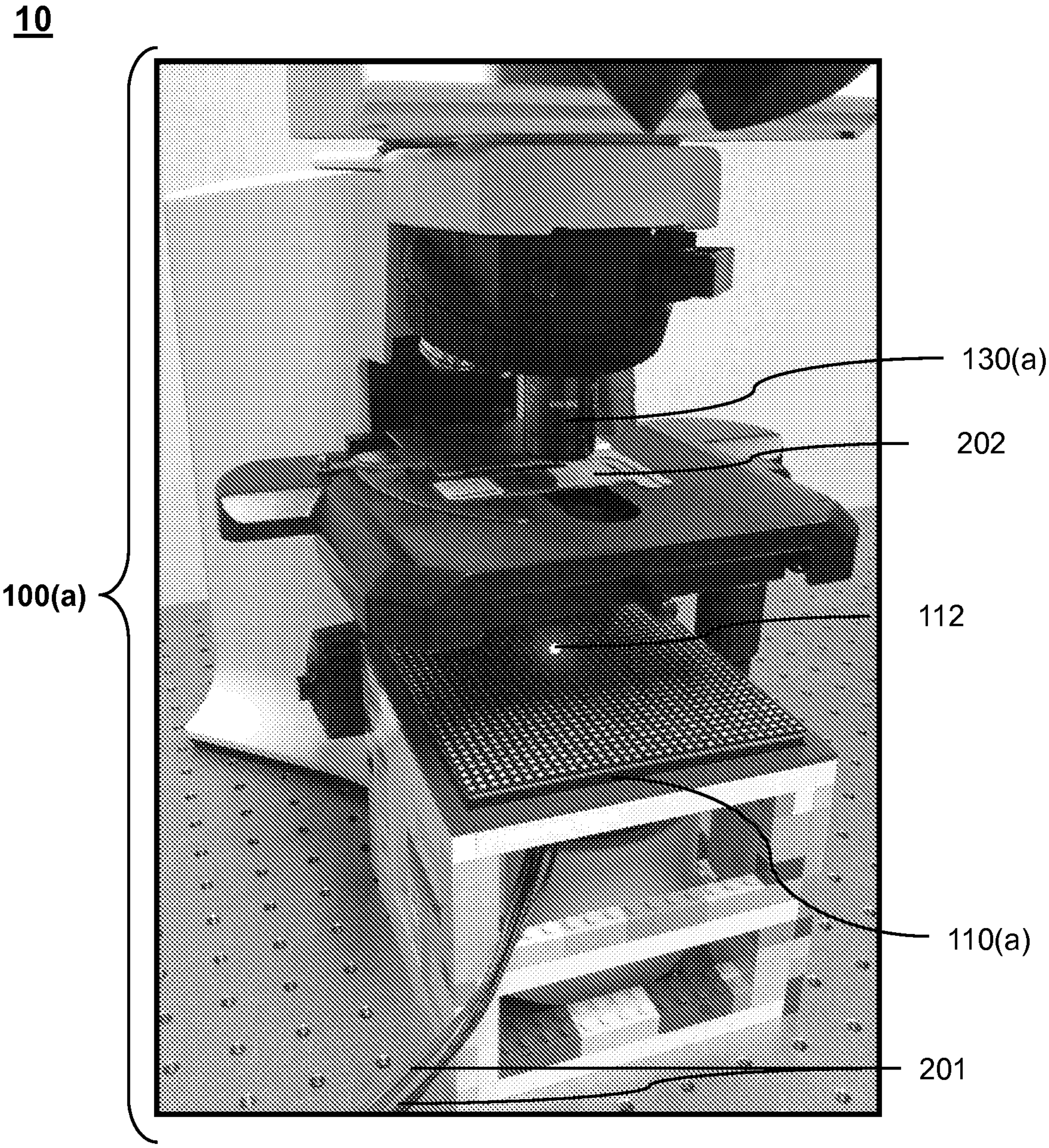
FIG. 2B is a photograph of an FPI system with components in modular form, according to embodiments of the invention.
Figure 2C:
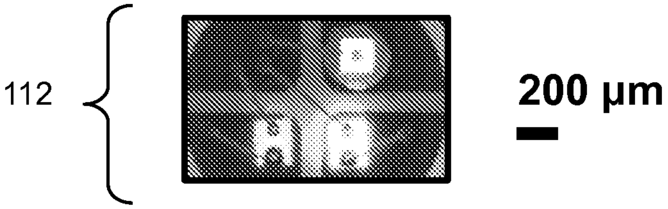
FIG. 2C is a photograph of one of the light elements of the variable illuminator the FPI device of FIG. 2B.

In certain embodiments, components of an FPI system 10 may be in modular form to be placed in communication with components of a conventional microscope or other conventional imaging device to transform the conventional device into an FPI system 10. FIG. 2B is a photograph of an FPI system 10 with components in modular form, according to an embodiment of the invention. FPI system 10 comprises an FPI device 100(*a*). In the top photograph, the FPI device 100(*a*) comprises modular components that have been placed in communication with components of an Olympus® BX 41 microscope to transform these components of a conventional microscope into an FPI system 10. As an example of this modular aspect, the FPI device 100(*a*) includes a programmable two-dimensional LED matrix that has been placed under the specimen stage for illuminations. The programmable two-dimensional LED matrix comprises the plurality of light elements 112. FIG. 2C is a photograph of one of the light elements 112 of the variable illuminator 110(*a*) the FPI device 100(*a*) of FIG. 2B. This light element 112 is an LED that can provide red, green, and blue illuminations. As another example of the modular aspect of the illustrated example, the FPI device 110(*a*) in FIG. 2B comprises a radiation detector 140(*a*) in the form of a CCD camera. In FIG. 2B, the FPI device 100(*a*) further comprises an optical element 130(*a*) in the form of a 2×, 0.08 NA objective lens with an Olympus® BX 41 microscope. The field number of the 2× objective lens is 26.5. The field-of-view of the FPI device 100(*a*) at the sample plane is 13.25 mm in diameter. A processor 210 may be in electronic communication with the variable illuminator 110(*a*) and/or to radiation detector 140(*a*) through the wires 201.

In FIG. 2B, a specimen 20 has been provided to the FPI device 100(*a*) on a slide 202. Using red, green, and blue illuminations from the light elements 112, in this case LEDs, of the variable illuminator 110(*a*), a radiation detector of the FPI device 100 can acquire red, green, and blue low-resolution intensity images during a measurement process. The computing device 200 can computationally reconstruct a high-resolution and wide field-of-view color image of the specimen area by iteratively combining low-resolution measurements in Fourier space. In one case, the processor 210 may computationally reconstruct high-resolution and wide field-of-view red, green, and blue images, and then combine the images to generate a color image.

The FPI device 110(*a*) does not require a scanning mechanism for variable illumination. Other embodiments may include a scanning mechanism. For example, the FPI device 110(*b*) in FIG. 3 has a mechanism 150 that may be a scanning mechanism. As another example, the FPI device 110(*c*) in FIG. 4A has a mechanism 160 that may be a scanning mechanism.

FIG. 3 is a schematic diagram of a side view of components of an FPI device 100(*b*), according to an embodiment of the invention. FPI device 100(*b*) comprises a variable illuminator 110(*b*) comprising a light element 112 that is moved (e.g., scanned) in the x'-direction (direction on the x'-axis) and y'-direction (direction on the y'-axis) to a plurality of N locations. Variable illuminator 110(*b*) also comprises an x'-axis, y'-axis, and z'-axis. In the illustration, the light element 112 has moved from a normal incidence position $$(\theta_x^i = 0, \theta_y^i = 0)$$

in the x'-direction to a position that provides illumination at $$(\theta_x^i = -h, \theta_y^i = 0).$$

The light element 112 is moved using a mechanism 150 (e.g., a raster scanner).

FPI device 100(*b*) further comprises an optical element 130(*b*) and a radiation detector 140(*b*) having a sensing surface 142. Although radiation detector 140(*b*) is shown at a distance away from optical element 130(*b*), radiation detector 140(*b*) may optionally be located at the optical element 130(*b*). The FPI device 100(*b*) also includes an in-focus plane 122 at z=0 and a sample plane 124 at $z=z_0$. The FPI device 100(*b*) includes an x-axis and a y-axis (not shown) at the in-focus plane 122, and a z-axis orthogonal to the in-focus plane 122. The FPI device 100(*b*) also includes a distance d between the variable illuminator 110(*b*) and the sample plane 124. In the illustrated example, specimen 20 has been located at a specimen surface 126 for imaging. In other embodiments, specimen 20 may be in other locations for imaging purposes.

In FIG. 3, the light element 112 is shown providing illumination at sample time, $t_i$ in the measurement process. The optical element 130(*b*) filters light it receives. Light filtered by the optical element 130(*b*) is received at the sensing surface 142 of the radiation detector 140(*b*). The radiation detector 140(*b*) senses the intensity distribution of the filtered light and captures a low-resolution intensity image of the specimen area. Although FPI device 100(*b*) is shown at a single sample time, $t_i$, the FPI device 100(*b*) can operate at a plurality of N sample times, $t_{i=1\ to\ N}$, associated with N incidence angles $$(\theta_x^i, \theta_y^i),$$

i=1 to N to capture N low-resolution two-dimensional intensity images. In embodiments where the FPI device 100(*b*) shown in FIG. 3 is used with X-ray radiation, the light element 112 includes an X-ray source.

Figure 4A:
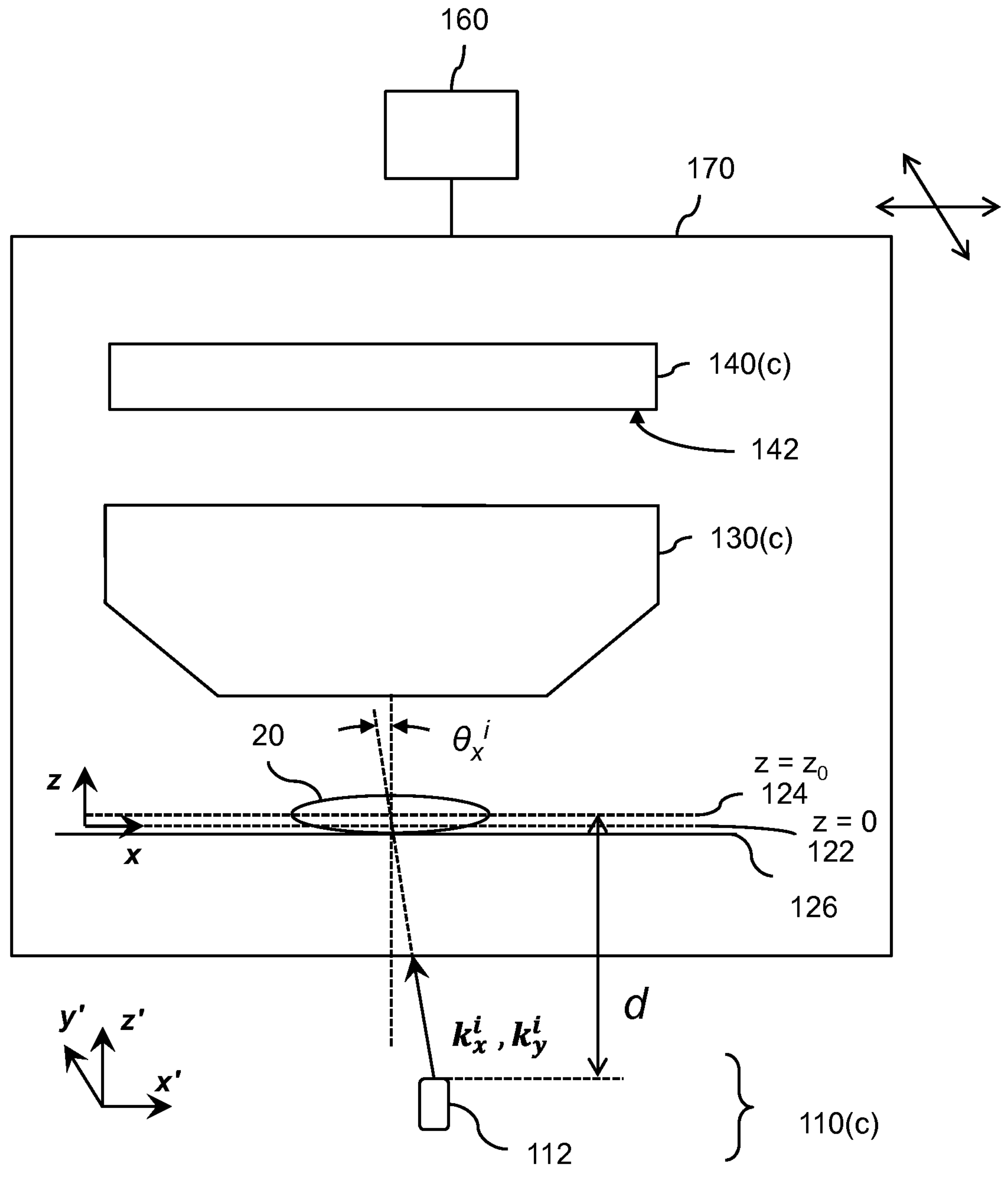
FIG. 4A is a schematic diagram of a side view of components of an FPI device, according to embodiments of the invention.

FIG. 4A is a schematic diagram of a side view of components of an FPI device 100(*c*), according to embodiments of the invention. FPI device 100(*c*) comprises a variable illuminator 110(*c*) with a stationary light element 112, an optical element 130(*c*), a radiation detector 140(*c*) having a sensing surface 142, and a mechanism 160 (e.g., scanning mechanism). In the illustrated example, specimen 20 has been provided to the FPI device 100(*c*) for imaging.

In FIG. 4A, the mechanism 160 moves an assembly 170 comprising the optical element 130(*c*), a radiation detector 140(*b*) and specimen 20 relative to the stationary light element 112 to provide illumination from a plurality of Nincidence angles. The mechanism 160 may translate and/or rotate the assembly 170. For example, the assembly 170 may mounted on a goniometer sate that would allow the assembly to be rotated as a whole relative to the light element 112. The variable illuminator 110(*c*) also comprises an x'-axis, y'-axis, and z'-axis.

Although radiation detector 140(*c*) is shown at a distance away from optical element 130(*c*), radiation detector 140(*c*) may optionally be located at the optical element 130(*c*). The FPI device 100(*c*) also includes an in-focus plane 122 at z=0 and a sample plane 124 at $z=z_0$. The FPI device 100(*c*) includes an x-axis and a y-axis (not shown) at the in-focus plane 122, and a z-axis orthogonal to the in-focus plane 122. The FPI device 100(*c*) also includes a distance d between the variable illuminator 110(*c*) and the sample plane 124.

In FIG. 4A, the light element 112 is shown providing illumination at sample time, $t_i$ in the measurement process. The optical element 130(*c*) receives and filters light issuing from specimen 20. Light filtered by the optical element 130(*c*) is received at the sensing surface 142 of the radiation detector 140(*c*). The radiation detector 140(*c*) senses the intensity distribution of the filtered light and captures a low-resolution intensity image of the area. Although FPI device 100(*c*) is shown at a single sample time, $t_i$, the FPI device 100(*c*) can operate at a plurality of N sample times, $t_{i=1\ to\ N}$, associated with N incidence angles $$(\theta_x^i, \theta_y^i),$$

i=1 to N to capture N low-resolution two-dimensional intensity images.

Figure 4B:
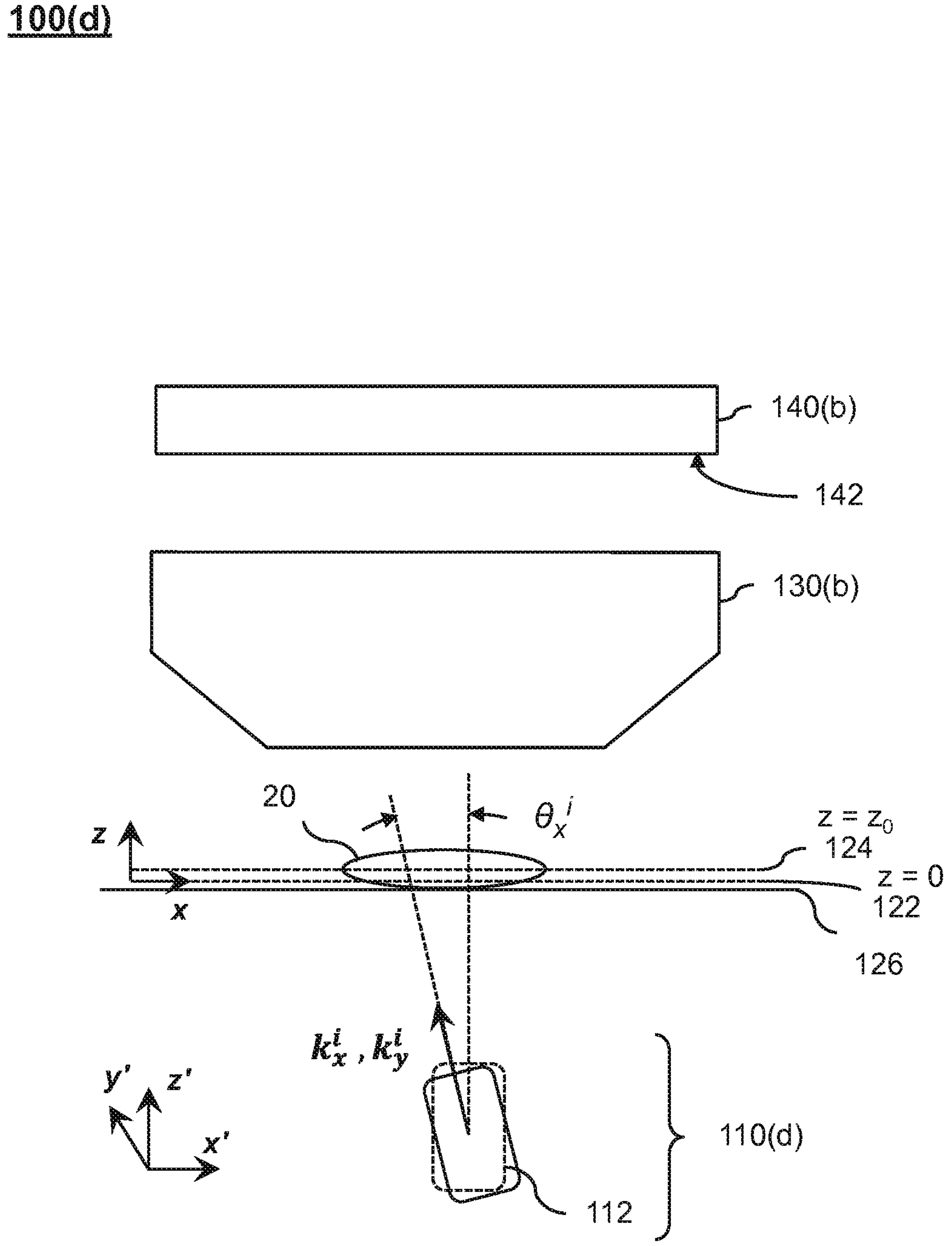
FIG. 4B is a schematic diagram of a side view of components of an FPI device, according to embodiments of the invention.

FIG. 4B is a schematic diagram of a side view of components of an FPI device 100(*d*), according to embodiments of the invention. FPI device 100(*d*) comprises a variable illuminator 110(*d*) with a light element 112 that is moved by rotating it, an optical element 130(*b*), and a radiation detector 140(*b*) having a sensing surface 142. Although not shown, a mechanism may also be included to rotate the light element 112. In the illustrated example, specimen 20 has been provided to the FPI device 100(*d*) for imaging. In some cases, the light element 112 may be a laser.

In FIG. 4B, the light element 112 is moved by rotating it, which provides illumination at $$(\theta_x^i, \theta_y^i).$$

In FIG. 4B, the light element 112 is shown providing illumination at sample time, $t_i$ in the measurement process. The optical element 130(*b*) receives and filters light issuing from specimen 20. Light filtered by the optical element 130(*b*) is received at the sensing surface 142 of the radiation detector 140(*b*). The radiation detector 140(*b*) senses the intensity distribution of the filtered light and captures a low-resolution intensity image of the area. Although FPI device 100(*d*) is shown at a single sample time, $t_i$, the FPI device 100(*d*) can operate at a plurality of N sample times, $t_{i=1\ to\ N}$, associated with N incidence angles $$(\theta_x^i, \theta_y^i),$$

i=1 to N to capture N low-resolution two-dimensional intensity images.

III. Exemplary FPI Methods

In embodiments, an FPI method comprises a measurement process, a recovery process, and an optional display process. In the measurement process, the specimen is illuminated from a plurality of incidence angles using the variable illuminator, the optical element filters light issuing from the specimen, and the radiation detector captures a plurality of low resolution intensity images based on the filtered light. In the recovery process, the intensity of each low resolution image obtained by inverse Fourier transformation and filtering of the high resolution reconstruction in Fourier space is replaced by the low-resolution intensity measurement and the corresponding region of the high-resolution reconstruction in Fourier space is iteratively updated. In the recovery process, the high-resolution image of the specimen may be computationally reconstructed based on a plurality of N low-resolution intensity images. In the optional display process, images and other output is provided to a display 220.

Figure 5A:
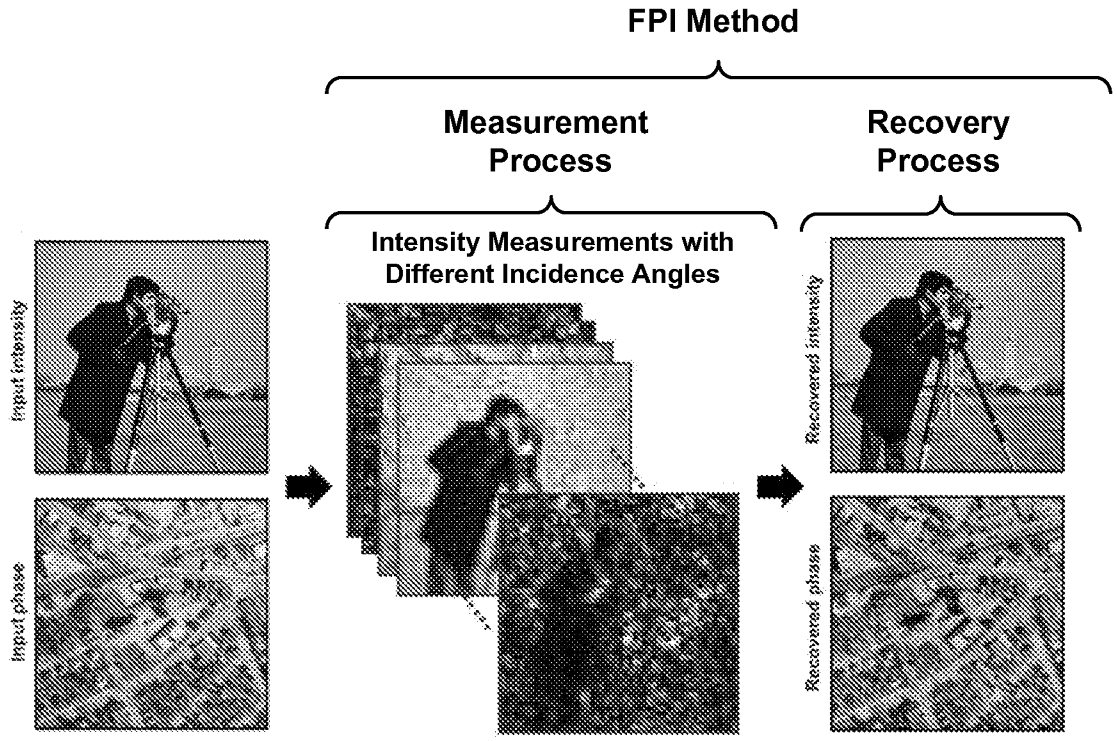
FIG. 5A includes a schematic representation of the measurement process (middle) and a recovery process (right-hand side) of an FPI method, according to embodiments of the invention.
Figure 5B:
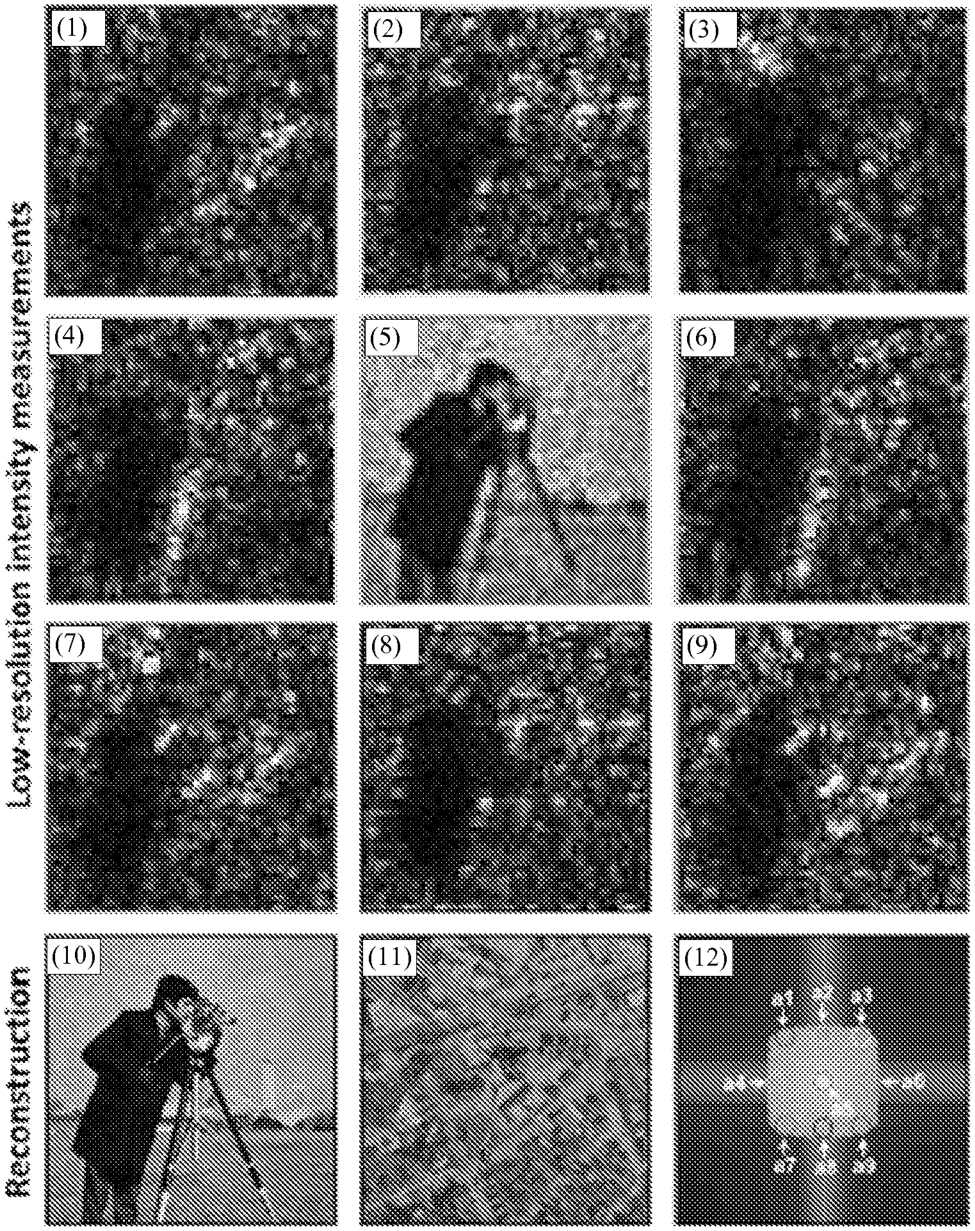
FIGS. 5B(1), 5B(2), 5B(3), 5B(4), 5B(5), 5B(6), 5B(7), 5B(8), and 5B(9) are nine low-resolution measurements acquired by the FPI method introduced in FIG. 5A.

FIG. 5A includes a schematic representation of the measurement process (middle) and a recovery process (right-hand side) of an FPI method, according to embodiments of the invention. During the measurement process, a specimen is illuminated from different incidence angles, and low-resolution intensity images corresponding to these incidence angles are acquired. The acquisition of multiple low-resolution intensity images is represented by the arrangement of images in the middle section of FIG. 5A. During the recovery process, one or more high-resolution, wide field-of-view images are recovered based on the low-resolution intensity measurements from the measurement process. The recovery process is represented by the two images at the right-hand side of FIG. 5A, where both high-resolution intensity and phase image data are recovered based on the low-resolution intensity measurements. FIGS. 5B(1), 5B(2), 5B(3), 5B(4), 5B(5), 5B(6), 5B(7), 5B(8), and 5B(9) are nine low-resolution measurements of the 137 measurements acquired by the FPI method introduced in FIG. 5A. The corresponding regions associated with the low-resolution images in Fourier space are shown in FIG. 5B(12). During the recovery process, these regions are updated in Fourier space to reconstruct a full FOV high-resolution complex image. Recovered high-resolution intensity and phase images are shown at the right-hand side of FIG. 5A and also shown in FIGS. 5B(10) and 5B(11).

In certain embodiments, the FPI method may alternate between two working domains: the spatial (x-y) domain and Fourier ($k_x$-$k_y$) domain, where k represents the wavenumber.

In certain embodiments, the FPI method may use the concept of oblique incidence, which provides that illuminating the specimen 20 (e.g., a thin specimen) by an oblique plane wave with a wavevector $$(k_x^i, k_y^i)$$

is equivalent to shifting the center of the image spectrum by ($k_x$, $k_y$) in the Fourier domain. According to oblique incidence, the low-resolution image in the Fourier domain is shifted from normal incidence by ($k_x$, $k_y$), which corresponds to the incidence angle applied by the variable illuminator.

In certain embodiments, the FPI method may provide that the filtering function of the optical element (i.e. the coherent optical transfer function) in Fourier space is a circular pupil with a radius of NA×$k_0$, where $k_0=2\pi/\lambda$ is the wave number in vacuum. That is, the FPI method may update in Fourier space circular regions defined by this filtering function of the optical element. In these embodiments, the FPI method uses this filtering function to omit image data outside this region.

In certain embodiments, the specimen 20 may be placed at the sample plane 124 at $z=z_0$ where the in-focus plane 122 of the optical element is located at position z=0. In other words, the image captured is not the specimen image at the specimen profile itself; it is the specimen profile propagated by $-z_0$ distance at the in-focus plane of the optical element. In these embodiments, the FPI method may digitally refocus the specimen 20 propagating the image data by the $z_0$ distance back to the sample plane 124, without having to mechanically move the specimen in the z-direction. These propagating step(s) can be performed by multiplying a phase factor in Fourier space. These steps can extend the imaging depth of focus of the FPI system 10 and correct the chromatic aberration of the optical element.

Figure 6A:
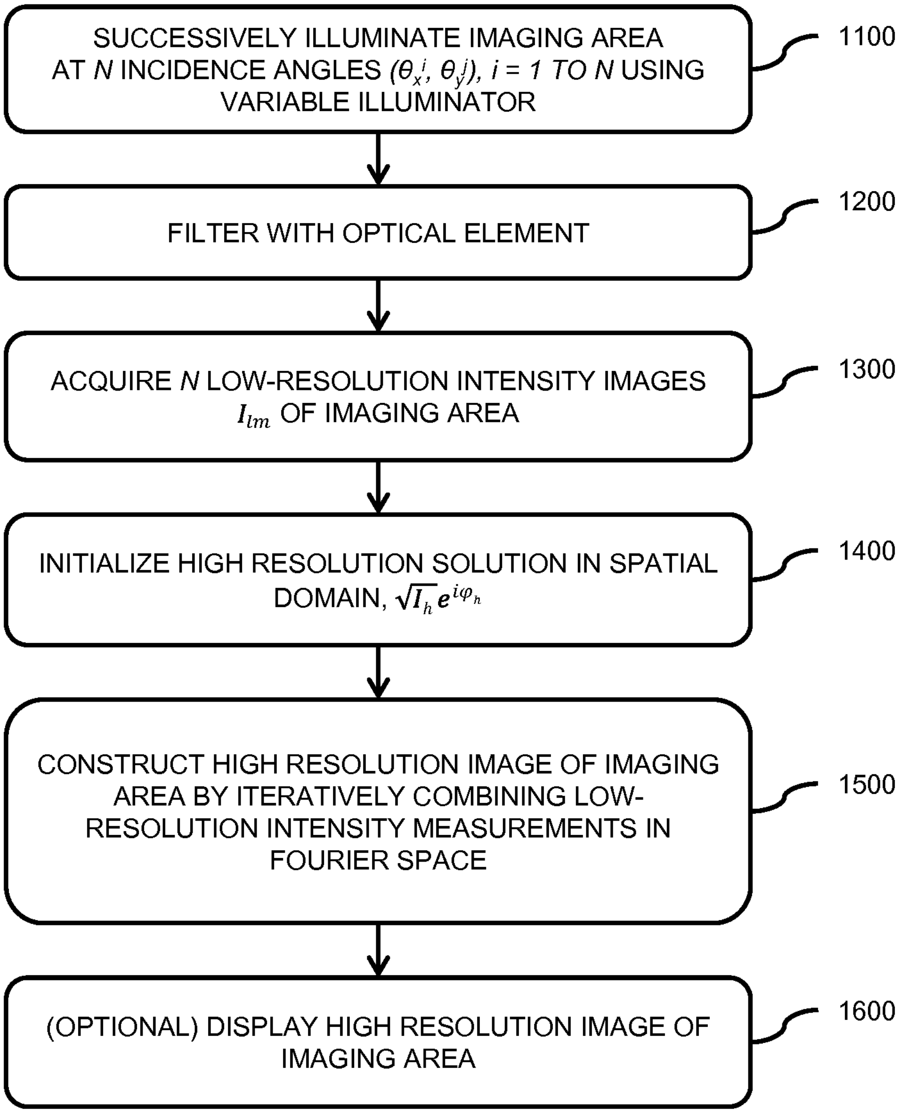
FIG. 6A is a flowchart of an FPI method performed by an FPI system, according to embodiments of the invention.

FIG. 6A is a flowchart of an FPI method performed by an FPI system 10, according to embodiments of the invention. The FPI method comprises a measurement process (steps 1100, 1200, and 1300), a recovery process (steps 1400 and 1500), and an optional display process (step 1600). In illustrated examples of FPI methods and their associated description, subscript "h" refers to high-resolution, subscript "l" refers to low resolution, subscript "f" refers to focused position, subscript "m" refers to measured, and subscript "s" refers to sampled.

At step 1100, the variable illuminator provides illumination to a specimen area from a plurality of N incidence angles, $$(\theta_x^i, \theta_y^i),$$

i=1 . . . N, at N sample times. In most cases, the recovery process assumes plane wave illumination. The variable illuminator may provide illumination according to illumination instructions that define the order of the illumination angles. The wave vector in x and y directions can be denoted as $k_{xi}$ and $k_{yi}$. In certain cases, the variable illuminator may provide illumination of different wavelengths at different sample times. For example, the variable illuminator 110 may provide RGB illumination of three wavelengths $\lambda_1$, $\lambda_2$, and $\lambda_3$ corresponding to red, green, blue colors, respectively, for a color imaging embodiment.

At step 1200, the optical element (e.g., a low-NA microscope objective lens) filters light it receives. For example, the optical element can filter light issuing from the specimen 20. The optical element may be an objective lens that filters light by accepting light within a range of incidence angles according to its numerical aperture (NA). In some cases, the optical element may be a low-NA objective lens (e.g., a 2×, 0.08NA objective lens) of a conventional microscope.

At step 1300, the radiation detector receives a projection of the filtered light from the optical element and captures a snapshot intensity distribution measurement at each of the N sample times, $t_{i=1\ to\ N}$ to acquire a plurality of N low-resolution intensity images. Each low resolution intensity image sampled by the radiation detector is associated with a region in Fourier space. In many embodiments, the variable illuminator provides illumination from certain incidence angles at step 1100 to generate overlapping areas between neighboring regions in Fourier space. In one embodiment, the variable illuminator provides illumination to provide an overlapping area between neighboring regions of 2% to 99.5% of the area of one of the regions. In another embodiment, the variable illuminator provides illumination to provide an overlapping area between neighboring regions of 65% to 75% of the area of one of the regions. In one embodiment, the variable illuminator provides illumination to provide an overlapping area between neighboring regions of about 65% of the area of one of the regions.

In steps 1400 and 1500, a high-resolution image of the specimen area may be computationally reconstructed from the plurality of N low-resolution intensity distribution measurements, $I_{lm}$ $$(k_x^i, k_y^i)$$

(indexed by their illumination wavevector, $$k_x^i, k_y^i,$$

with i=1, 2, . . . N) captured at step 1300.

At step 1400, a high-resolution image: $\sqrt{I_h}e^{i\varphi_h}$ is initialized in the spatial domain, and a Fourier transform is applied to the initial value to obtain an initialized Fourier transformed image $\tilde{I}_h$. The initialized high-resolution solution may be an initial guess. This initial guess may be determined based on the assumption that the specimen is located at the out-of-focus plane $z=z_0$. In some cases, the initial guess may be determined as a random complex matrix (for both intensity and phase). In other cases, the initial guess may be determined as an interpolation of the low-resolution intensity measurement with a random phase. An example of an initial guess is $\varphi=0$ and $I_h$ interpolated from any low-resolution image of the specimen area. Another example of an initial guess is a constant value. The Fourier transform of the initial guess can be a broad spectrum in the Fourier domain.

At step 1500, the high-resolution image of the specimen area is computationally reconstructed by iteratively combining low-resolution intensity measurements in Fourier space using the processor 210 of the FPI system 10.

At optional step 1600, the display 230 may receive image data such as the high-resolution image data to $\sqrt{I_h}e^{i\varphi_h}$ and/or other data from the processor 210, and display the data on the display 230.

Figure 6B:
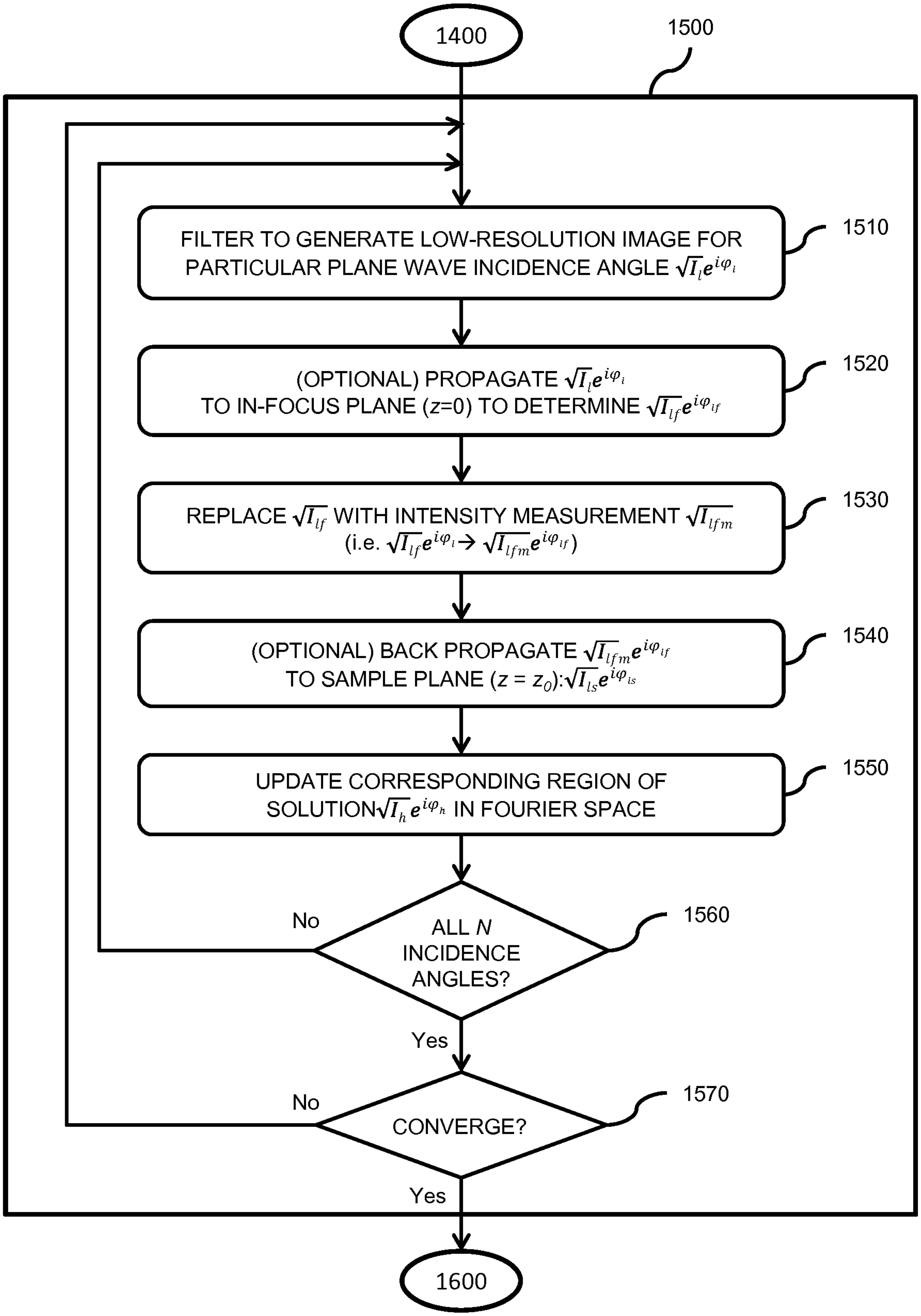
FIG. 6B is a flowchart of sub-steps of step 1500 of FIG. 6A, according to an embodiment of the invention.

FIG. 6B is a flowchart of sub-steps of step 1500 of FIG. 6A, according to an embodiment of the invention. In this illustrated example, step 1500 comprises step 1510, step 1530, step 1550, step 1560, step 1570, step 1580, and step 1590. Step 1500 may optionally comprise steps 1520 and 1540. Optional steps 1520 and 1540 may be performed if the specimen 20 is out-of-focus by the amount of $z_0$.

At step 1510, the processor 210 performs low-pass filtering of the high-resolution image $\sqrt{I_h}e^{i\varphi_h}$ in the Fourier domain to generate a low-resolution image $\sqrt{I_l}e^{i\varphi_l}$ for a particular plane wave incidence angle $$(\theta_x^i, \theta_y^i)$$

with a wave vector $$(k_x^i, k_y^i).$$

The Fourier transform of the high-resolution image is $\tilde{I}_h$ and the Fourier transform of the low-resolution image for a particular plane wave incidence angle is $\tilde{I}_l$. In the Fourier domain, the FPI method filters a low-pass region from the spectrum $\tilde{I}_h$ of the high-resolution image $\sqrt{I_h}e^{i\varphi_h}$. In cases with an optical element in the form of an objective lens, this region is a circular aperture with a radius of NA*$k_0$, where $k_0$ equals $2\pi/\lambda$ (the wave number in vacuum), given by the coherent transfer function of an objective lens. In Fourier space, the location of the region corresponds to the incidence angle. For an oblique plane wave incidence with a wave vector $$(k_x^i, k_y^i),$$

the region is centered about a position $$(-k_x^i, -k_y^i)$$

in the Fourier domain of $\sqrt{I_h}e^{i\varphi_h}$.

At optional step 1520, using the processor 210, the low-resolution image, $\sqrt{I_l}e^{i\varphi_l}$ is propagated in the Fourier domain to the in-focus plane 122 at z=0 of the optical element 130 to determine the low-resolution image at the focused position: $\sqrt{I_{lf}}e^{i\varphi_{lf}}$. In one embodiment, Step 1520 can be performed by Fourier transforming the low-resolution image $\sqrt{I_l}e^{i\varphi_l}$, multiplying by a phase factor in the Fourier domain, and inverse Fourier transforming to obtain $\sqrt{I_{lf}}e^{i\varphi_{lf}}$. In another embodiment, step 1520 can be performed by the mathematically equivalent operation of convolving the low-resolution image $\sqrt{I_l}e^{i\varphi_l}$ with the point-spread-function for the defocus. In another embodiment, step 1520 can be performed as an optional sub-step of step 1510 by multiplying by multiplying $\tilde{I}_l$ by a phase factor in the Fourier domain before performing the inverse Fourier transform to produce $\sqrt{I_{lf}}e^{i\varphi_{lf}}$. Optional step 1520 need not be included if the specimen 20 is located at the in-focus plane (z=0) of the optical element.

At step 1530, using the processor 210, the computed amplitude component $\sqrt{I_{lf}}$ of the low-resolution image at the in-focus plane, $\sqrt{I_{lf}}e^{i\varphi_{lf}}$, is replaced with the square root of the low-resolution intensity measurement $\sqrt{I_{lfm}}$ measured by the radiation detector of the FPI device. This forms an updated low resolution target: $\sqrt{I_{lfm}}e^{i\varphi_{lf}}$.

At optional step 1540, using the processor 210, the updated low-resolution image $\sqrt{I_{lfm}}e^{i\varphi_{lf}}$ may be back-propagated to the sample plane ($z=z_0$) to determine $\sqrt{I_{ls}}e^{i\varphi_{ls}}$. Optional step 1540 need not be included if the specimen is located at the in-focus plane of the optical element, that is, where $z_0=0$. In one embodiment, step 1540 can be performed by taking the Fourier transform of the updated low-resolution image $\sqrt{I_{lfm}}e^{i\varphi_{lf}}$ and multiplying in the Fourier space by a phase factor, and then inverse Fourier transforming it. In another embodiment, step 1540 can be performed by convolving the updated low-resolution image $\sqrt{I_{lfm}}e^{i\varphi_{lf}}$ with the point-spread-function of the defocus. In another embodiment, step 1540 can be performed as a sub-step of step 1550 by multiplying by a phase factor after performing the Fourier transform onto the updated target image.

At step 1550, using the processor 210, a Fourier transform is applied to the updated target image propagated to the sample plane: $\sqrt{I_{ls}}e^{i\varphi_{ls}}$, and this data is updated in the corresponding region of high-resolution solution $\sqrt{I_h}e^{i\varphi_h}$ in the Fourier space corresponding to the corresponding to the incidence wave vector $$(k_x^i, k_y^i).$$

At step 1560, the processor 210 determines whether steps 1510 through 1560 have been completed for all incidence angles. If steps 1510 through 1560 have not been completed for all incidence angles, steps 1510 through 1560 are repeated for the next incidence angle.

In most embodiments, the neighboring regions in Fourier space, which are iteratively updated for each incidence angle, overlap each other. In the overlapping area between updated overlapping regions, the FPI system 10 has multiple samplings over the same Fourier space. The incidence angles determine the area of the overlapping area. In one embodiment, the overlapping area between neighboring regions may have an area that is between 2% to 99.5% of the area of one of the neighboring regions. In another embodiment, the overlapping area between neighboring regions may have an area that is between 65% to 75% of the area of one of the neighboring regions. In another embodiment, the overlapping area between neighboring regions may have an area that is about 65% of the area of one of the neighboring regions. In certain embodiments, each overlapping region has the same area.

At step 1570, the processor 210 determines whether the high-resolution solution has converged (step 1570). For example, the processor 210 may determine whether the high-resolution solution may have converged to a self-consistent solution. In one case, the processor 210 compares the previous high-resolution solution of the previous iteration or initial guess to the present high-resolution solution, and if the difference is less than a certain value, the solution may have converged to a self-consistent solution. If processor 210 determines that the solution has not converged, then steps 1510 through 1570 are repeated. In one embodiment, steps 1510 through 1560 are repeated once. In other embodiments, steps 1510 through 1560 are repeated twice or more. If the solution has converged, the processor 210 transforms the converged solution in Fourier space to the spatial domain to recover a high-resolution image $\sqrt{I_h}e^{i\varphi_h}$. If the processor 210 determines that the solution has converged at step 1570, then the process may proceed to optional step 1600.

Figure 6C:
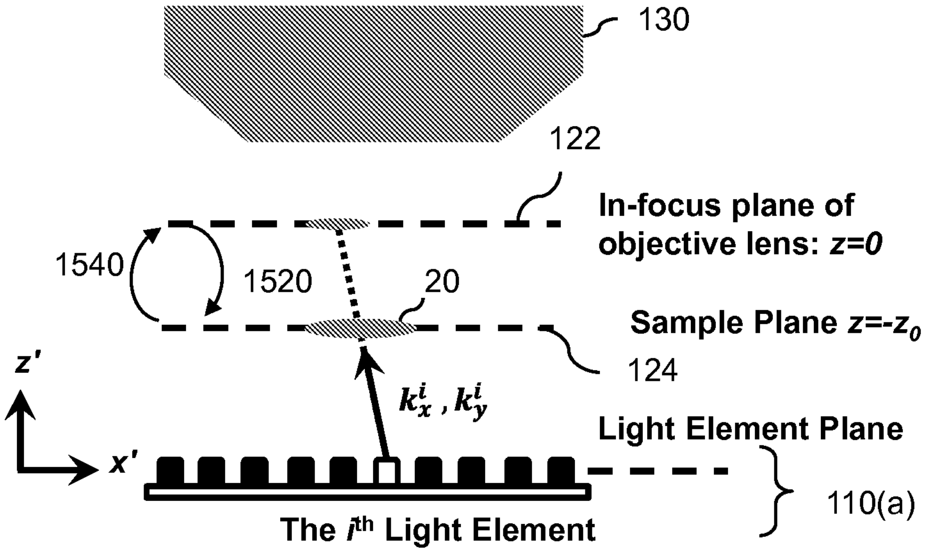
FIGS. 6C and 6D are schematic diagrams of components of an FPI device with light elements in the form of an LED matrix, according to embodiments of the invention.
Figure 6D:
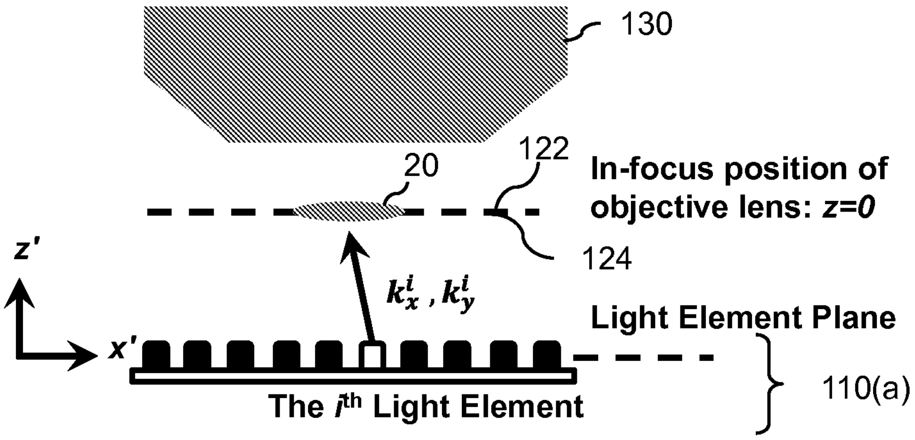
Figure 6E:
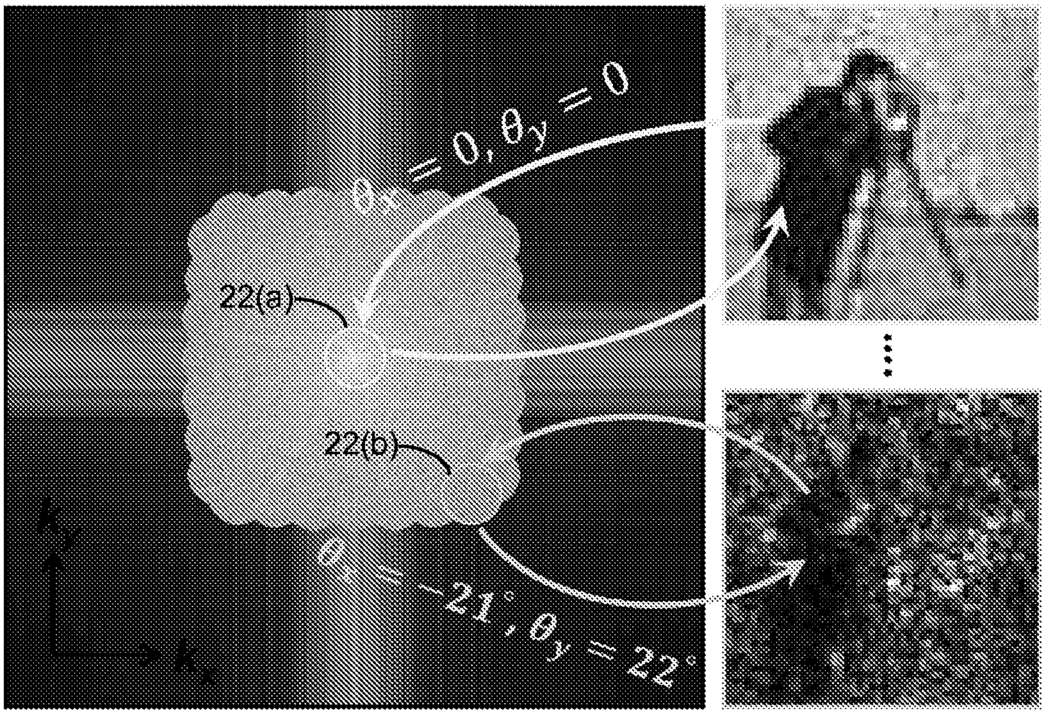
FIG. 6E is an illustration of steps of the FPI method described with reference to FIGS. 6A and 6B.

FIG. 6E is an illustration of steps of the FPI method described with reference to FIGS. 6A and 6B. The left-hand-side image in FIG. 6E includes two regions 22(*a*) and 22(*b*) with circular low-pass filter shapes in Fourier space of the high-resolution solution, defined by the optical transfer function of a 2× objective lens 0.08NA. Region 22(*a*) is based on a circular low-pass filter shape associated with normal plane wave incidence at the first incidence angle: $\theta_x$=0; $\theta_y$=0, i=1. Region 22(*b*) is based on a circular low-pass filter shape associated with an Nth plane wave incidence angle: $\theta_x$=−21°; $\theta_y$=22°; i=N. To perform low-pass filtering at each incidence angle, data outside the circular region in the Fourier domain is omitted, which results in a low-resolution image. The low-resolution image resulting from filtering based on oblique plane wave incidence angle: $\theta_x$=−21; $\theta_y$=22° is shown at the top right-hand-side of FIG. 6E. The low-resolution image resulting from filtering at this oblique plane wave incidence angle of $\theta_x$=−21°; $\theta_y$=22° is shown at the bottom right hand side. The wave vectors of the incidence angles in the x-direction and y-direction are denoted as $k_{xi}$ and $k_{yi}$ respectively. In this illustration, the dimensions of the regions 22(*a*) and 22(*b*) are defined by the optical transfer function of a 2× objective lens 0.08NA based on approximating as circular pupil function with a radius of NA*$k_0$, where $k_0$ equals 2π/λ (the wave number in vacuum).

In FIG. 6E, the FPI method updates the data within region 22(*a*) of the high-resolution reconstruction corresponding to the normal incidence $\theta_x$=0, $\theta_y$=0, according to step 1550 of FIG. 6B. The region is updated with low-resolution image data having an updated intensity measurement $I_{ls}$ $$(k_x^1, k_y^1) \text{ where } k_x^1 = 0, k_y^1 = 0.$$

In FIG. 6E, the FPI method also updated the data within region 22(*b*) of the high-resolution reconstruction corresponding to the $n^{th}$ incidence angle $\theta_x$=−21°; $\theta_y$=22°; i=N, according to step 1550 of FIG. 6B. The region is updated with low-resolution image data having an updated intensity measurement $I_{ls}$ $$(k_x^N, k_y^N).$$

Figure 6F:
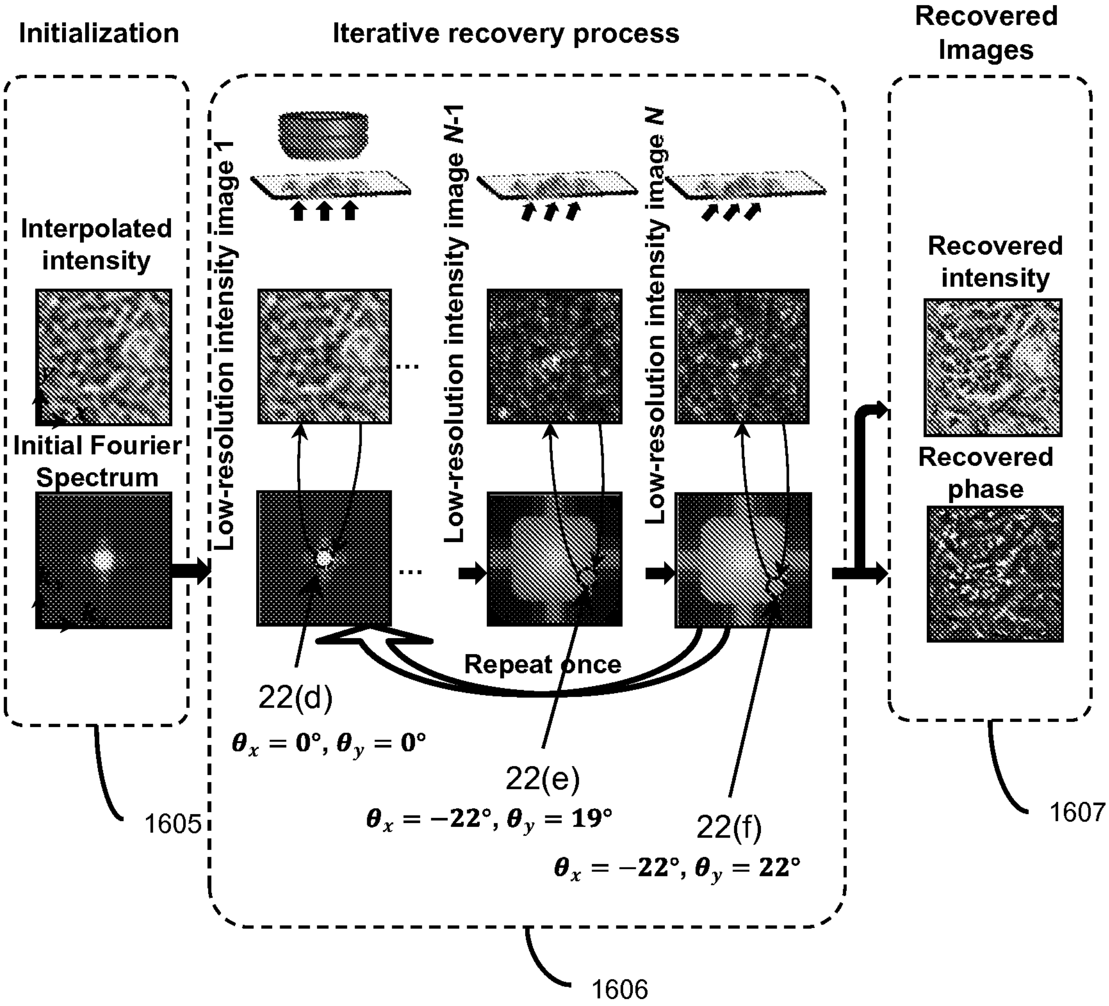
FIG. 6F is another illustration of steps of the FPI method described with reference to FIGS. 6A and 6B.

FIG. 6F is another illustration of steps of the FPI method described with reference to FIGS. 6A and 6B. In this case, the specimen 20 is at the in-focus plane. The schematic drawing includes illustrations 1605, 1606, and 1607. Illustration 1605 includes a representative image of an initial Fourier spectrum resulting from step 1400 and the interpolated intensity. Illustration 1606 represents the iterative portion of the step 1500, which includes 1510, 1530, 1550 in this case. Illustration 1606 includes N iterations. Each of the regions 22(*d*), 22(*e*), and 22(*f*) are the circular low-pass filter shapes in Fourier space of the high-resolution solution. The dimensions of the regions 22(*a*) and 22(*b*) are defined by the optical transfer function of a 2× objective lens 0.08NA based on approximating as circular pupil function with a radius of NA*$k_0$, where $k_0$ equals 2π/λ (the wave number in vacuum). At the first iteration (i=1), $\theta_x$=0; $\theta_y$=0, region 22(*d*) is updated at step 1550. At the N−1$^{th}$ iteration (i=N−1), $\theta_x$=−22; $\theta_y$=19, region 22(*e*) is updated at step 1550. At the N$^{th}$ iteration (i=N), $\theta_x$=−22; $\theta_y$=22, region 22(*f*) is updated at step 1550. Illustration 1606 includes the recovered phase image and the recovered intensity images.

In embodiments, the FPI method can include digital refocusing by including optional steps 1520 and 1540. The digital refocusing feature of steps 1520 and 1540 propagates the image from the in-focus plane 122 z=0 to the sample plane 124 at z=$z_0$. Digital refocusing may be needed when the specimen 20 is located at the sample plane 124 at z=$z_0$, while the in-focus plane 122 of the optical element (e.g., objective lens) is located at position z=0. In other words, digital refocusing may be needed when the specimen 20 is out-of-focus by the amount of $z_0$. FIGS. 6C and 6D are schematic diagrams of components of an FPI device 100(*a*) with light elements in the form of an LED matrix, according to an embodiment of the invention. In FIG. 6C, the specimen 20 is out-of-focus by an amount of −$z_0$, and optional steps 1520 and 1540 can be used to digitally refocus. In FIG. 6D, the specimen 20 is located at the in-focus position at the in-focus plane 122. In this case, optional steps 1520 and 1540 may not be needed.

In one embodiment, an FPI system 10 with the FPI device 100(*a*) shown in FIG. 2B was used to perform the FPI method of FIGS. 6A and 6B where the specimen 20 was located at the in-focus plane 122. In this example, the light elements were in the form of 137 red LEDs as the light sources for oblique illuminations. The corresponding maximum NA of the reconstructed image was ~0.5 in the diagonal direction.

Figure 7A:
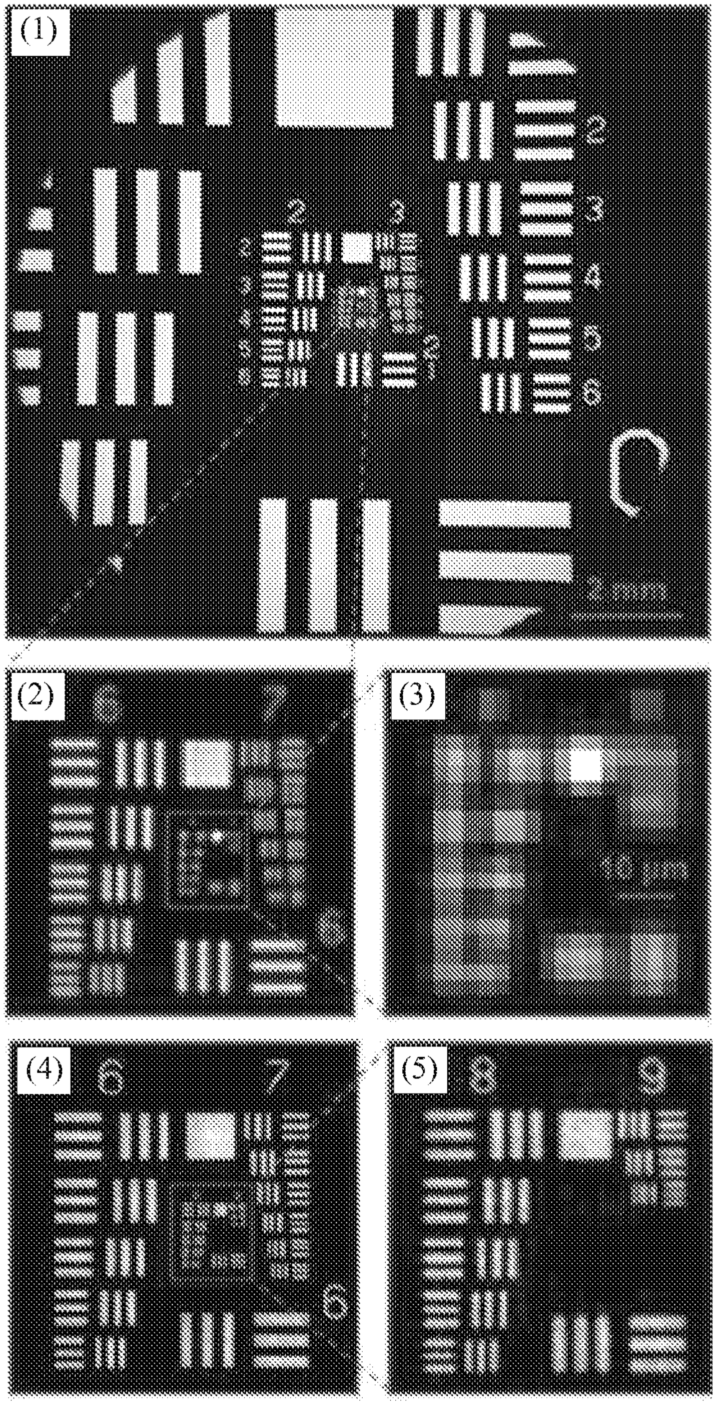
FIGS. 7A(1), 7A(2), 7A(3), 7A(4), and 7A(5) are images resulting from performing the FPI method of FIGS. 6A and 6B.

FIGS. 7A(1), 7A(2), 7A(3), 7A(4), and 7A(5) are images resulting from performing the FPI method of FIGS. 6A and 6B. These results show improved resolution. FIG. 7A(1) is a full field-of-view low-resolution intensity image of the specimen area. FIG. 7A(2) is a zoom-in-view of a selected portion of the low resolution image FIG. 7A(1) captured by the radiation detector, with a pixel size of 2.75 μm (5.5 μm divided by the magnification factor). FIG. 7A(3) is a zoom-in-view of the image in FIG. 7A(2). FIGS. 7A(4) and 7A(5) are computationally reconstructed high-resolution images, where the pixel size is 0.275 um.

Figure 7B:
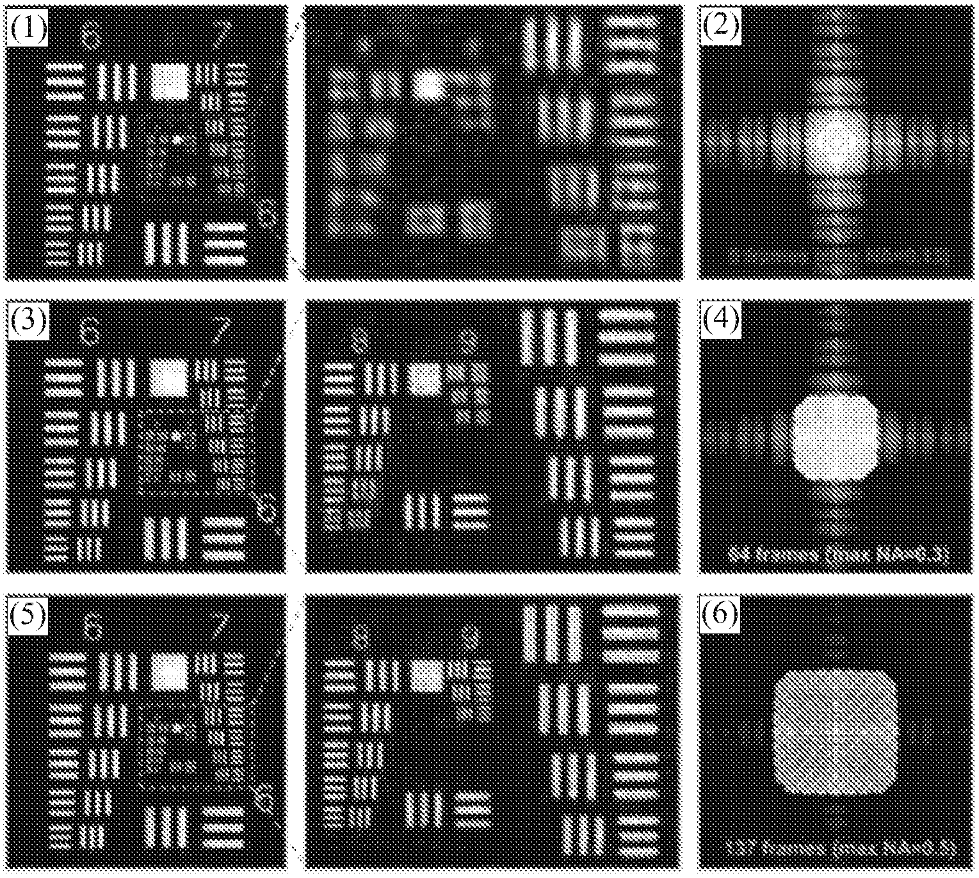
FIGS. 7B(1), 7B(2), 7B(3), 7B(4), 7B(5) and 7B(6) are images resulting from performing the FPI method of FIGS. 6A and 6B with different Nnumbers (N=5, 64, and 137) of incidence angles.

In one embodiment, an FPI system 10 with the FPI device 100(*a*) shown in FIG. 2B was used to perform the FPI method of FIGS. 6A and 6B where the specimen 20 was located at the in-focus plane 122, with different numbers of LED light sources (i.e. different N number of incidence angles) and their corresponding high-resolution reconstructions with different maximum NAs covered in Fourier space with the reconstruction. In the first case, five low resolution images (frames) were acquired at five incidence angles (i=1 to 5). FIG. 7B(1) shows resulting high-resolution images from the five frame reconstruction. FIG. 7B(2) shows the total spectrum of the five frame reconstruction in Fourier space that spans a maximum synthetic NA of 0.13. In the second case, 64 low resolution images (frames) were acquired at 64 incidence angles (i=1 to 64). FIG. 7B(3) shows resulting high-resolution images from the 64 frame reconstruction. FIG. 7B(4) shows the spectrum of the 64 frame reconstruction in Fourier space that spans a maximum synthetic NA of 0.3. In the third case, 137 low resolution images were acquired at 137 incidence angles (i=1 to 137). FIG. 7B(5) shows resulting high-resolution images from the 137 frame reconstruction. FIG. 7B(6) shows the spectrum of the 137 frame reconstruction in Fourier space that spans a maximum synthetic NA of 0.5. Each small circle in FIGS. 7B(2), 7B(4), and 7B(6) represent the spectrum region corresponding to one low-resolution intensity measurement. These results show that the field-of-view can be decoupled from the resolution of the optics using the FPI method, and as such, achieves wide field-of-view and high-resolution at the same time.

A. FPI Methods with Tile Imaging

In some embodiments, an FPI method with tile imaging divides the captured low-resolution images into a plurality of low-resolution tile images, independently acquires a high-resolution image for each of the tiles, and then combines the high-resolution tile images to generate a full field-of-view high-resolution image. In some cases, the high-resolution tile images may be combined with an image blending process. An example of an image blending process is alpha blending which can be found in PCT publication WO1999053469, entitled "A system and method for performing blending using an over sampled buffer," filed on Apr. 7, 1999, which is hereby incorporated by reference in its entirety. Since the high-resolution images of the tiles may be acquired independently, this FPI method may allow for parallel computing, which may reduce computation time, and may also reduce memory requirements. Moreover, the light from each light element may be accurately treated as a plane wave for each tile. The incident wavevector for each tile can be expressed as:

$$(k_x^i, k_y^i) = \frac{2\pi}{\lambda}\left(\frac{(x_c - x_i)}{\sqrt{(x_c - x_i)^2 + (y_c - y_i)^2 + h^2}}, \frac{(y_c - y_i)}{\sqrt{(x_c - x_i)^2 + (y_c - y_i)^2 + h^2}}\right) \quad \text{(Eqn. 1)}$$

where $(x_c, y_c)$ is the central position of each tile of the full field-of-view low-resolution image, $(x_i, y_i)$ is the position of the $i^{th}$ light element, and h is the distance between the illuminator and the specimen. Furthermore, this FPI method can assign a specific aberration-correcting pupil function to each tile in some cases.

In one embodiment, an FPI system 10 comprises a computing device 200 in the form of a personal computer having a processor 210 in the form of an Intel i7 CPU. In one experiment, this FPI system 10 performed an FPI method with tile imaging that divides the low-resolution images into tiles of 196×196 pixels. In one case, the processing time for each small image (converting 196 by 196 raw pixels to 1960 by 1960 pixels) is about 3.75 seconds using Matlab. In this case, the processing time for creating the full field-of-view gigapixel image is about 10 minutes when parallel computing using all 4 cores of the CPU. In other embodiments, an FPI system 10 can have a processor in the form of a GPU unit, which may reduce processing time by ten-fold. In other embodiments, the processor 210 may perform steps of the FPI method using another programming language, such as C++, which may reduce processing time. An example of this FPI system can be found in Zheng, G., Horstmeyer, R., and Yang, C., "Wide-field, high-resolution Fourier ptychographic microscopy," *Nature Photonics* (July, 2013), which is hereby incorporated by reference in its entirety.

Figure 8A:
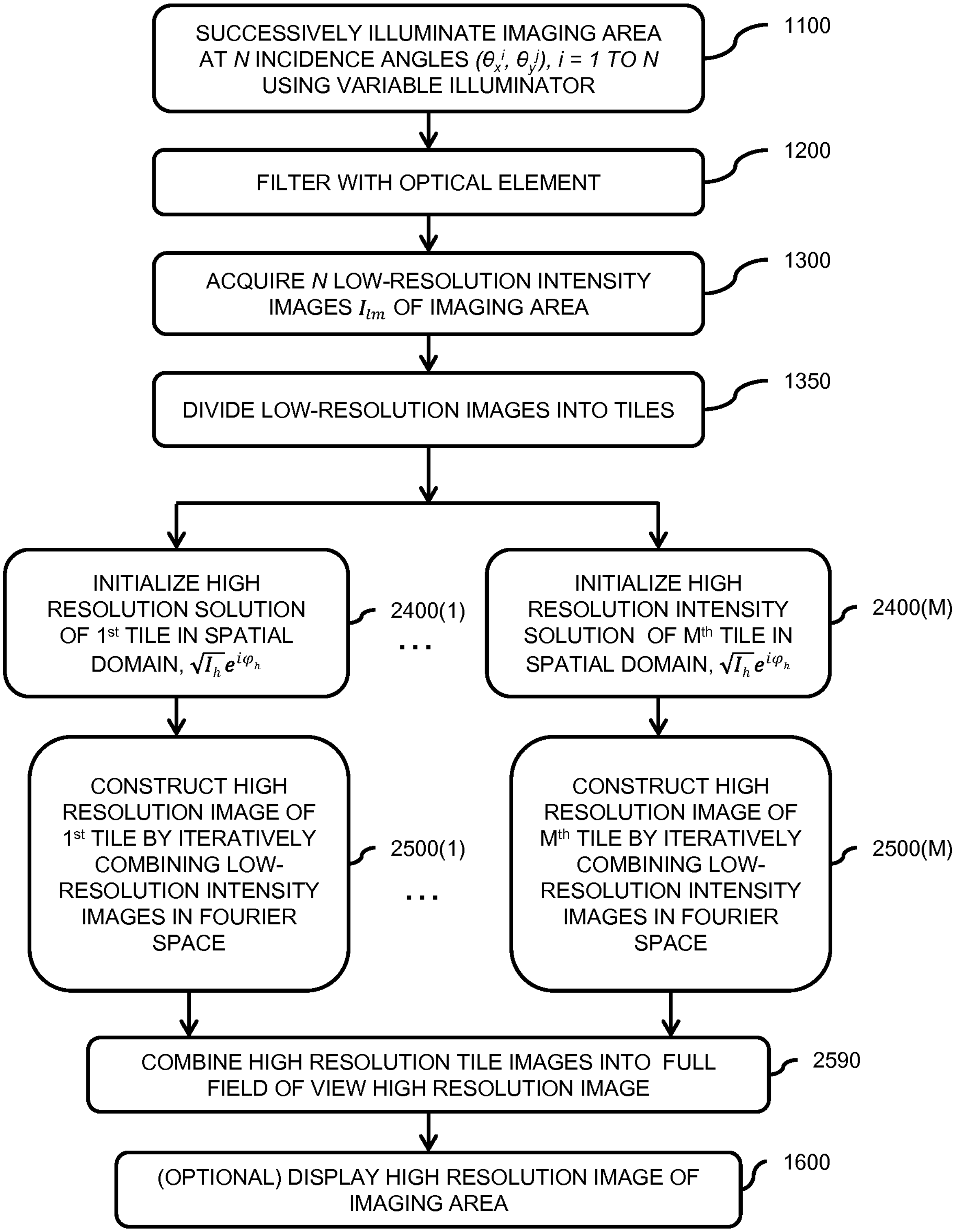
FIG. 8A is a flowchart of an FPI method with tile imaging, according to an embodiment of the invention.

FIG. 8A is a flowchart of an FPI method with tile imaging, according to an embodiment of the invention. This FPI method can be performed by an FPI system 10. To take advantage of parallel processing capabilities, the FPI system 10 includes a processor 210 with parallel processing capabilities such as, for example, the GPU unit or a processor having multiple cores (i.e. independent central processing units). The FPI method comprises a measurement process (steps 1100, 1200, and 1300), a recovery process (steps 1350, 2400 (i-M), 2500(*i*-M), 2590), and an optional display process (step 1600). The measurements process (steps 1100, 1200, and 1300) and display process (step 1600) are described with reference to FIG. 6A.

At step 1350, the processor 210 divides the full field-of-view into a plurality of tiles such as, for example, a two-dimensional matrix of tiles. The dimensions of a two-dimensional square matrix of tiles may be in powers of two such as, for example, a 256 by 256 matrix, a 64×64 matrix, etc. In one example, the processor may divide up a full field of view of 5,280×4,380 pixels into tiles having an area of 150×150 pixels.

Next, the processor 210 initializes the high-resolution image: $\sqrt{I_h}e^{i\varphi_h}$ in the spatial domain for each tile (1 to M) independently using parallel computing (step 2400(1) . . . step 2400(M)). A Fourier transform is applied to the initial guess. In some cases, the initial guess may be determined as a random complex matrix (for both intensity and phase). In other cases, the initial guess may be determined as an interpolation of the low-resolution intensity measurement with a random phase. An example of an initial guess is φ=0 and $I_{hr}$ of any low-resolution image of the specimen area. Another example of an initial guess is a constant value. The Fourier transform of the initial guess can be a broad spectrum in the Fourier domain.

At step 2500(1) . . . step 2500(M), the processor 210 computationally reconstructs a high-resolution image of each tile (1 to M) independently using parallel computing. The processor 210 computationally reconstructs the high-resolution image of each tile by iteratively combining low-resolution intensity images in Fourier space as described with reference to steps 1510, 1530, 1550, 1560, and 1570 shown in FIG. 6B, and described herein. Steps 1520 and 1540 may be included if the specimen is out of focus.

At step 2590, the processor 210 combines the high-resolution tile images into a full field-of view high-resolution image. In some cases, combining tile images comprises an imaging-blending process such as, for example, alpha blending.

Figure 8B:
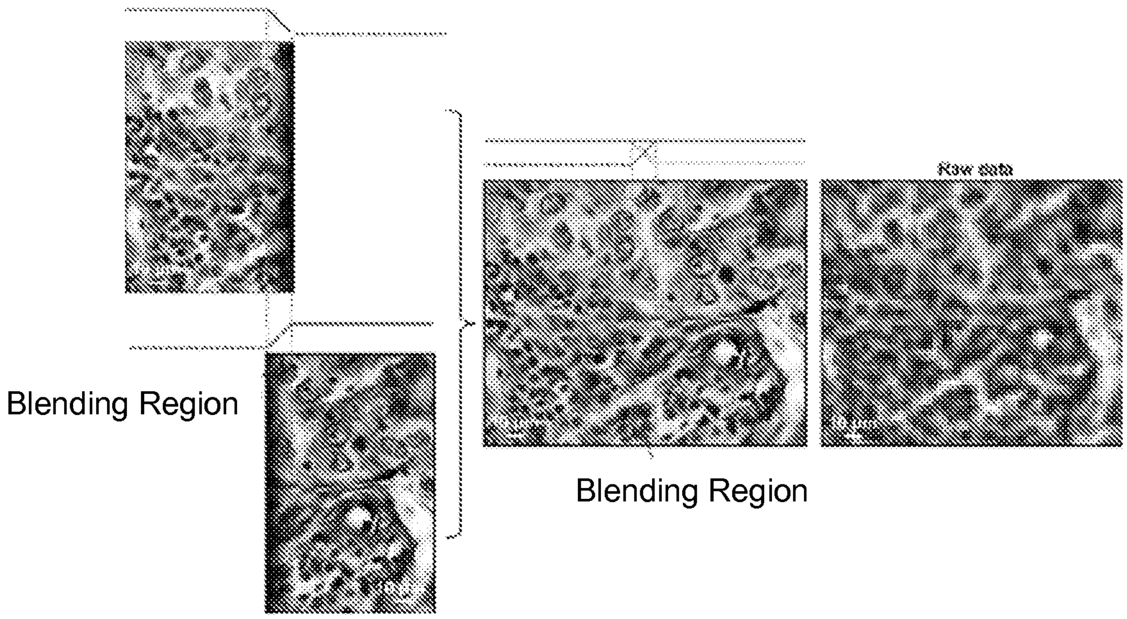
FIG. 8B are images resulting from preforming an FPI method with tile imaging using image blending, according to an embodiment of the invention.

FIG. 8B are images resulting from preforming an FPI method with tile imaging using image blending, according to an embodiment of the invention. In this example, the FPI method divided each low-resolution image of 5320-by-4370 pixels into 150-by-150 pixel sized tiles. On the left-hand-side, the images are of two neighboring high-resolution tile images. The image on the right-hand-side is a high-resolution image that combines the two high-resolution tile images using blending. In blending, the FPI method generates a blending region that replaces the edge regions of the adjacent tile images in the high-resolution full FOV image. In the illustration, the width of the blending region was 50 pixels. In other embodiments, the blending region may have other widths such as, for example, 6 pixels. With blending, there is no observable boundary in the blending region.

At optional step 1600, the image data of the recovered high-resolution two-dimensional image of the specimen area is displayed on the display 230.

In one embodiment, the FPI method with tile imaging may further comprise a procedure that accounts for differences in incident angles between different tiles based on the distance between the tiles and each light element.

B. FPI Methods with Digital Refocusing

Another limitation of conventional high-NA microscopes is the limited depth-of field. As an example, the depth-of-field of a conventional microscope with a 20× objective lens with 0.4 NA is about 5 μm. With a conventional microscope, the resolution degrades as the specimen moves away from the in-focus plane 122 due to its limited depth-of-field. To achieve optimal resolution using a conventional microscope, the operator needs to move the stage to mechanically bring the specimen back into focus. In this regard, a precise mechanical stage is needed in the conventional microscope to bring a specimen into the in-focus position with sub-micron accuracy.

In certain embodiments, an FPI system 10 implements an FPI method in which a specimen can be refocused digitally rather than mechanically. In these cases, the FPI method computationally refocuses the out-of-focus specimen 20 during the recovery process. Using digital refocusing, the FPI system 10 can expand its depth-of focus beyond the physical limitations of its optical element.

Figure 10A:
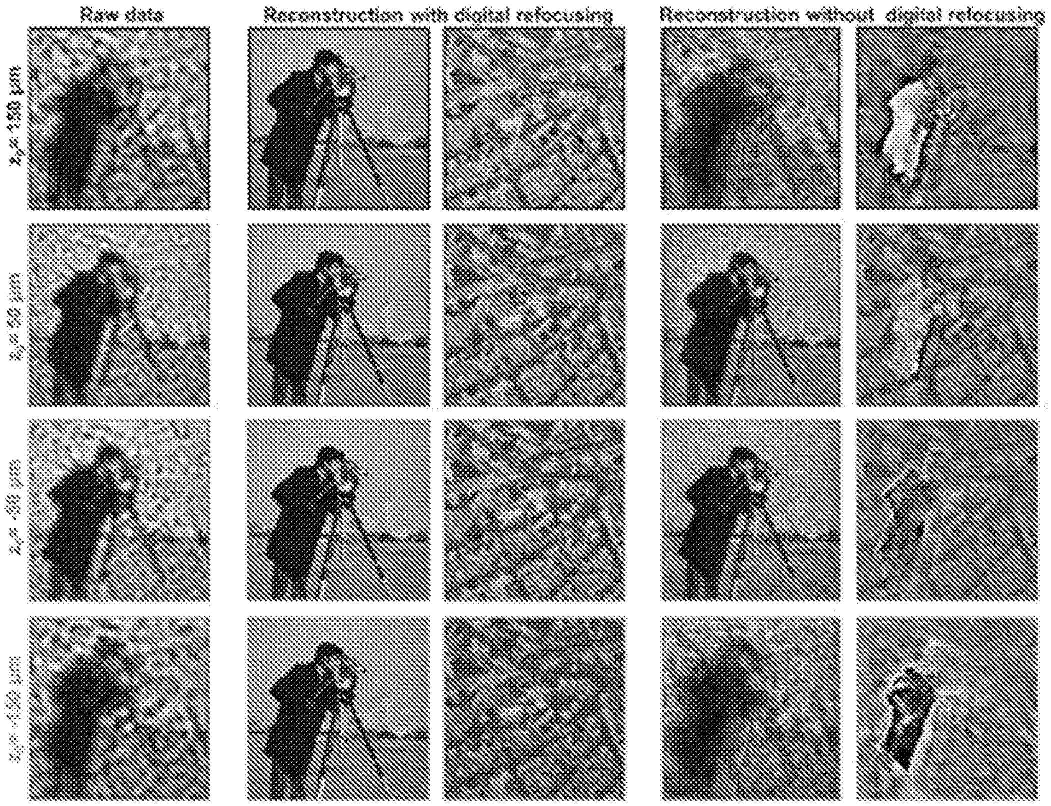
FIG. 10A are images from a numerical simulation of an FPI system 10 using an FPI method with and without digital refocusing for comparison, according to an embodiment of the invention.

FIG. 10A are images from a numerical simulation of an FPI system 10 using an FPI method with and without digital refocusing for comparison, according to an embodiment of the invention. These images show that the high-resolution reconstruction resulting from using this FPI method is invariant to the specimen defocusing. In FIG. 10A, each row represents a different defocused amount in the z-direction of −150 μm, −50 μm, 50 μm, and 150 μm. Column 1 is the low-resolution image captured. Columns 2 and 3 are the recovered high-resolution intensity and phase profiles with digital refocusing. Columns 4 and 5 are the recovered high-resolution intensity and phase profiles without digital refocusing.

Figure 10B:
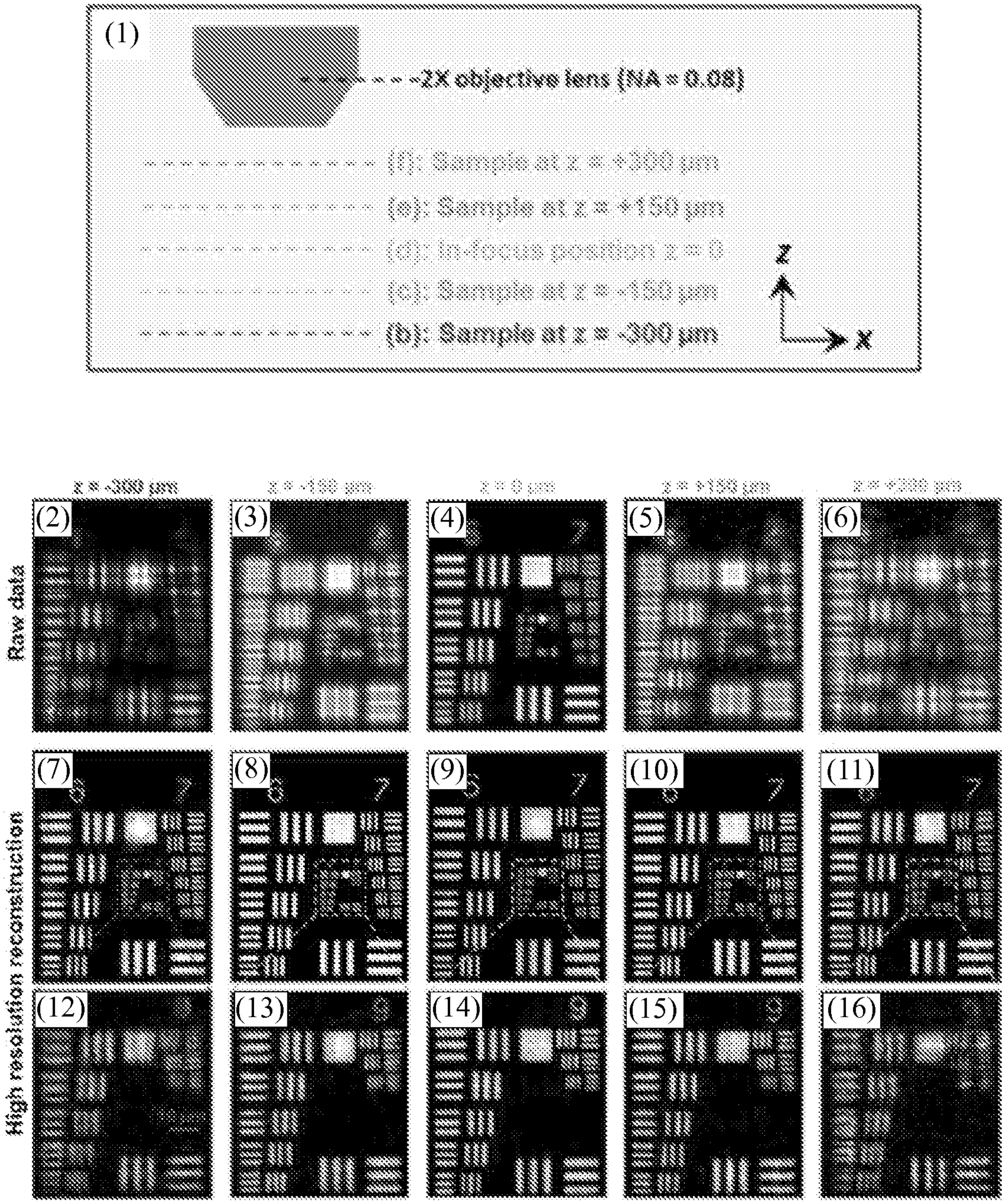
FIGS. 10B(1)-(16) show experimental results from performing an FPI method with digital refocusing, according to an embodiment of the invention, using the FPI device 100(*a*) shown in FIG. 2B.
Figure 10C:
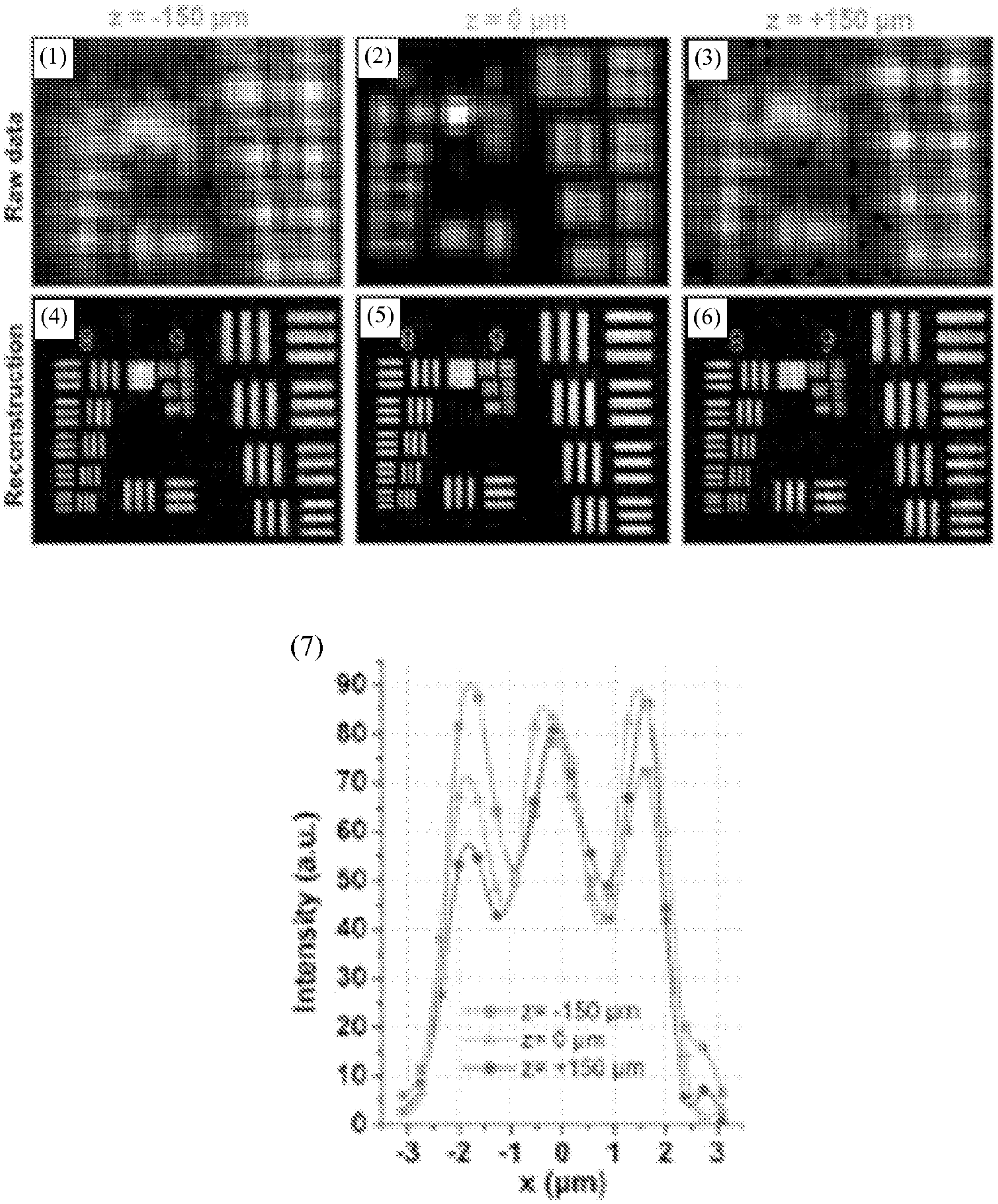
FIGS. 10C(1)-(7) include more detailed results from the experiment described with respect to FIGS. 10B(1)-10B(16).

FIG. 10B(1) is a schematic diagram of the experimental setup of an FPI device 100(*a*) performing an FPI method with digital refocusing, according to an embodiment. FIGS. 10B(2)-(16) are images of the experimental results from performing the FPI method with digital refocusing according the experimental setup in FIG. 10B(1). In the experiment, the specimen was moved to different z positions with defocused distances ranging from −300 μm to +300 μm, as shown in the schematic diagram in FIG. 10B(1). Low-resolution images (corresponding to 137 different LEDs of an LED matrix) were acquired for all the defocused positions. Representative low resolution images are shown in FIGS. 10B(2), (3), (4), (5), and (6). The high-resolution profiles of the specimen were computationally reconstructed following the recovery process with steps 1520 and 1540 of FIG. 6B. These high-resolution profiles are shown in FIGS. 10B(7), (8), (9), (10), and (11). FIGS. 10C(1)-(7) include more detailed results from the experiment described with respect to FIGS. 10B(1)-10B(16). FIG. 10C(7) is a graph of line traces for the smallest features in FIG. 10C(4), (5), and (6). As shown by the reconstructed images in FIGS. 10B and 10C, the FPI method with digital refocusing, can achieve resolution-invariant imaging depth of 0.3 mm.

Figure 10D:
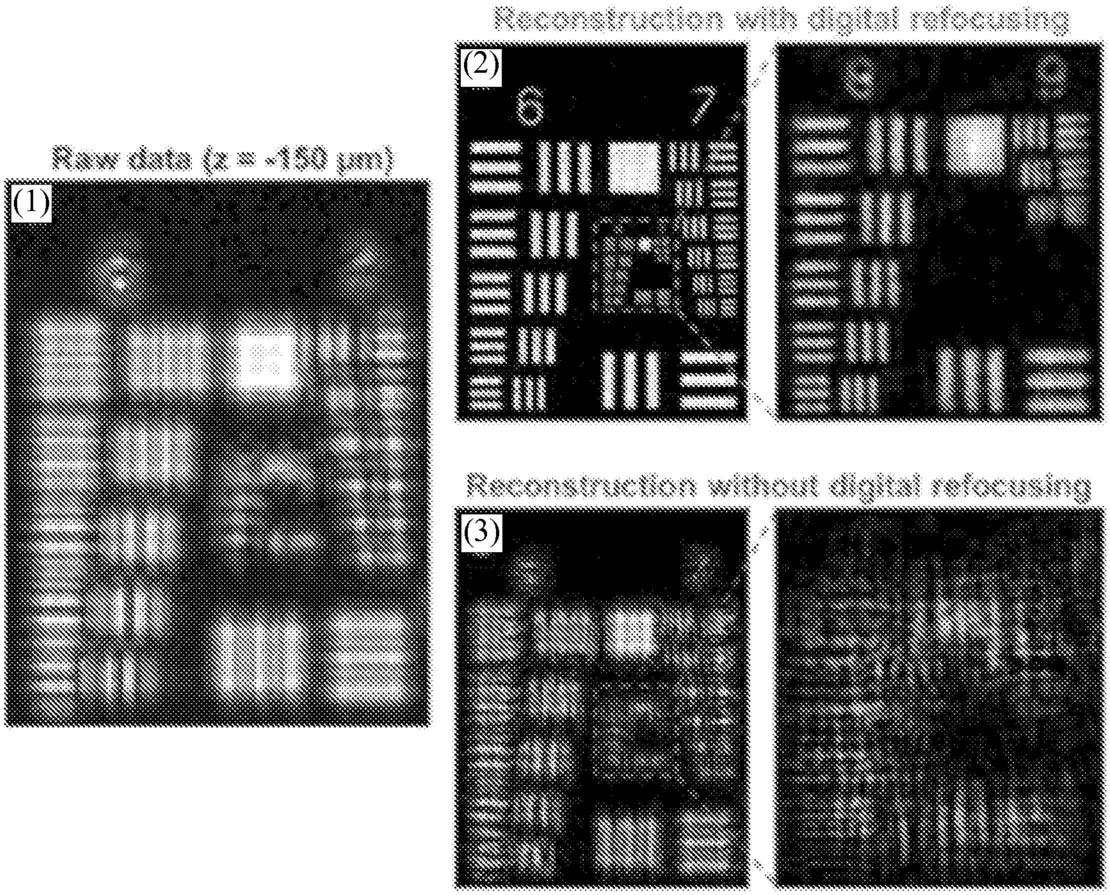
FIGS. 10D(1)-(3) are images of experimental results from performing the FPI method with and without digital refocusing for comparison, according to an embodiment of the invention.

FIGS. 10D(1)-(3) are images of experimental results from performing the FPI method with and without digital refocusing for comparison, according to an embodiment of the invention. In FIGS. 10D(2) and 10D(3), image reconstructions resulting from using an FPI method of embodiments are shown, with and without digital refocusing (e.g. steps 1520 and 1540), for comparison. FIG. 10D(1) is a low-resolution image of the raw data at z=−150 μm. FIG. 10D(2) is a reconstructed high-resolution image with digital refocusing and FIG. 10D(3) is a reconstructed high-resolution image without digital refocusing, for comparison.

Digital refocusing with FPI methods represents another significant improvement over conventional microscopes. Digital refocusing can correct: 1) cases where specimens are not perfectly aligned over the entire field-of-view and 2) for chromatic aberration digitally (assigning different defocused distances for different colors).

Figure 10E:
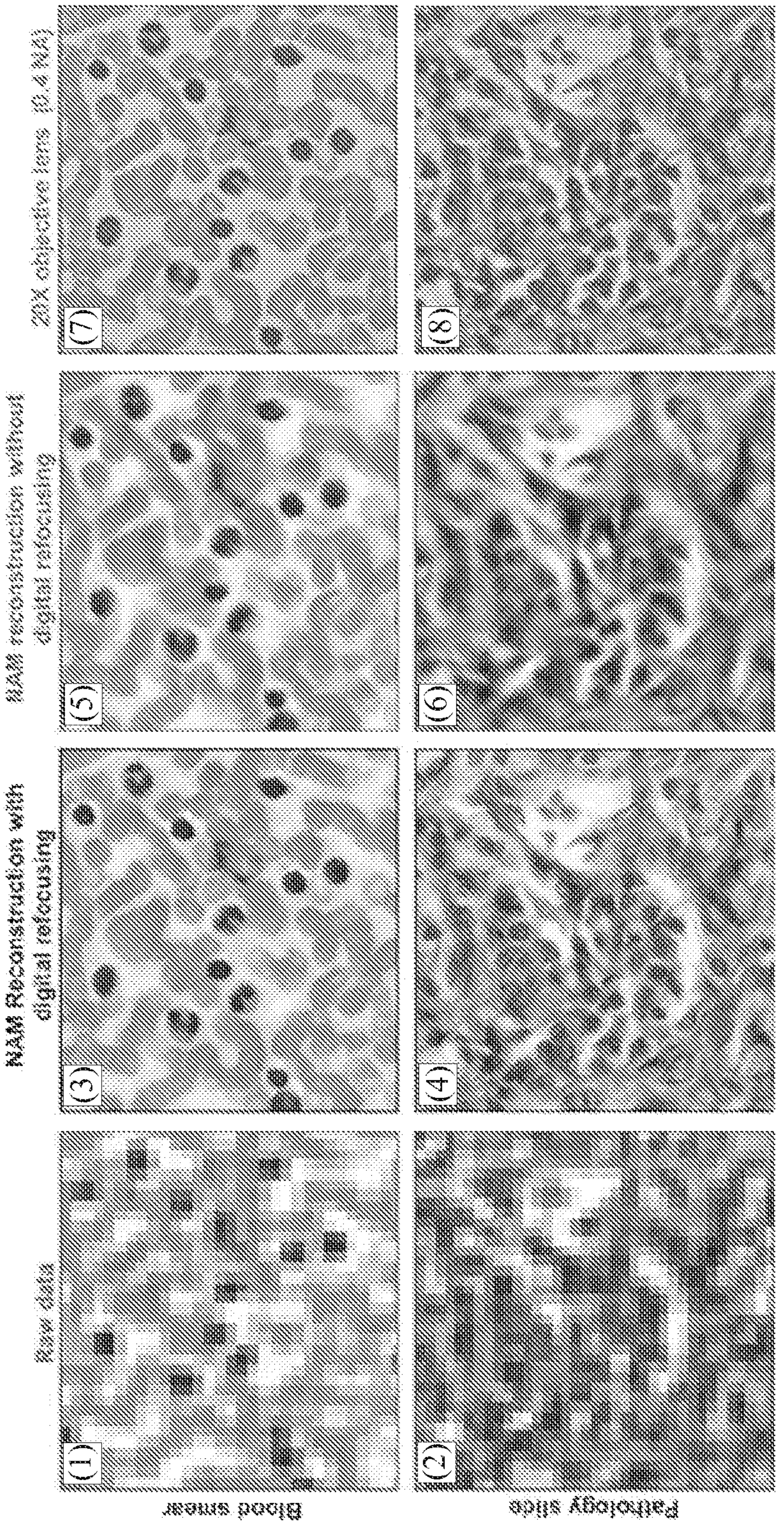
FIGS. 10E(1), 10E(2), 10E(3), 10E(4), 10E(5), 10E(6), 10E(7), and 10E(8) provides exemplary results from using an FPI system to perform an FPI method with digital refocusing, according to an embodiment of the invention, that corrects for chromatic aberration in a blood smear and in a pathology slide.

FIGS. 10E(1), 10E(2), 10E(3), 10E(4), 10E(5), 10E(6), 10E(7), and 10E(8) provide exemplary results from using an FPI system 10 to perform an FPI method with digital refocusing, according to an embodiment of the invention, that corrects for chromatic aberration in a blood smear and in a pathology slide. The FPI system 10 includes the FPI device 100(*a*) of FIG. 2B. FIG. 10E(1) is a representative low-resolution image of a blood smear as acquired by the FPI system 10. FIG. 10E(2) is a representative low-resolution image of a pathology slide as acquired by the FPI system 10. FIG. 10E(3) is a high-resolution image of the blood smear as computationally reconstructed with digital refocusing. FIG. 10E(4) is a high-resolution image of the pathology slide as computationally reconstructed with digital refocusing. FIG. 10E(5) is a high-resolution image of the blood smear as computationally reconstructed without digital refocusing. FIG. 10E(6) is a high-resolution image of the pathology slide as computationally reconstructed without digital refocusing. FIGS. 10E(7), and 10E(8) are conventional microscope images with a 20× objective lens of the blood smear and pathology slide respectively, for comparison.

C. FPI Methods with Digital Auto-Focusing

During operation of an FPI system 10, the z-position of the specimen 20 may not be known a priori. In certain embodiments, an FPI method may include a digital auto-focusing step that determines the z-position of the specimen 20 and uses this z-position to digitally refocus. For example, the FPI method of FIG. 6B may further comprise a step during or before step 1520 that computes the z-position of the specimen 20. The FPI system 10 may perform digital autofocusing by using the processor 210 to perform steps 1520 and 1540 in FIG. 6B using the computed z-position of the specimen. To compute the z-position of the specimen 20, the FPI method determines an auto-focusing index parameter. The auto-focusing index is defined by the following equation:

$$\text{Auto-focusing index: } 1/\sum \text{abs}\left(\sqrt{I_{lf}} - \sqrt{I_{lfm}}\right) \quad \text{(Eqn. 2)}$$

Where: $\sqrt{I_{lf}}$ is the amplitude image from the low-pass filtering, and $\sqrt{I_{lfm}}$ is the actual low-resolution measurement The summation in Eqn. 2 is for all oblique incidence angles. After the FPI method computes the estimated z-position of the specimen 20, the FPI method can digitally refocus to the estimated z-position. In some cases, the high-resolution image solution has been found to converge better when using an accurate z-position.

Figure 10F:
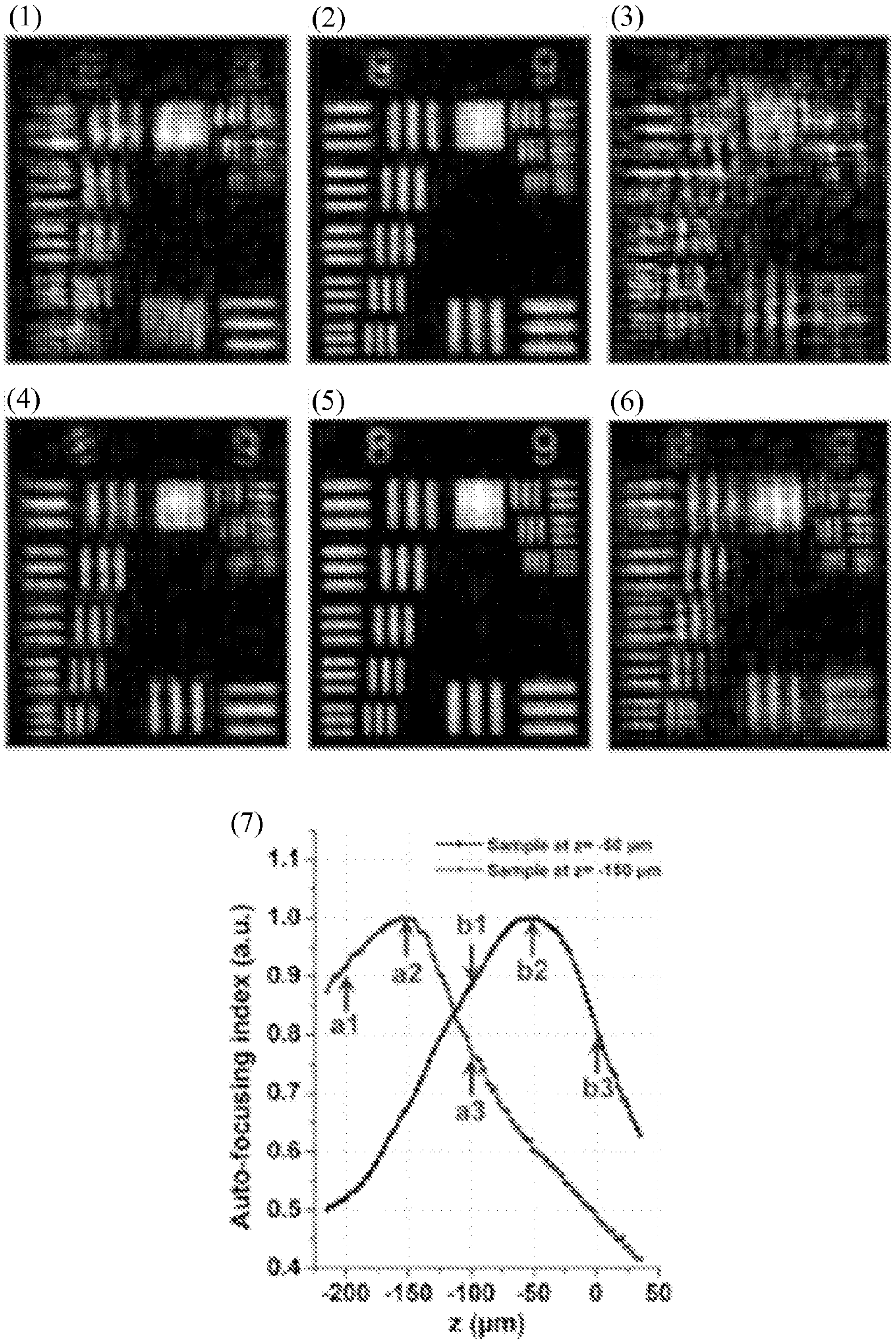
FIGS. 10F(1), 10F(2), 10F(3), 10F(4), 10F(5), 10F(6), and 10F(7) include experimental results from using an FPI system to perform an FPI method with digital autofocusing, according to an embodiment of the invention.

FIGS. 10F(1), 10F(2), 10F(3), 10F(4), 10F(5), 10F(6), and 10F(7) include experimental results from using an FPI system 10 to perform an FPI method with digital autofocusing, according to an embodiment of the invention. This FPI method computes an auto-focusing index for computing the z-position of the specimen automatically. In this first case, the specimen was placed at $z_0$=−150 μm. FIGS. 10F(1), 10F(2), and 10F(3) are reconstructed images for the specimen at $z_0$=−150 μm. In the second case, the specimen was placed at $z_0$=−50 μm of an FPI device. FIGS. 10F(4), 10F(5), and 10F(6) are reconstructed images for the specimen at $z_0$=−50 μm. Using the FPI method, the FPI system 10 computed the auto-focusing index for different z-positions based on Eqn. 2. FIG. 10F(7) is a graph of the computed auto-focus index values for the different z-positions. The maximum value of the auto-focusing index indicates the estimated z-position of the specimen. As shown, the estimated positions based on the maximum calculated autofocusing indexes are close to the actual positions of the specimen. Using an estimated positions, the FPI method can autofocus propagating the image to the estimated position.

D. FPI Methods with Digital Wavefront Correction

Although FPI methods do not require phase information as input, FPI methods of certain embodiments accommodate phase during iterative reconstruction. In these embodiments, the depth of focus can be extended beyond that of the objective lens using a numerical strategy to compensate for aberrations in the pupil function. Examples of such aberration compensation strategies can be found in Gutzler, T., Hillman, T. R., Alexandrov, S. A. and Sampson, D. D., "Coherent aperture-synthesis, wide-field, high-resolution holographic microscopy of biological tissue," *Opt. Lett.* 35, pp. 1136-1138 (2010), and Colomb, T. et al., "Automatic procedure for aberration compensation in digital holographic microscopy and applications to specimen shape compensation," *Appl. Opt.* 45, 851-863 (2006), which are hereby incorporated by reference in their entirety. The digital correction process digitally introduces a phase map to the coherent optical transfer function to compensate for aberrations at the pupil plane during the iterative image recovery process.

Figure 9A:
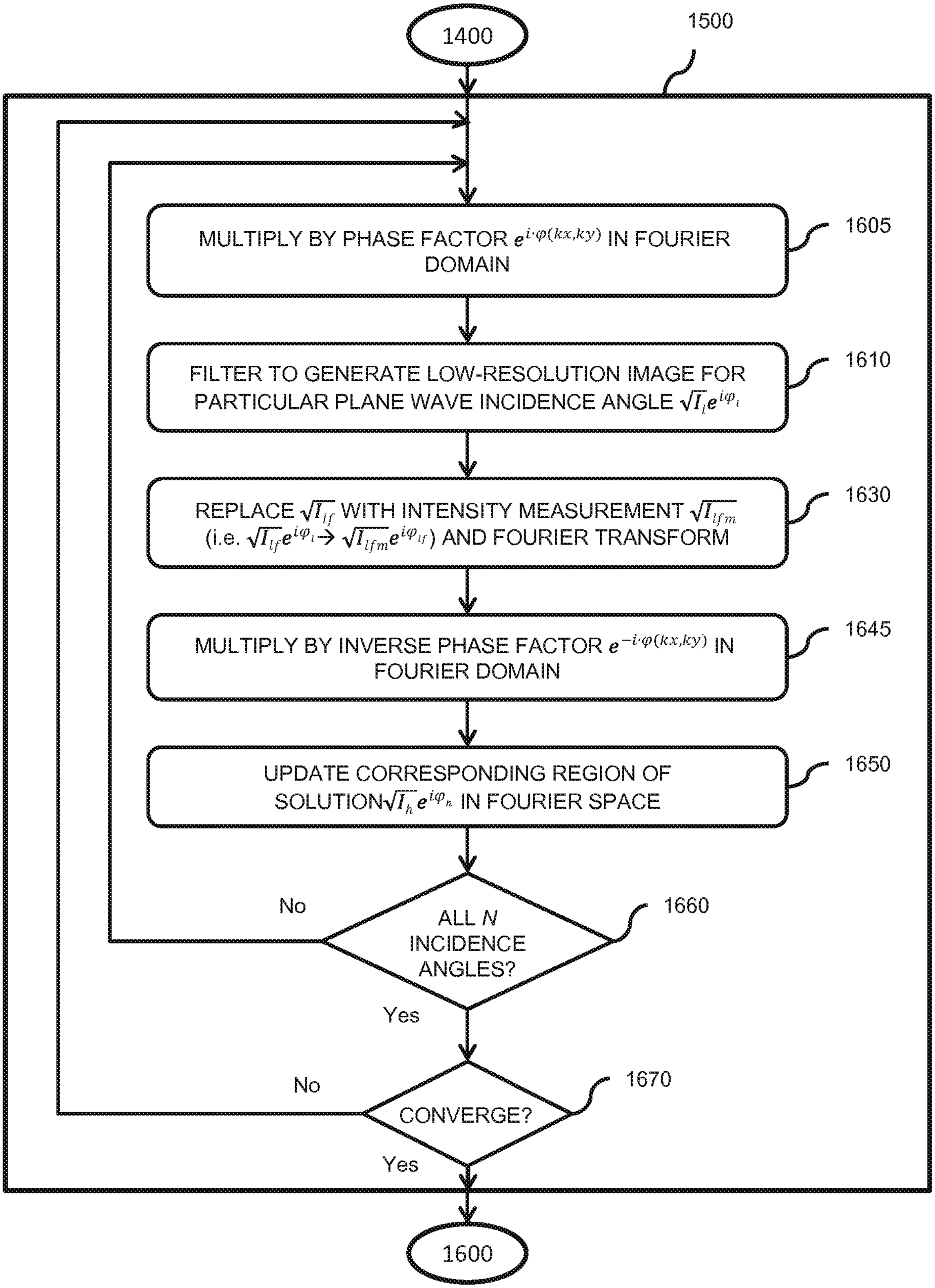
FIG. 9A is an FPI method with digital wavefront correction, according to an embodiment of the invention.

FIG. 9A is a flowchart of sub-steps of step 1500 of the FPI method of FIG. 6A, according to another embodiment of the invention. In this example, the FPI method includes digital wavefront correction. The FPI method incorporates digital wavefront compensation in the two multiplication steps 1605 and 1645. Specifically, step 1605 models the connection between the actual specimen profile and the captured intensity data (with includes aberrations) through multiplication with a pupil function: $e^{i\cdot\varphi(k_x,k_y)}$ by the processor 210. Step 1645 inverts such a connection to achieve an aberration-free reconstructed image. Specimen defocus is essentially equivalent to introducing a defocus phase factor to the pupil plane (i.e., a defocus aberration):

$$e^{i\cdot\varphi(k_x,k_y)}=e^{i\sqrt{(2\pi/\lambda)^2-k_x^2-k_y^2}\cdot z_0},\ k_x^2+k_y^2<(NA\cdot 2\pi/\lambda)^2 \qquad \text{(Eqn. 4)}$$

where $k_x$ and $k_y$ are the wavenumbers at the pupil plane, $z_0$ is the defocus distance, and NA is the numerical aperture of the optical element.

At step 1605, the processor 210 multiplies by a phase factor $e^{i\cdot\varphi(k_x,k_y)}$ in Fourier domain.

At step 1610, the processor 210 performs low-pass filtering of the high-resolution image $\sqrt{I_h}e^{i\varphi_h}$ in the Fourier domain to generate a low-resolution image $\sqrt{I_l}e^{i\varphi_l}$ for a particular plane wave incidence angle $$(\theta_x^i, \theta_y^i)$$

with a wave vector $$(k_x^i, k_y^i).$$

The Fourier transform of the high-resolution image is $\tilde{I}_h$ and the Fourier transform of the low-resolution image for a particular plane wave incidence angle is $\tilde{I}_l$. In the Fourier domain, the FPI method filters a low-pass region from the spectrum $\tilde{I}_h$ of the high-resolution image $\sqrt{I_h}e^{i\varphi_h}$. In cases with an optical element in the form of an objective lens, this region is a circular aperture with a radius of NA*$k_0$, where $k_0$ equals 2π/λ the wave number in vacuum), given by the coherent transfer function of an objective lens. In Fourier space, the location of the region corresponds to the incidence angle. For an oblique plane wave incidence with a wave vector $$(k_x^i, k_y^i),$$

the region is centered about a position $$(-k_x^i, -k_y^i)$$

in the Fourier domain of $\sqrt{I_h}e^{i\varphi_h}$.

At step 1630, using the processor 210, the computed amplitude component $\sqrt{I_{lf}}$ of the low-resolution image at the in-focus plane, $\sqrt{I_{lf}}e^{i\varphi_{lf}}$, is replaced with the square root of the low-resolution intensity measurement $\sqrt{I_{lfm}}$ measured by the radiation detector of the FPI device. This forms an updated low resolution target: $\sqrt{I_{lfm}}e^{i\varphi_{lf}}$.

At step 1645, the processor 210 multiplies by an inverse phase factor $e^{-i\cdot\varphi(k_x,k_y)}$ in Fourier domain.

At step 1650, using the processor 210, a Fourier transform is applied to the updated target image propagated to the sample plane: $\sqrt{I_{ls}}e^{i\varphi_{ls}}$, and this data is updated in the corresponding region of high-resolution solution $\sqrt{I_h}e^{i\varphi_h}$ in the Fourier space corresponding to the corresponding to the incidence wave vector $$(k_x^i, k_y^i).$$

At step 1660, the processor 210 determines whether steps 1605 through 1650 have been completed for all incidence angles. If steps 1605 through 1650 have not been completed for all incidence angles, steps 1605 through 1650 are repeated for the next incidence angle.

In most embodiments, the neighboring regions in Fourier space, which are iteratively updated for each incidence angle, overlap each other. In the overlapping area between updated overlapping regions, the FPI system 10 has multiple samplings over the same Fourier space. The incidence angles determine the area of the overlapping area. In one embodiment, the overlapping area between neighboring regions may have an area that is between 2% to 99.5% of the area of one of the neighboring regions. In another embodiment, the overlapping area between neighboring regions may have an area that is between 65% to 75% of the area of one of the neighboring regions. In another embodiment, the overlapping area between neighboring regions may have an area that is about 65% of the area of one of the neighboring regions. In certain embodiments, each overlapping region has the same area.

At step 1670, the processor 210 determines whether the high-resolution solution has converged. For example, the processor 210 may determine whether the high-resolution solution may have converged to a self-consistent solution. In one case, the processor 210 compares the previous high-resolution solution of the previous iteration or initial guess to the present high-resolution solution, and if the difference is less than a certain value, the solution may have converged to a self-consistent solution. If processor 210 determines that the solution has not converged, then steps 1605 through 1670 are repeated. In one embodiment, steps 1605 through 1670 are repeated once. In other embodiments, steps 1605 through 1670 are repeated twice or more. If the solution has converged, the processor 210 transforms the converged solution in Fourier space to the spatial domain to recover a high-resolution image $\sqrt{I_h}e^{i\varphi_h}$. If the processor 210 determines that the solution has converged at step 1570, then the process may proceed to optional step 1600.

Figure 9B:
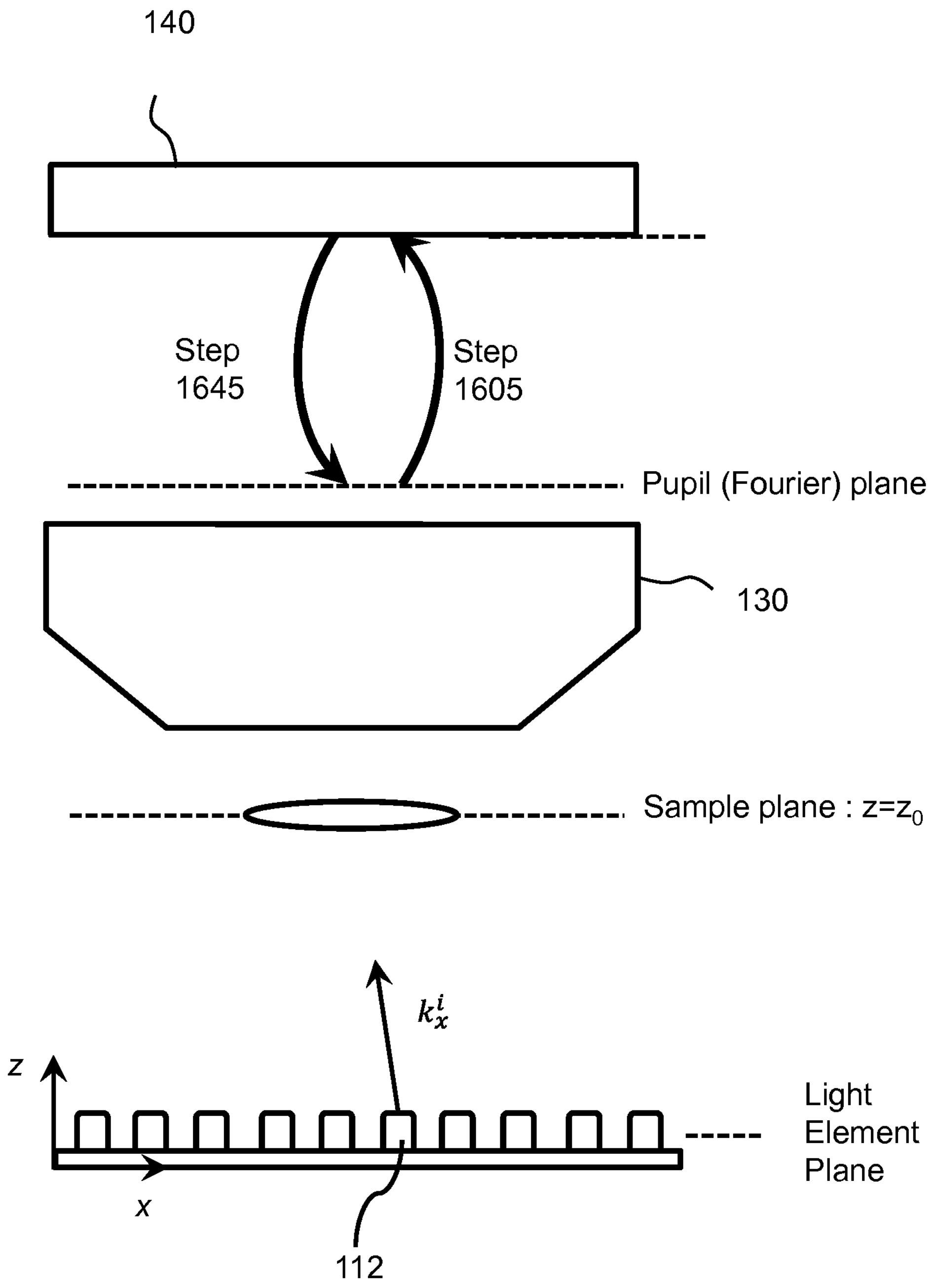
FIG. 9B is a schematic diagram of an FPI device implementing an FPI method with digital wavefront correction, according to an embodiment of the invention.

FIG. 9B is a schematic diagram of an FPI device 100 implementing an FPI method with digital wavefront correction, according to an embodiment of the invention. As shown, the digital pupil function is introduced at steps 1605 and 1645 to model the connection between the actual specimen profile and the captured intensity data, which may exhibit aberrations caused by defocus. The FPI method with digital wavefront correction can also be used to correct for the spatially varying aberrations of the optical element (e.g., objective lens).

If the defocus distance is unknown, the FPI method can digitally adjust the 'z' parameter to different values based on a computation of the auto-focusing index from Eqn. 4. The FPI method can then reconstruct the corresponding images, and select the sharpest image. This approach can also be extended to image a tiled sample. In this case, the FPI method can digitally adjust the 'z' parameter to achieve acuity for each tiled region of the whole image and combine the in-focus regions to form a fully focused image of the full field of view.

In other embodiments, alternative digital multiplicative phase factors can be included in multiplication steps 1605 and 1645 to correct for a variety of aberrations, as long as the factors correctly model the employed optics.

E. Estimated Computational Cost of the Recovery Process

The computational cost of the recovery process of the illustrated example of FIG. 6B can be approximated by the computational cost of steps 1510, 1550, and 1570, assuming that the low-resolution images captured by the radiation detector contains n pixels and that N different light elements are used for illuminations. In step 1510 of the recovery process, a two-dimensional fast Fourier transform (FFT) is performed to generate the low-resolution image $\sqrt{I_l}e^{i\varphi_l}$ and the corresponding computational cost is $n^2\cdot\log(n)$. In step 1550, another FFT is performed to update the corresponding region of the Fourier space of $\sqrt{I_{hr}}e^{i\varphi_{hr}}$ and the corresponding computational cost is $n^2\cdot\log(n)$. At step 1560, the above computation is repeated once for all incidence angles, and thus the computational cost is $N\cdot 2\cdot n^2\cdot\text{-}\log(n)$. If step 1570 is repeated once, then the computational cost is $2\cdot N\cdot 2\cdot n^2\cdot\log(n)$. Other steps in the recovery process are negligible compared to the above value. In summary, the computational complexity of the FPI method of FIG. 6B is $4\cdot N\cdot n^2\cdot\log(n)$ where Nis the total number of oblique incidences and n is the total number of pixels of the low-resolution image.

IV. Exemplary FPI Systems with Color Imaging and/or Phase Imaging

A. Color Imaging

Color imaging capability is pivotal in pathology and histology. In certain embodiments, an FPI system 10 capable of color imaging comprises a variable illuminator with an LED having light elements that can provide red, green, and blue illuminations. The FPI method combines the high-resolution image results from red, green, and blue LED illumination into each corresponding color channel to form a final high-resolution color image. Three images are generated corresponding to red, green, and blue, which are combined to form a high resolution color image.

Figure 11A:
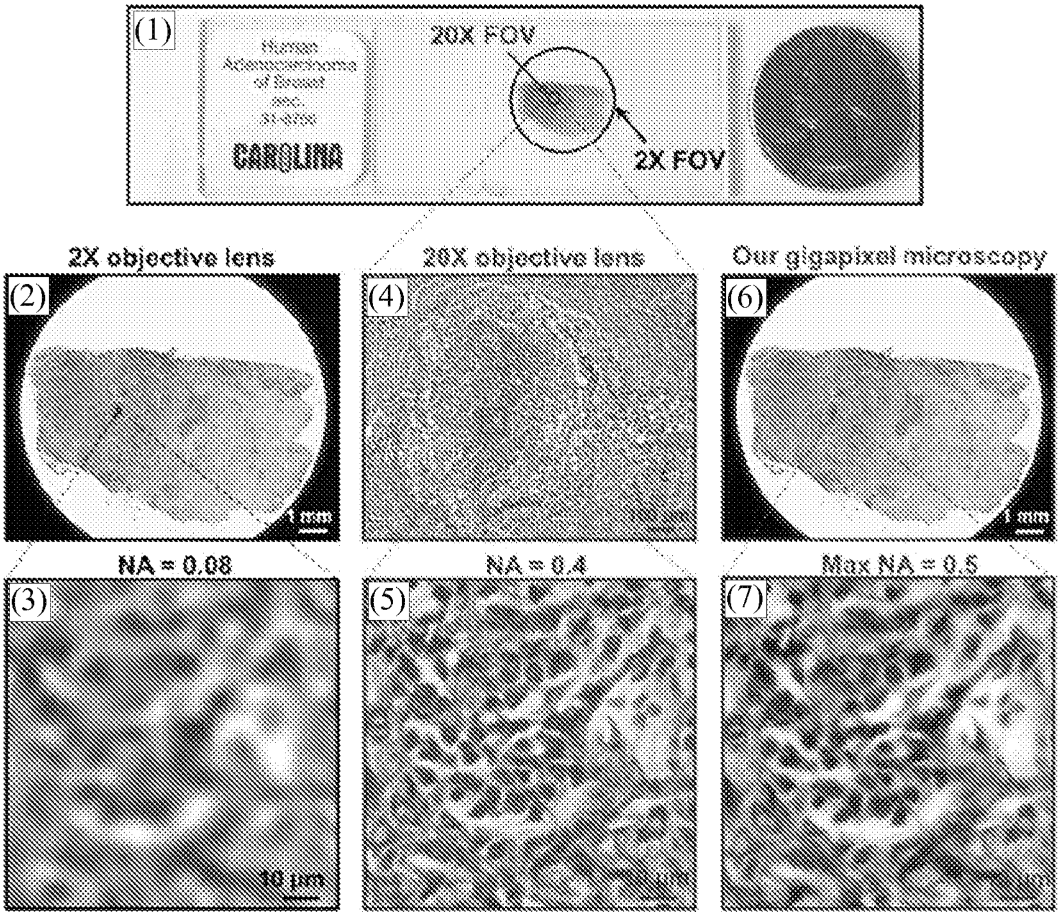
FIG. 11A(1) is a photograph illustrating the fields-of-view of a pathology slide for both 2× and 20× objective lenses of conventional microscopes, for comparison.

To demonstrate an implementation of this FPI system 10 for digital pathology applications, this color imaging system was used to acquire color high-resolution images of a pathology slide (human adenocarcinoma of breast section, Carolina). FIG. 11A(1) is a photograph illustrating the fields-of-view of a pathology slide for both 2× and 20× objective lenses of conventional microscopes, for comparison. For the case of the 2× objective lens, the FOV in the conventional microscope is ~13.25 mm in diameter and the NA is 0.08, as shown by the images FIGS. 11A(2) and 11A(3). On the other hand, for the 20× objective lens, the NA of the 20× objective is 0.4, which is much higher than that of the 2× lens, while the FOV is only 1.1 mm in diameter, as shown in FIGS. 11A(4) and 11A(5). Using the color imaging FPI system 10 with a 2× objective lens of embodiments, the field-of-view is the same as the 2× case (i.e., 13.25 mm in diameter) while the maximum NA is ~0.5, results in more than 1.8 gigapixel across the entire image by Nyquist rate. FIG. 11A(6) and FIG. 11A(7) are color images showing the field-of-view and corresponding maximum NA of an FPI system 10, according to an embodiment of the invention.

Figure 11B:
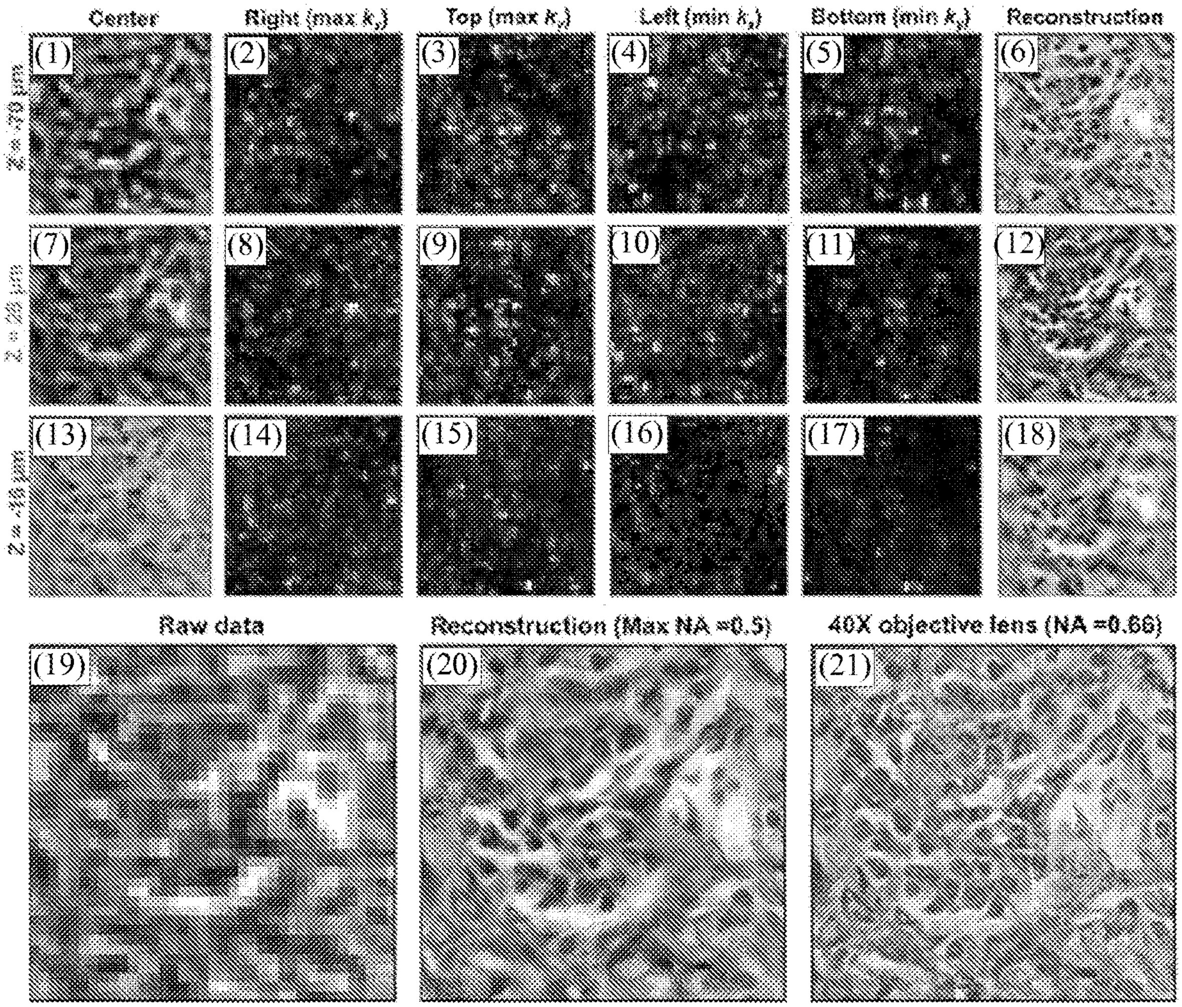
FIGS. 11B(1)-(21) are images resulting from using a color imaging FPI system, according to an embodiment of the invention.
Figure 11C:
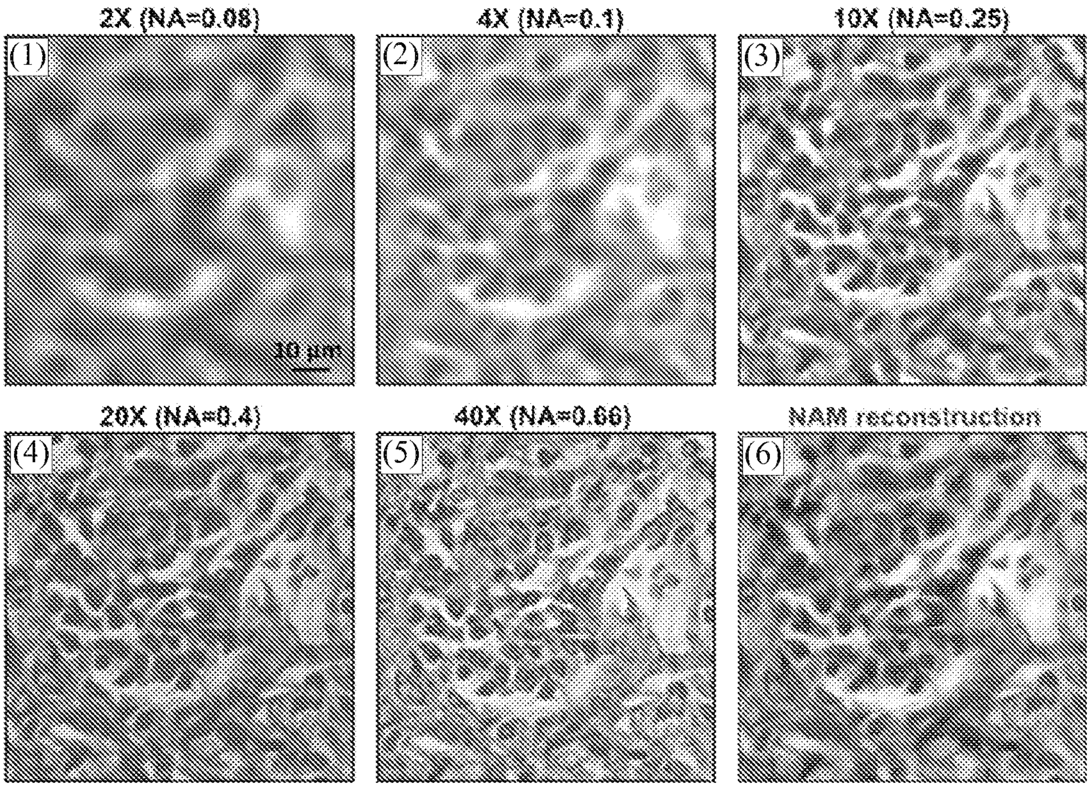
FIGS. 11C(1), 11C(2), 11C(3), 11C(4), 11C(5) and 11C(6) are images showing a comparison of image quality between the color imaging FPI system and different objective lenses, according to embodiments of the invention.

FIG. 11B includes results of using the color imaging FPI system 10, according to an embodiment of the invention. The row of figures corresponding to FIGS. 11B(1)-(18) are associated with the reconstructed images for red, green, and blue illumination respectively. FIG. 11B(19) is the raw color image. FIG. 11B(20) is the computationally reconstructed color image with digital refocusing by the FPI system 10. FIG. 11B(21) is an image captured by a 40× objective lens and a color image sensor for comparison. FIGS. 11C(1), 11C(2), 11C(3), 11C(4), 11C(5) and 11C(6) are color images showing a comparison of image quality between the color imaging FPI system 10 and different objective lenses. FIG. 11C(6) is an image computationally reconstructed by the FPI system 10. FIGS. 11C(1), 11C(2), 11C(3), 11C(4), and 11C(5) are images captured by a 2×, 4×, 10×, 20×, and 40× objective lenses, respectively, for comparison.

B. Phase Imaging

Phase imaging is useful in numerous applications. For example, phase profile of a histopathology slide may contain information about the molecular scale organization of tissue and can be used as an intrinsic marker for cancer diagnosis as discussed in Wang, Z., Tangella, K., Balla, A. and Popescu, G., "Tissue refractive index as marker of disease," *Journal of Biomedical Optics* 16, 116017-116017 (2011), which is hereby incorporated by reference in its entirety. As another example, phase information of a sample can also be used to measure the optical path length of cells or organelles to determine the growth pattern of cell cultures or to perform blood screening, as discussed in Lue, N. et al., "Live Cell Refractometry Using Hilbert Phase Microscopy and Confocal Reflectance Microscopy," *The Journal of Physical Chemistry A*, 113, pp. 13327-13330 (2009), Mir, M. et al., "Optical measurement of cycle-dependent cell growth," *Proceedings of the National Academy of Sciences* 108, pp. 13124-13129 (2011), and Mir, M. et al., "Blood screening using diffraction phase cytometry," *Journal of Biomedical Optics* 15, pp. 027016-027014 (2010), which are hereby incorporated by reference in their entirety.

Figure 11D:
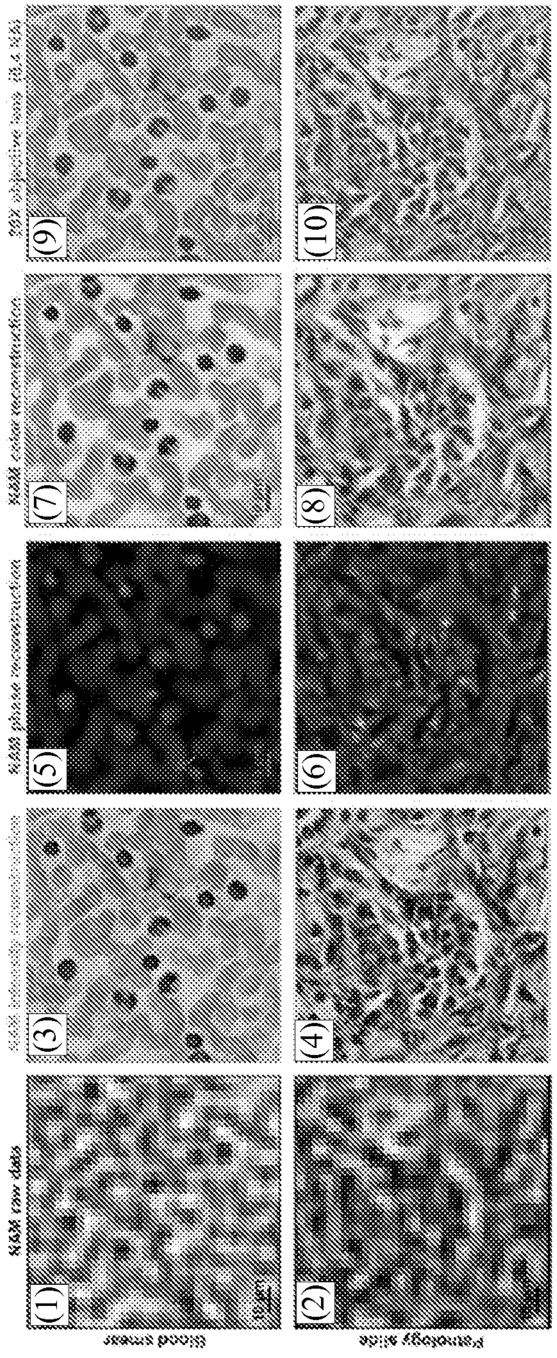
FIGS. 11D(1)-(10) are phase and color images from using an FPI method with the color imaging FPI system 10 both a pathology slide and blood smear, according to an embodiment of the invention.

Most conventional full-field phase imaging techniques use interferometry, which requires sophisticated and well-designed optical alignments. Compared to these conventional techniques, the FPI methods of embodiments are easy and cost-effective solution for researchers and clinicians to incorporate phase imaging functionality into their current microscope systems. The Figures in FIG. 11D includes phase and color images from using an FPI method with the color imaging FPI system 10 for both a pathology slide and blood smear, according to an embodiment of the invention. FIGS. 11D(1) and 11D(2) are the low-resolution images. FIGS. 11D(3) and 11D(4) are the high-resolution intensity images. FIGS. 11D(5) and 11D(6) are the high-resolution phase images. FIGS. 11D(7) and 11D(8) are the high-resolution color images. FIGS. 11D(9) and 11D(10) are images from a conventional microscope with a 20× objective lens for comparison. The phase image is generated by taking the phase angle of the complex high-resolution image.

V. Further Simulation Results

Some results of numerical simulations of FPI systems performing FPI methods, according to embodiments of the invention, are provided in this section and elsewhere in the disclosure. In many embodiments, the FPI systems use FPI methods to reconstruct a high-resolution image with the use of a low NA lens.

As an example, FIG. 5A illustrates results from a numerical simulation of an FPI system using an FPI method, according to an embodiment of the invention. FIG. 5A includes two images (left-hand side) that represent the simulated specimen intensity profile I(x,y) and phase profile φ(x,y). The pixel size of these two input profiles is 275 nm and the wavelength of the simulated incidence is 632 nm. In this simulation, the method was performed using an FPI device 100(*a*) having a plurality of stationary light elements in the form of a two-dimensional array of light elements. During the measurement process, the specimen was illuminated by plane waves at 137 different incident angles, and filtered by a 2× objective lens (0.08 NA), and then captured by an image sensor with 5.5 μm pixel size. In this simulation, the sample is assumed to be placed at the in-focus position of the objective lens (i.e. at the in-focus plane 122). The resulting low-resolution images, added with 1% random speckle noise, are shown in the middle part of FIG. 5A. Based on these low-resolution images, a recovery process was used to computationally reconstruct a high-resolution image with a maximum NA of 0.5 in Fourier space. In the recovery process, the intensity of the low-pass filtered image is replaced by the actual low-resolution measurement and the corresponding Fourier space of the high-resolution reconstruction is updated accordingly. Intensity and phase profiles of the reconstructed high-resolution image are shown in the right-hand side of FIG. 5A. The high-resolution images of the specimen may be recovered without involving phase measurement in the data acquisition measurement process.

FIGS. 5B(1), 5B(2), 5B(3), 5B(4), 5B(5), 5B(6), 5B(7), 5B(8), 5B(9), 5B(10), 5B(11), and 5B(12) illustrate more results from the numerical simulation of the FPI system using an FPI method, according to the embodiment discussed with respect to FIG. 5A. FIGS. 5B(1), 5B(2), 5B(3), 5B(4), 5B(5), 5B(6), 5B(7), 5B(8), and 5B(9) are images of 9 low-resolution measurements out of the 137 taken during this simulation. FIGS. 5B(10) and 5B(11) are computationally reconstructed high-resolution intensity and phase images respectively. FIG. 5B(12) is the Fourier space of the recovered image. The corresponding regions of the low-resolution images are highlighted.

VI. Throughput Enhancement Factor

Based on the pixel size ratio between the largest pixel sizes of the raw low-resolution images and the largest pixel sizes of the high-resolution images, an enhancement factor of using an FPI system can be expressed as:

$$\text{Enhancement factor} = 2 \cdot NA_{syn}/NA_{obj} \quad \text{(Eqn. 3)}$$

The larger the Enhancement factor, the higher the system throughput.

In certain embodiments, the FPI system 10 may have a certain sampling condition to provide a particular enhancement factor. Generally, the sampling condition may be associated with two questions: 1) given the NA of an objective lens, what is the largest pixel size that can be used for acquiring the low resolution intensity images; 2) given the synthetic NA of the reconstructed image, what is the largest pixel size that can be used for representing the reconstructed intensity image. Since the FPI method of embodiments can recover both intensity and phase information, the answer to question 1 is the same as the sampling condition for coherent optical systems: $\lambda/(2 \cdot NA_{obj})$. For question 2, the synthetic NA is for the electric field E (with amplitude and phase). The final reconstruction, on the other hand, is for the intensity profile I ($I=E \cdot E^*$, where '*' denotes for complex conjugate). Such a multiplication of electric field in the spatial domain corresponds to a convolution operation in the Fourier domain. As such, the passband of the reconstructed intensity image double in the Fourier domain. Therefore, the largest pixel size that can be used for representing the reconstructed intensity image is $\lambda/(4 \cdot NA_{obj})$ at the sample plane.

In certain implementations, an FPI device 100(*a*) includes an optical element in the form of a 2× objective with 0.08 NA and radiation detector in the form of an image sensor with 5.5 μm pixel size. From the answer to question 2, the largest pixel size that can be used at the image plane is $2 \cdot \lambda/(2 \cdot NA_{obj})$=5.88 μm for blue light. The 5.5 μm pixel size of the image sensor is, therefore, in accord with such a sampling condition. On the other hand, based on the answer to question 2, pixel sizes (at the sample plane) of the reconstructed image are 0.34 μm, 0.30 μm and 0.28 μm for red, green and blue wavelengths. For simplicity, a reconstructed pixel size of 0.275 μm was used for these three wavelengths in the implementation, corresponding to an enhancement factor of 10.

VII. Advantages of the FPI System

Embodiments of the invention may provide one or more of the following technical advantages. Some examples of these advantages are provided below.

1. Object Support in Fourier Domain.

In one aspect, FPI methods impose object support constraints in the Fourier domain, which provides large FOV and higher signal-to-noise ratio (with focusing elements) without mechanical scanning. In conventional ptychography systems, object support is provided by the confined illumination in the spatial domain. In these conventional systems, the specimen must be mechanically scanned through the desired field-of-view.

2. No Phase Measurements

In most embodiments, the FPI methods do not require phase measurements of the specimen. Conventional interfermometric synthetic aperture microscopes require phase measurements in their detection schemes, as can be described in Rodenburg, J. M. and Bates, R. H. T. "The theory of super-resolution electron microscopy via Wigner-distribution deconvolution," *Phil. Trans. R. Soc. Lond. A* 339, 521-553 (1992), H. M. L. and Rodenburg, J. M., "Movable aperture lensless transmission microscopy, a novel phase retrieval algorithm," *Phys. Rev. Lett.* 93, 023903 (2004), Rodenburg, J. M. et al., "Hard-X-ray lensless imaging of extended objects," *Phys. Rev. Lett.* 98, 034801 (2007), Thibault, P. et al., "High-resolution scanning X-ray diffraction microscopy," *Science* 321, 379-382 (2008), Dierolf, M. et al., "Ptychographic coherent diffractive imaging of weakly scattering specimens," *New J. Phys.* 12, 035017 (2010), Maiden, A. M., Rodenburg, J. M. and Humphry, M. J., "Optical ptychography: a practical implementation with useful resolution," *Opt. Lett.* 35, 2585-2587 (2010), Humphry, M., Kraus, B., Hurst, A., Maiden, A. and Rodenburg, J., "Ptychographic electron microscopy using high-angle dark-field scattering for sub-nanometre resolution imaging," *Nat. Commun.* 3, 730 (2012), which are hereby incorporated by reference in their entirety. Because no measured phase information is needed, The FPI system eliminates the design challenges associated with conventional interferometric detection schemes.

3. Spatial-Bandwidth Product Beyond the Physical Limitations of Optical Element

One advantage may be that the FPI systems of certain embodiments may increase the spatial-bandwidth product beyond the physical limitations of its optics while avoiding the drawbacks of previous attempts to do so with conventional devices, in a simple and cost-effective manner. These systems use FPI methods to decouple field-of-view from resolution of the optics, which allows these systems to generate a high-resolution image with a low NA lens. Thus, the throughput of these FPI systems is not limited by the spatial-bandwidth product of their optics. In one exemplary embodiment, an FPI system has been implemented that produces a 1.6 gigapixel system with a maximum NA of 0.5, a field-of-view of 120 $mm^2$, and a resolution-invariant imaging depth of 0.3 mm.

4. Scalable Throughput.

As discussed, the resolution and FOV are not coupled in FPI systems of embodiments. In one embodiment, an FPI system can be scaled for a desired throughput by using an objective lens having a particular NA and by using a particular number N of illuminations. For example, the throughput of an FPI system may be increased by reducing the NA of the objective lens and/or by increasing the number N of illuminations. In one embodiment example, an FPI system provides two orders of magnitude higher throughput than existing bright-field microscopes without the use of mechanical scanning and/or phase measurements 5. Modular Form that can be Readily Implemented with Conventional Microscope In certain cases, components of the FPI system may be in modular form to be readily implemented with components of a conventional microscope or other conventional imaging device. These implementations may have the potential to broadly impact digital pathology, hematology, phytotomy, immunochemistry and forensic photography. For example, modular components of an FPI system may include a variable illuminator (e.g., a simple light-emitting diode (LED) matrix) and a processor with instructions for executing the FPI method.

6. No Mechanical Scanning.

In certain embodiments, FPI methods do not need mechanical scanning. Unlike conventional synthetic-aperture and scanning-based wide FOV microscopy techniques, mechanical scanning is not required for FPI methods of embodiments. As such, it simplifies the platform design, reduces associated costs and allows for a higher throughput limit.

7. Capable of Color Imaging.

Another advantage may be that the FPI system of certain embodiments can be used to generate color images, which is pivotal in pathology and histology applications. In embodiments, an FPI system may be capable of color imaging by having a variable illuminator that provides illumination of different colors (e.g., color LED matrix). If digital refocusing is implemented, the computationally reconstructed image can remain free of any chromatic aberrations of the optics.

8. Digital Refocusing and Expanded Depth of Focus

To achieve optimal resolution in a conventional microscope, a stage must be used to mechanically bring an out-of-focus specimen into focus. In certain embodiments, FPI methods can computationally refocus the image digitally, rather than mechanically. This aspect is especially useful for cases where specimens are not perfectly aligned over the entire FOV. Using digital refocusing, the FPI system can expand the depth of focus beyond the optical limitations of the optical element. For example, an FPI method of one embodiment can been used to extend the depth of focus of the objective lens of a conventional microscope from about 80 μm to about 0.3 mm. This increased depth of focus can provide the additional advantage of providing a large tolerance to microscope slide placement errors, which improves accuracy over conventional systems.

9. Phase Imaging Capability.

A phase profile of a biological sample contains information about the molecular scale organization of sample and can be used as an intrinsic marker for different applications. The ability to perform phase imaging is also useful for digital image processing, such as cell segmentation and cell counting. Conventional full-field phase imaging techniques require fairly sophisticated and well-designed optical alignments. In certain embodiments, an FPI method provides an easy and cost-effective solution for researchers and clinicians to incorporate phase imaging functionality into their current microscope systems. The FPI method can reconstruct the complex image of the sample. In certain embodiments, the FPI method can generate a phase image by taking the phase angle of the complex image.

10. X-Ray and THz Applications

In certain embodiments, FPI methods can be extended to Terahertz and X-ray imaging applications, where lenses are poor and of very limited numerical aperture.

VIII. FPI Systems for X-Ray Imaging

In certain embodiments, an FPI system 10 may be configured for X-ray imaging. In these embodiments, the Fourier ptychographic X-ray imaging system 10 comprises an FPI device with an X-ray radiation source (e.g., X-ray tube and metal target).

In one embodiment, a Fourier ptychographic X-ray imaging system 10 may include the FPI device 100(*c*) shown in FIG. 4A, with components configured for use with X-ray radiation. In this embodiment, the FPI device 110(*c*) comprises an assembly 170 that may be mounted as a rigid assembly onto a stage (e.g., a goniometer stage) for translating and/or rotating the assembly 170 with respect to a stationary light element 112 directing X-ray radiation to provide X-ray radiation to a specimen 20 from a plurality of N incidence angles. The FPI device 100(*c*) comprises a mechanism 160 for translating and/or rotating the assembly 170 with respect to the light element 112. The mechanism 170 may be affixed to a stationary base. The FPI device 100(*c*) also comprises an optical element 130(*c*) and a radiation detector 140(*c*). Both of these components are designed for X-ray radiation i.e. an X-ray optical element and an X-ray radiation detector respectively. The X-ray optical element may be, for example, a micro zone plate or a grazing incidence mirror. A micro zone plate can project a full-field image to the X-ray radiation detector. The X-ray radiation detector may be, for example, an X-ray sensitive CCD. An example of a micro zone plate and an X-ray sensitive CCD can be found in Chao, W., Harteneck, B., Liddle, A., Anderson, E., and Attwood, D., "Soft X-ray microscopy at a spatial resolution better than 15 nm," *Nature*, vol. 435 (Jun. 30, 2005), which is hereby incorporated by reference in its entirety. In this embodiment, the light element 112 may comprise a stationary X-ray radiation source.

In another embodiment, a Fourier ptychographic X-ray imaging system 10 may include the FPI device 100(*d*) shown in FIG. 4B, with components configured for use with X-ray radiation. In this embodiment, the FPI device 110(*d*) comprises a light element 112 directing X-ray radiation to the specimen 20 from a plurality of N incidence angles. The FPI device 100(*d*) rotates the light element 112 relative to the specimen. For example, the light element 112 may pivot about one or more axes. The FPI device 100(*d*) also comprises an optical element 130(*b*) and a radiation detector 140(*b*). In this embodiment, the optical element 130(*b*) and radiation detector 140(*b*) may be designed for X-ray radiation i.e. may be an X-ray optical element (e.g. micro zone plate or grazing incidence mirror) and an X-ray radiation detector (e.g., X-ray sensitive CCD) respectively. In this embodiment, the light element 112 may comprise an X-ray radiation source.

The Fourier ptychographic X-ray imaging system 10 may perform the FPI method described with respect to FIG. 6A. At step 1100, the FPI method provides illumination to the specimen area from a plurality of N incidence angles by translating and/or rotating the assembly 170 with respect to a stationary light element 112 directing X-ray radiation to provide X-ray radiation to a specimen 20 from a plurality of N incidence angles.

By implementing X-ray imaging, these Fourier ptychographic X-ray imaging systems 10 provide additional capabilities. For example, these systems may provide larger penetration depths into the specimen. As another example, X-ray imaging may allow for elemental and chemical identification on a scale of 10 nm or less.

IX. Subsystems

Figure 12:
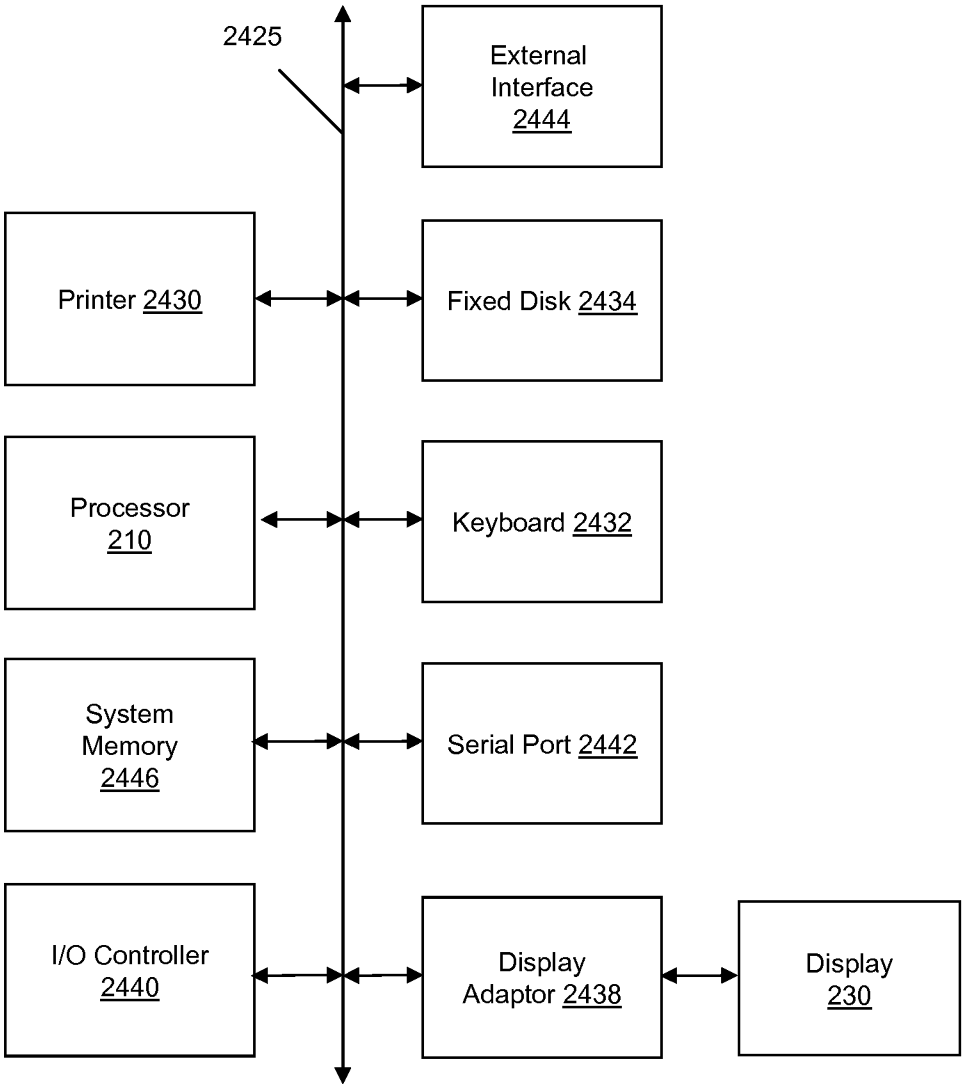
FIG. 12 is a block diagram of subsystems that may be present in a FPI system 10, according to embodiments.

FIG. 12 is a block diagram of subsystems that may be present in a FPI system 10, according to embodiments. For example, the FPI system 10 includes a processor 210. The processor 210. The processor 210 may be a component of the FPI device 100 in some cases. The processor 210 may be a component of the radiation detector 140 in some cases.

The various components previously described in the Figures may operate using one or more of the subsystems to facilitate the functions described herein. Any of the components in the Figures may use any suitable number of subsystems to facilitate the functions described herein. Examples of such subsystems and/or components are shown in a FIG. 12. The subsystems shown in FIG. 12 are interconnected via a system bus 2425. Additional subsystems such as a printer 2430, keyboard 2432, fixed disk 2434 (or other memory comprising computer readable media), display 230, which is coupled to display adapter 2438, and others are shown. Peripherals and input/output (I/O) devices, which couple to I/O controller 2440, can be connected by any number of means known in the art, such as serial port 2442. For example, serial port 2442 or external interface 2444 can be used to connect the computing device 200 to a wide area network such as the Internet, a mouse input device, or a scanner. The interconnection via system bus 2425 allows the processor 210 to communicate with each subsystem and to control the execution of instructions from system memory 2446 or the fixed disk 2434, as well as the exchange of information between subsystems. The system memory 2446 and/or the fixed disk 2434 may embody the CRM 220 in some cases. Any of these elements may be present in the previously described features.

In some embodiments, an output device such as the printer 2430 or display 230 of the FPI system 10 can output various forms of data. For example, the FPI system 10 can output 2D color/monochromatic images (intensity and/or phase), data associated with these images, or other data associated with analyses performed by the FPI system 10.

Modifications, additions, or omissions may be made to any of the above-described FPI methods and their associated features, e.g., features described with respect to FIGS. 6A and 6B and other illustrations, without departing from the scope of the disclosure. Any of the FPI methods described above may include more, fewer, or other features without departing from the scope of the disclosure. Additionally, the steps of the described features may be performed in any suitable order without departing from the scope of the disclosure.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a CRM, such as a random access memory (RAM), a read only memory (ROM), a magnetic medium such as a hard-drive or a floppy disk, or an optical medium such as a CD-ROM. Any such CRM may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A Fourier ptychographic imaging apparatus, comprising:

a stationary light source, wherein at least one other element of the Fourier ptychographic imaging apparatus is configured to move a specimen being imaged relative to the stationary light source to sequentially illuminate the specimen at a plurality of incidence angles;

one or more optical elements configured to receive light from the specimen being imaged;

a radiation detector configured to capture a plurality of variably-illuminated intensity images based on light from the one or more optical elements, wherein during operation, each variably-illuminated intensity image is captured while the stationary light source illuminates the specimen at one of the plurality of incidence angles and all variably-illuminated intensity images are captured at a same plane; and one or more processors in communication with the radiation detector to receive the plurality of variably-illuminated intensity images, the one or more processors configured to reconstruct a complex two-dimensional image from the plurality of variably-illuminated intensity images captured at the same plane by:

(i) inverse Fourier transforming data in a region of a plurality of regions in Fourier space to generate image data, the region corresponding to one incidence angle of the plurality of incidence angles;

(ii) updating the image data by replacing its amplitude with an intensity value from a variably-illuminated intensity image of the plurality of variably-illuminated intensity images captured at the same plane, the variably-illuminated intensity image associated with the corresponding one incidence angle;

(iii) Fourier transforming the updated image data and updating the region in Fourier space with the Fourier transformed updated data; and (iv) repeating (i)-(iii) for each region of the plurality of regions to generate a solution and inverse transforming the solution to generate the complex two-dimensional image.

2. The Fourier ptychographic imaging apparatus of claim 1, wherein the stationary light source is a light emitting diode.

3. The Fourier ptychographic imaging apparatus of claim 1, wherein the at least one other element comprises a receptacle configured to receive the specimen.

4. The Fourier ptychographic imaging apparatus of claim 3, wherein the receptacle is a slide or a dish.

5. The Fourier ptychographic imaging apparatus of claim 1, wherein reconstructing the complex two-dimensional image does not use phase measurements.

6. The Fourier ptychographic imaging apparatus of claim 1, wherein the radiation detector comprises a charge coupled device, a complementary metal-oxide semiconductor (CMOS) imaging sensor, an avalanche photo-diode array, a photo-diode array, or a photomultiplier tube array.

7. The Fourier ptychographic imaging apparatus of claim 1, wherein reconstructing the complex two-dimensional image further comprises, prior to (i), using another solution to provide initial data in the plurality of regions in Fourier space.

8. The Fourier ptychographic imaging apparatus of claim 1, wherein one or more sets of neighboring regions of the plurality of regions in Fourier space overlap.

9. The Fourier ptychographic imaging apparatus of claim 8, wherein the one or more sets of neighboring regions overlap by about 65% to about 75%.

10. The Fourier ptychographic imaging apparatus of claim 1, wherein the complex two-dimensional image generated is of higher resolution than that of the variably-illuminated intensity images.

11. A Fourier ptychographic imaging method, comprising:

obtaining a plurality of variably-illuminated intensity images of a specimen being imaged, the variably-illuminated intensity images captured by a radiation detector while the specimen is moved relative to a stationary light source causing sequential illumination of the specimen at a plurality of incidence angles, wherein each variably-illuminated intensity image is captured by the radiation detector while illumination is provided at one of a plurality of incidence angles and all the variably-illuminated intensity images are captured at a same plane; and reconstructing a complex two-dimensional image from the plurality of variably-illuminated intensity images captured at the same plane by:

(i) inverse Fourier transforming data in a region of a plurality of regions in Fourier space to generate image data, the region corresponding to one incidence angle of the plurality of incidence angles;

(ii) updating the image data by replacing its amplitude with an intensity value from a variably-illuminated intensity image of the plurality of variably-illuminated intensity images captured at the same plane, the variably-illuminated intensity image associated with the corresponding one incidence angle;

(iii) Fourier transforming the updated image data and updating the region in Fourier space with the Fourier transformed updated data; and (iv) repeating (i)-(iii) for each region of the plurality of regions to generate a solution and inverse transforming the solution to generate the complex two-dimensional image.

12. The Fourier ptychographic imaging method of claim 11, wherein the stationary light source is a light emitting diode.

13. The Fourier ptychographic imaging method of claim 11, wherein reconstructing the complex two-dimensional image does not use phase measurements.

14. The Fourier ptychographic imaging method of claim 11, further comprising, prior to (i), using another solution to provide initial data in the plurality of regions in Fourier space.

15. The Fourier ptychographic imaging method of claim 11, wherein one or more sets of neighboring regions of the plurality of regions in Fourier space overlap.

16. The Fourier ptychographic imaging method of claim 15, wherein the one or more sets of neighboring regions overlap by about 65% to about 75%.

17. A Fourier ptychographic imaging method, comprising:

moving a specimen being imaged relative to a stationary light source to sequentially illuminate the specimen at a plurality of incidence angles;

obtaining a plurality of variably-illuminated intensity images using a radiation detector, each variably-illuminated intensity image captured while illumination from the stationary light source is provided to the specimen at one of a plurality of incidence angles, wherein all the variably-illuminated intensity images are captured at a same plane; and reconstructing a complex two-dimensional image from the plurality of variably-illuminated intensity images obtained at the same plane by:

(i) inverse Fourier transforming data in a region of a plurality of regions in Fourier space to generate image data, the region corresponding to one incidence angle of the plurality of incidence angles;

(ii) updating the image data by replacing its amplitude with an intensity value from a variably-illuminated intensity image of the plurality of variably-illuminated intensity images obtained at the same plane, the variably-illuminated intensity image associated with the corresponding one incidence angle;

(iii) Fourier transforming the updated image data and updating the region in Fourier space with the Fourier transformed updated data; and (iv) repeating (i)-(iii) for each region of the plurality of regions to generate a solution and inverse transforming the solution to generate the complex two-dimensional image.

18. The Fourier ptychographic imaging method of claim 17, wherein the stationary light source is a light emitting diode.

19. The Fourier ptychographic imaging method of claim 18, the method comprising moving a receptacle configured to receive the specimen, the receptacle moved relative to the stationary light source to sequentially illuminate the specimen at the plurality of incidence angles.

20. The Fourier ptychographic imaging method of claim 19, wherein the receptacle is a slide or a dish.

* * * * *